US008403490B2

(12) United States Patent
Sugiyama et al.

(10) Patent No.: US 8,403,490 B2
(45) Date of Patent: Mar. 26, 2013

(54) BEAM SCANNING-TYPE DISPLAY DEVICE, METHOD, PROGRAM AND INTEGRATED CIRCUIT

(75) Inventors: Keiji Sugiyama, Kyoto (JP); Kakuya Yamamoto, Hyogo (JP); Kenichi Kasazumi, Osaka (JP); Tatsuo Itoh, Osaka (JP); Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 915 days.

(21) Appl. No.: 12/516,122

(22) PCT Filed: Sep. 26, 2008

(86) PCT No.: PCT/JP2008/002680
§ 371 (c)(1),
(2), (4) Date: May 22, 2009

(87) PCT Pub. No.: WO2009/041055
PCT Pub. Date: Apr. 2, 2009

(65) Prior Publication Data
US 2010/0060551 A1    Mar. 11, 2010

(30) Foreign Application Priority Data

Sep. 26, 2007 (JP) ................................. 2007-248605
Oct. 12, 2007 (JP) ................................. 2007-266339
Oct. 16, 2007 (JP) ................................. 2007-268539
May 23, 2008 (JP) ................................. 2008-135132

(51) Int. Cl.
*G03B 21/26* (2006.01)
*G02B 27/14* (2006.01)
*G09G 5/00* (2006.01)

(52) U.S. Cl. ................................ 353/28; 359/630; 345/8
(58) Field of Classification Search .................. 345/7, 8, 345/9; 359/630, 631, 632, 633, 13, 14; 353/28, 353/98, 99, 122; 349/11
See application file for complete search history.

(56) References Cited

U.S. PATENT DOCUMENTS
(Continued)

FOREIGN PATENT DOCUMENTS
JP    62-231921    10/1987
JP    10-301055    11/1998
(Continued)

OTHER PUBLICATIONS

International Search Report issued Jan. 13, 2009 in the International (PCT) Application of which the present application is the U.S. National Stage.

*Primary Examiner* — William C Dowling
*Assistant Examiner* — Ryan Howard
(74) *Attorney, Agent, or Firm* — Wenderoth, Lind & Ponack, L.L.P.

(57) ABSTRACT

A beam scanning-type display device used as a head-mounted display (HMD) or a head-up display (HUD) includes a light source which emits a beam, a scanning unit which performs scanning using the beam emitted from the light source, a deflecting unit which deflects the beam used for the scanning by the scanning unit in the direction toward an eye of a user, and a wavefront shape changing unit which changes the wavefront shape of the beam from the light source so that the beam spot size falls within the predetermined allowable range, and emits the beam to the wavefront shape changing unit.

20 Claims, 34 Drawing Sheets

U.S. PATENT DOCUMENTS

| | | |
|---|---|---|
| 5,355,181 A | 10/1994 | Ashizaki et al. |
| 6,967,781 B2 * | 11/2005 | Watanabe et al. .............. 359/630 |
| 2001/0010598 A1 * | 8/2001 | Aritake et al. ................. 359/630 |
| 2005/0234348 A1 | 10/2005 | Watanabe et al. |
| 2006/0018609 A1 * | 1/2006 | Sonoda et al. ................... 385/93 |
| 2007/0159599 A1 | 7/2007 | Yamada |

FOREIGN PATENT DOCUMENTS

| | | |
|---|---|---|
| JP | 2932636 | 8/1999 |
| JP | 2000-221441 | 8/2000 |
| JP | 3103986 | 10/2000 |
| JP | 3148791 | 3/2001 |
| JP | 2003-29198 | 1/2003 |
| JP | 2004-191946 | 7/2004 |
| JP | 2006-58505 | 3/2006 |
| JP | 2006-66875 | 3/2006 |
| JP | 2006-251509 | 9/2006 |
| JP | 2007-93945 | 4/2007 |

* cited by examiner

Side view

Plan view

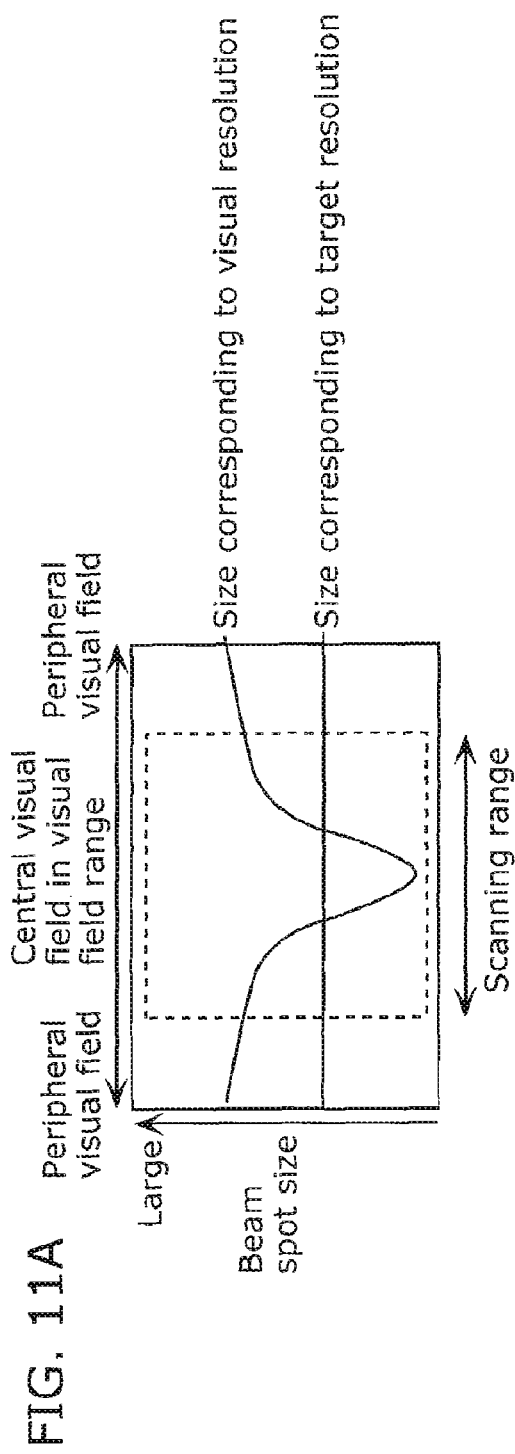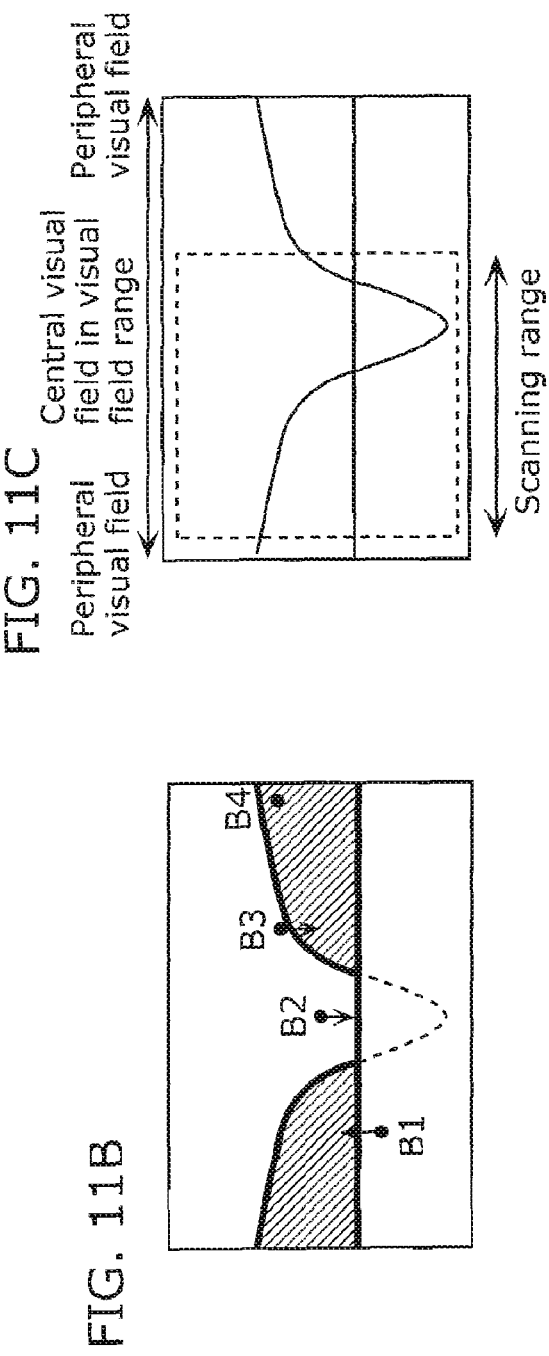

FIG. 12

| Beam spot size on retina (mm) | Wavefront shape in wavefront shape changing unit (mm) | Visual field position of beam (degrees) |
|---|---|---|
| Horizontal size: 0.035<br>Vertical size: 0.027 | Horizontal focal length: 36<br>Vertical focal length: 29<br>Horizontal diameter: 2.4<br>Vertical diameter: 1.6 | Horizontal size: 0<br>Vertical size: 0 |
| Horizontal size: 0.018<br>Vertical size: 0.019 | Horizontal focal length: 26<br>Vertical focal length: 21<br>Horizontal diameter: 2.4<br>Vertical diameter: 1.6 | Horizontal size: -30<br>Vertical size: 0 |
| Horizontal size: 0.035<br>Vertical size: 0.027 | Horizontal focal length: 27<br>Vertical focal length: 22<br>Horizontal diameter: 2.4<br>Vertical diameter: 1.6 | Horizontal size: -30<br>Vertical size: 0 |
| ... | ... | ... |

FIG. 15

| Spot size on retina | Curvature radius | Focal length of eye |
|---|---|---|
| 0.035 mm | 35.7 mm | 25 mm |
| 0.026 mm | 35.9 mm | 25 mm |
| 0.037 mm | 36.1 mm | 25 mm |
| ... | | |

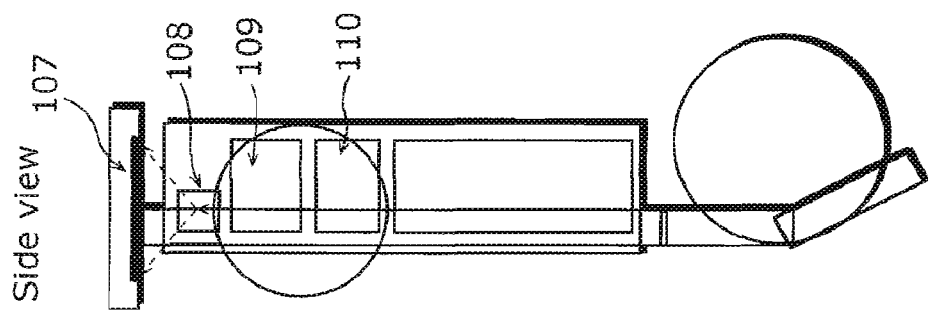
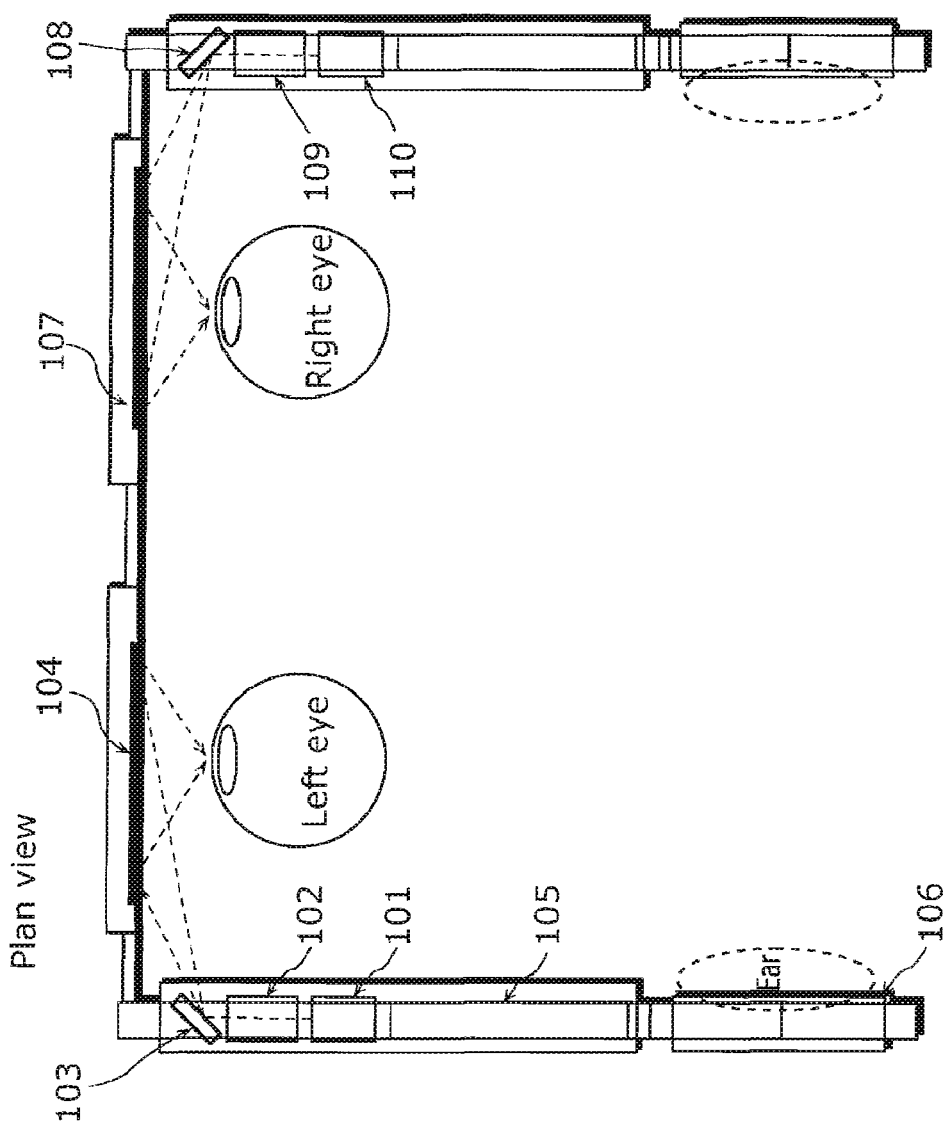
FIG. 34B Side view
FIG. 34A Plan view

When looking at near object

When looking at distant object

BEAM SCANNING-TYPE DISPLAY DEVICE, METHOD, PROGRAM AND INTEGRATED CIRCUIT

BACKGROUND OF THE INVENTION

1. Technical Field

The present invention relates to display devices such as head-mounted displays (HMDs).

2. Background Art

Conventional methods for use with display devices such as head-mounted displays (HMD) include a method for performing direct drawing on a retina of a user by performing two-dimensional scanning using a laser beam (hereinafter, described as a laser-scanning method)(for example, see Patent References 1 and 2). The display devices according to the laser scanning method is also known as: retinal scanning display, retinal irradiation display, retinal direct-draw display, laser scanning-type display, direct-view-type display, retinal scanning display(RSD), virtual retinal display, and so on.

In addition, the laser scanning methods includes a method for achieving three-dimensional display by causing an internal focus changing unit to change the depths of pixels in display of the pixels (for example, see Patent Reference 3).

The laser scanning methods include a method for causing a wavefront curvature changing unit to change a wavefront curvature radius of a laser light so as to correct the wavefront curvature radius to a target value (for example, see Patent Reference 4).

Each of FIGS. 34A and 34B shows an exemplary structure of an eyeglass-type HMD. The HMD shown in FIGS. 34A and 34B has a frame equipped with: light sources 101 and 110 which emit laser beams; wavefront shape changing units 102 and 109 which control the wavefronts of the laser beams; and scanning units 103 and 108 which perform two-dimensional scanning using the laser beams. The laser lights are projected onto the lenses by the scanning units 103 and 108, are reflected by the deflecting units 104 and 107 provided on the surfaces of the lenses, enter user's eyes to form images on the retinas of the eyes. Here, a half mirror or a hologram optical element (HOE) is used as each of the deflecting units 104 and 107, so as to allow the user to watch both landscape in the external world and images drawn using the laser lights at the same time. In addition, used for each of the scanning units 103 and 108 is a mirror device which performs two-dimensional scanning using a laser light by oscillating a single-plate mirror in a uniaxial or biaxial direction.

In addition, used as another embodiment of a conventional micro-display-type HMD is a structure in which a micro-display such as a liquid display and an organic EL display is used as a light source instead of a laser light source, and a deflecting unit guides light from the micro-display to a user's eye.

As in the case of common personal-computer display screens, eye strain is a problem in visual display terminal (VDT) operation using the above-mentioned HMD. Eye strain is mainly caused when the focuses of the eyes of a user are fixed on a display screen. FIG. 35 shows the structure of a human eye. FIG. 35 is a cross-sectional view of the eye. As shown in the illustration, a human eye visually recognizes a video obtainable when incident light 1205 passes through a crystalline body 1202, and then is condensed on a retina 1204 which is the depth wall of an eyeball 1201.

A human eye changes the thickness of a crystalline body 1202 by relaxing and tensing a ciliary body 1203 composed of muscles. This adjustment is made so as to successfully condense incident light 1205 on the retina 1204.

In general, a person tenses the ciliary body 1203 so as to make the crystalline body 1202 thicker when looking at a close object. Making the crystalline body 1202 thicker shortens the focal length of the crystalline body, which makes it easier to condense near light on the retina 1204. This allows the person to clearly watch a near object 1301. FIG. 36 illustrates this mechanism.

In contrast, the person relaxes the ciliary body 1203 so as to make the crystalline body 1202 thinner when seeing a distant object. Making the crystalline body 1202 thinner lengthens the focal length of the crystalline body, which makes it easier to condense distant light on the retina 1204. This allows the person to clearly watch a distant object 1301. FIG. 37 illustrates this mechanism.

In a VDT operation, the person sees light displayed on a near display screen. Normally, the person tenses the ciliary body 1203 so as to make the crystalline body 1202 thicker. A long-lasting VDT operation keeps the ciliary body 1203 tense. This strains the ciliary body 1203, resulting in eye strain.

To prevent eye strain, the micro-display-type HMD utilizes a function of changing the position of a micro-display or lens (for example, see Patent Reference 5).

A change in the position of a micro-display or lens changes a viewing distance (a distance between a user's eye and a virtual image of a displayed video) of a video presented to the user. Thus, when the video is displayed at a location distant from the user, the user relaxes the ciliary body 1203 so as to make the crystalline body thinner. Utilization of this action makes it possible to mitigate eye strain of the user who uses the HMD.

In addition, the beam scanning-type HMD can perform similar processing by changing the curvature of the wavefront of a beam instead of moving the position of the micro-display. In general, light wavefront curvatures become greater as the lights become distant (a light from an infinite distance is a parallel light having an infinite wavefront curvature). Therefore, an increase in the wavefront curvature of light from a laser light source lengthens the viewing distance of the video to be presented to the user. As a result, the tension of the ciliary bodies in the user's eyes is mitigated.

The image display devices used as HMDs belong to one category of image display devices among mobile display terminals for individual use. In view of wearability, a generally applied structure is an eyeglass structure as shown in FIGS. 34A and 34B.

The image display devices such as HMDs include a known image display device which performs two-dimensional scanning using a laser light assuming that, for example, a part corresponding to a lens in the eyeglass structure is a screen, and performs direct drawing on the retina of an eye of an observer so as to display an image (for example, see Patent Reference 6). Here, a reflection mirror composed of a back surface reflection mirror or a front surface reflection mirror as a pupil transmission lens corresponding to a screen is made into a Fresnel lens. This reduces the thickness, size, and weight of the whole optical system, thereby increasing wearablity.

In the case of an HMD according to a laser scanning method like this, an optical path from a laser light source to a retina of a user through a screen is spatially different for each pixel in the case where the laser light source and a laser scanning unit are arranged at the temple of the user instead of in front of the eye or in the case where a large image is displayed by increasing an angle of view. In other words, the incidence angles, reflection angles, the wavefront shapes and spot sizes of the beams at the deflecting unit such as a mirror disposed on the optical path are different between pixels significantly. Accordingly, even when the laser light source emits beams each having the same wavefront shape and spot size, the beam characteristics such as the beam wavefront shapes and spot sizes are different between the pixels in an image when the beams reach the eye of the observer. The resulting problems are that the sizes of the respective pixels vary, and that the sizes of some of the pixels exceed an allowable range.

Proposed in order to solve the problems is an image display device, according to a laser scanning method, which includes a curvature correcting unit which corrects the wavefront curvature of a laser light to a target value in association with a change in the position of an optical unit, which deflects the laser light to be used for scanning performed on the observer's eye, included in the image display device (for example, see Patent Reference 4). This helps the observer to recognize a precise image having corrected optical characteristics even though the variation degree of optical characteristics such as wavefront curvatures of the laser lights vary depending on the irradiation positions of the optical units on which the laser lights are irradiated.

Proposed in relation to the image display devices such as HMDs which are mounted on user's heads and display images include: an image display device including, as an image display unit, a pixel-type display device such as a liquid element and an organic EL; and various methods such as a method for performing direct drawing on user's retinas through two-dimensional scanning using laser beams.

The image display device like this is required to be small and light as a whole in order to reduce the burden in mounting or wearing the device, so that the user can use it for a long time. Further, if such device is implemented as having a design similar to that of a general eyeglass, the user can perform activities constantly wearing it as in the case of wearing the general eyeglass.

However, it becomes difficult to reduce the size and weight of an image display device according to the method using a pixel-type display device while increasing the image quality and visual field angle. This is because such increase necessitates use of a large ocular optical system including a display unit and a prism and a half mirror which guide lights from the display unit.

In addition, it is difficult to implement such ocular optical system in a general eyeglass-type image display device. It is likely that such ocular optical system must be implemented in a goggle-type or helmet-type image display device rather than an eyeglass-type image display device in order to be placed in front of the user's eyes, and thus that a feeling of comfort in wearing the device cannot be expected.

On the other hand, the retina scanning-type display according to the laser scanning method as shown in FIGS. 34A and 34B is characterized by composing a very small display device using a small micro-electro mechanical system (MEMS) mirror device.

Further proposed is configuring, in an eyeglass form, the device having a thin ocular optical system including a hologram mirror instead of a prism and a half mirror (for example, see Patent Reference 2).

Each of FIG. 38 and FIGS. 39A and 39B shows an example of an eyeglass-type image display device like this.

In FIG. 38, the eyeglass-type image display device 81 includes an eyeglass lens 82, a lens frame 83, and a temple 84 as in a general eyeglass.

A laser beam 86 is irradiated through an aperture 85 in the temple 84, is used for two-dimensional scanning, and is deflected at the image reflection area 87 on the lens 82 in the direction toward the eye 88 of the user. The laser beam 86 entering the eye 88 forms a spot on the retina, resulting in an image to be recognized.

Depending on the structure, an external device 89 including a scanning unit and an electric power unit is connected wired or wireless (represented by broken lines in the illustration). In combination with a speech reproduction device, earphones are further provided (not shown in the drawings).

FIG. 39A is a plan view of the eyeglass-type image display device 81, and FIG. 39B is a side view of the same. Each of the drawings shows only the right part of the user's head and the eyeglass-type image display device 81. In the case of a binocular, the binocular has a bilaterally symmetric structure (this is also true of image display devices to be described later).

In this embodiment, as shown in FIGS. 39A and 39B, the device includes the temple 84 mounting therein a light source 91 which emits a laser beam 86, a scanning unit 92 which performs two-dimensional scanning using the laser beam 86, and a control unit 94 which controls the respective units. Here, the horizontal dimension W of the temple 84 is the minimum width required to arrange the respective elements internally along a virtual straight line. In the case where the diameter of the laser beam which enters the MEMS mirror is approximately 2 mm, the minimum width can be roughly estimated to be 5 to 10 mm.

The vertical dimension H can be roughly estimated to be 30 mm since the eyeglass lens 82 has a height of 25 to 35 mm.

The laser beam 86 is projected toward the eyeglass lens 82 by the light source 91, is reflected by the deflecting unit 93 which is a hologram mirror formed on the surface of the eyeglass lens 82, enters the user's eye 88, and forms an image on the user's retina. The hologram mirror is a photopolymer layer on which a Lippman volumetric hologram is formed. The hologram mirror has a wave selectivity, and thus reflects only the laser beam having a particular wavelength. As a result, the user can visually recognize both landscape in the external world and the image drawn by the laser beam at the same time.

In the case of using a MEMS mirror as the scanning unit 92 in the aforementioned structure, the optical axis for irradiating a laser beam from the ear side of the temple 84 to the MEMS mirror becomes approximately parallel to the center axis of the eye, and the incidence angle $\alpha$ of the laser beam to the MEMS mirror becomes approximately equal to the incidence angle $\beta$ of the light from the MEMS mirror to the deflecting unit 93 (the incidence angle $\alpha$ is an angle formed by the normal of the reflection surface and the axis of the incident light). Here, $\alpha=\beta=60$ degrees is satisfied when the MEMS mirror is disposed as shown in FIG. 39A such that the laser beam from the MEMS mirror is irradiated on the deflecting unit without being shielded by the user's face.

In addition, another example proposes a device having the same structure, but the incidence direction of a laser beam is different (for example, see Patent Reference 7).

In Patent Reference 7, a laser light source unit is provided at the side of an eyeglass lens instead of the ear side so as to guide the laser light to the scanning unit. In reality, the optical path is formed as shown in FIGS. 40A and 40B because there is little space in the part ranging from the scanning unit to the eyeglass lens.

FIG. 40A is a plan view showing an exemplary eyeglass-type image display device structured like this, and FIG. 40B is a side view showing the same.

The scanning unit 92 is disposed at the same position as in the structure shown in FIGS. 39A and 39B. In contrast, the laser beam 86 irradiated from the light source 91 is irradiated from a portion between the eyeglass lens 82 and the scanning unit 92 using folding mirrors 95 and 96. In this case, the incidence angle α to the scanning unit 92 is represented as α=β/2=30 degrees.

[Patent Reference 1] Japanese Patent Publication No. 2932636

[Patent Reference 2] Japanese Unexamined Patent Application Publication No. 10-301055

[Patent Reference 3] Japanese Patent Publication No. 3103986

[Patent Reference 4] Japanese Unexamined Patent Application Publication No. 2004-191946

[Patent Reference 5] Japanese Patent Publication No. 3148791

[Patent Reference 6] Japanese Unexamined Patent Application Publication No. 2000-221441

[Patent Reference 7] Japanese Unexamined Patent Application Publication No. 2003-029198

SUMMARY OF THE INVENTION

In order to achieve high resolution display using a display according to a laser scanning method, it is necessary to reduce the beam spot sizes of laser lights corresponding to pixels in an image so as to reduce the sizes of the pixels.

According to a laser scanning method, the light paths from light sources to a user's retina are spatially different depending on the pixels. Beam scanning angles in the scanning unit, incidence angles, reflection angles and wavefront shape changes of beams in a mirror (deflecting unit) or the like disposed in front of the eye are significantly vary depending on the pixels, in particular, in the case where a light source and a scanning unit are arranged not in front of the user's eye but at the temple of the user with an aim to configure an HMD in eyeglass form, or in the case where a large image is displayed by increasing an angle of view. The wavefront shapes of beams which reach the user's eye vary depending on the pixels in the image even when the light source emits beams each having the same wavefront shape. This entails problems that the beam spot sizes vary, the pixel sizes vary, and some of the pixel sizes do not fall within an allowable range.

Patent Reference 4 discloses a curvature radius correcting method which entails a problem that a variation in beam spot size decreases an image quality even when curvature radiuses are adjusted to a target value under control. For example, in the case of causing a parallel light (having a curvature of 0) to enter the eye through the center or one of the ends of the image, beam spot sizes may vary between the center and the end of the image. This leads to generation of gaps between adjacent scanning lines or overlaps with adjacent scanning lines, resulting in a problem of a decrease in image quality.

FIG. 41 is a diagram showing an example of this problem. In the diagram, the curvature correcting unit of Patent Reference 4 is applied to an eyeglass-type HMD, In order to configure the HMD in eyeglass form, a scanning mirror is disposed at the temple of the user, and a plane-shaped deflection mirror such as a hologram diffraction element is disposed in front of the eye. FIG. 41 is a diagram showing that the curvature changing unit changes the curvature of a beam from the light source so that the curvature of the beam from the deflection mirror to the eye becomes 0 (representing a parallel light). As shown in the diagram, use of a parallel beam may cause a significant difference in spot size. For example, the beam spot size (diameter) at the point A1 is 450 μm, while the beam spot size at the point B1 is 2400 μm. This causes a variation in the spot sizes (pixel sizes) on the retina; the spot size at the point A2 is 35 μm, and the spot size at the point B2 is 7 μm.

The curvature radius correcting method of Patent Reference 4 entails a further problem that the curvature radius of a beam can be corrected only when the wavefront shape of the beam is spherical and the radius changes; that is, the curvature radius and spot size of the beam cannot be corrected to target curvature radius and spot size in the case where the horizontal components and vertical components of the wavefront shape change differently.

FIG. 42 is a diagram showing an example of this problem. As in FIG. 41, FIG. 42 is a diagram showing that the curvature correcting unit is applied to an eyeglass-type HMD. The plan view of FIG. 42 is a diagram when seen from an overhead position, and the side view of FIG. 42 is a diagram when seen from the side surface.

As in FIG. 41, in the plan view of FIG. 42, the beam from the deflection mirror to the eye is a parallel light, the beam spot size (horizontal width) at A1 is 450 μm, and the beam spot size (horizontal width) at A2 is 35 μm. The beam from the deflection mirror to the eye is a parallel light in the plan view, but in the side view, since the beam is a divergent light, the spot size (vertical width) at A1 is 900 μm, and the spot size (vertical width) at A2 is 780 μm.

The reflected light through the deflection mirror is a parallel light in the plan view while it is a divergent light in the side view. This is because the lens power of the deflection mirror varies depending on the direction which is the horizontal direction or the vertical direction, and because the incidence angles to the deflection mirror vary depending on the direction which is the horizontal direction or the vertical direction. These causes stem from the eyeglass form of the HMD.

The curvature correcting unit of Patent Reference 4 cannot correct the curvature radius and spot size of a beam to a target curvature radius and spot size in some cases. This is because a parallel light in the horizontal direction and a parallel light in the vertical direction cannot coexist, that is the light in either direction cannot be parallel.

Further, the laser scanning methods entail a problem that each of the pixels in an image cannot be adjusted to a desired size under control in the case where a fast scanning using a beam is performed at a speed faster than a beam spot size changing speed.

The above-described conventional techniques allow observers to recognize precise images with corrected optical characteristics, but entail a problem of difficulty in processing fast-moving high-definition images due to complexity in processes for adjusting the optical characteristics.

In addition, when the position of a micro-display and the curvature radius of the laser are changed without considering the status of an eye of a user, the user cannot successfully condense an incident light to the retina of the eye, which causes a trouble that the video to be displayed blurs.

It takes a certain time to make an adjustment of the crystalline body in order to successfully condense the incident light on the retina. In addition, the adjustable range in thickness of the crystalline body depends on individual differences such as near sight and far sight. Therefore, when the distance of the micro-display and the laser wavefront curvature are adjusted without considering the current thickness of the crystalline body and the minimum thickness of the crystalline body, the crystalline body cannot be changed according to the adjustments. This causes a state where the incident light cannot be successfully condensed on the retina, which blurs the display image to be visually recognized by the user.

This point is not considered in the exemplary laser scanning HMDs and HMDs which prevent eye strain in the prior art.

Further, a conventional eyeglass-type image display device entails the following problem.

There are general eyeglasses having various designs such as an eyeglass having a frame and temples which are thin or thick, and an eyeglass without any lens frame and with temples directly attached to lenses. One of them is an eyeglass having wide temples as shown in FIG. 38. The eyeglass having such design is suitable for an eyeglass-type image display device having temples with embedded parts. In this case, the temples are wide in the vertical direction, but the temples are preferably thin in the horizontal direction. In particular, an eyeglass with externally protrusive temple parts looks strange, and thus is not suitable for constant use.

In the case of the eyeglass-type image display device shown in FIGS. 39A and 39B, the horizontal dimensions W of the temples can be reduced to the minimum. However, this reduction increases the size required for the MEMS mirrors because the incidence angles to the MEMS mirrors which are the scanning units are as large as 60 degrees.

A beam diameter Db and a MEMS mirror size Dm are in a relationship represented as Dm=Db/cos $\alpha$ with respect to the incidence angle $\alpha$. Thus, when $\alpha$ is 60 degrees, the MEMS mirror size is twice the beam diameter. Such large MEMS mirror cannot perform fast driving, which makes it difficult to achieve high-definition display.

Such increase in size and weight requires a device including a MEMS mirror having a larger driving unit and temples having wider widths W.

In the case of the eyeglass-type image display device shown in FIGS. 40A and 40B, it is possible to reduce the incidence angle $\alpha$ to the MEMS mirror compared to the case of FIGS. 39A and 39B, and therefore, it is possible to reduce the size of the MEMS mirror. When $\alpha$ is 30 degrees, it is only necessary that the MEMS mirror size Dm is 1.15 times the laser beam diameter Db, and this condition is advantageous in fast driving. However, the light source 91 and the folding mirror 95 are arranged outside the MEMS mirror to form an optical path, and thus the horizontal dimensions W of the temples must be great.

The present invention is intended to solve the problem, and has an aim to display an high-quality image at a higher resolution by adjusting, under control, spot sizes of beams that enter a display device according to a laser scanning method such that the wavefront shapes of the beams are properly changed.

The present invention is intended to solve the above-described conventional problem, and has an aim to provide an image display device which can not only process high-definition images moving fast but also perform simplified processing for allowing an observer to visually recognize precise images.

The present invention is intended to solve the above-described conventional problem, and has an aim to prevent eye strain while preventing video blurring by changing the curvature radiuses of the beams while measuring the spot sizes of beams on a user's retina.

The present invention is intended to solve the problem, and has an aim to facilitate fast driving by reducing the sizes of the MEMS mirrors, and implement an eyeglass-type image display device wearing conformity by reducing the horizontal dimensions of the temples.

A beam scanning-type display device according to the present invention includes: a light source which emits a beam; a scanning unit configured to perform scanning using the beam emitted from the light source; a deflecting unit configured to deflect the beam used for the scanning performed by the scanning unit towards an eye of a user; and a wavefront shape changing unit configured to change the wavefront shape of the beam emitted from the light source so that the spot size of the beam falls within a predetermined allowable range, and output the beam to the scanning unit.

Changing a beam wavefront shape with this structure makes it possible to adjust the beam spot size to fall within a predetermined range. As a result, variation in size of pixels in an image is reduced. This provides an advantageous effect of displaying an image having a higher quality and a higher resolution. In addition, it becomes possible to adapt a greater change in wavefront shape in the horizontal direction. This provides advantageous effects of displaying a large image, and implementing an eyeglass-type HMD which allows to arrange a scanning unit and the like at the temple of the user.

The beam scanning-type display device may include a light detecting unit configured to detect a part of the beam used for the scanning performed by the scanning unit, wherein the wavefront shape changing unit is configured to change the wavefront shape of the beam based on a result of the detection performed by the light detecting unit.

As an embodiment, the light detecting unit is configured to detect a reflected light of the beam when the beam enters the eye of the user and is reflected from the cornel of the eye. The beam scanning-type display device includes: a line-of-sight detecting unit configured to detect a line-of-sight direction of the user based on the intensity of the reflected light detected by the light detecting unit; and a visual field position determining unit configured to determine the position of the beam in a visual field of the user, based on the line-of-sight direction detected by the line-of-sight detecting unit. The wavefront shape changing unit is configured to change the wavefront shape of the beam, based on the allowable range which varies depending on the position of the beam determined by the visual field position determining unit.

This structure provides an advantageous effect of reducing image quality deterioration even when a line of sight moves.

In addition, the upper limit of the allowable range may become smaller as the beam becomes closer to the center of a visual field of the user, and may become greater as the beam becomes distant from the center of the visual field of the user. This structure provides an advantageous effect of reducing an operation speed of the wavefront shape changing unit without deteriorating the image quality in the central visual field. Likewise, the structure provides an advantageous effect of implementing an HMD for high image-quality display even when the wavefront shape changing unit is slow to perform an operation.

In addition, the upper limit of the allowable range may be a greater one of a value according to a visual resolution corresponding to the position in the visual field of the user and a value according to a target display resolution in the center of the visual field. This provides an advantageous effect of preventing the user from visually recognizing an image quality deterioration even when the spot size in the peripheral visual field is made greater than a spot size in the central visual field.

As an embodiment, the beam scanning-type display device may include: a spot size determining unit configured to determine a spot size on the retina of the beam entering the eye of the user, based on the result of the detection performed by the light detecting unit, the beam forming a spot having the spot size on the retina, and a beam curvature control unit configured to gradually adjust the curvature radius of the beam by a predetermined value such that the curvature radius is gradually made closer to a target value within a range which allows the spot size determined by the spot size determining unit to fall within a predetermined threshold value.

In addition, the target value of the curvature radius of the o beam is determined as a maximum value within a range which allows the spot size determined by the spot size determining unit to fall within the predetermined threshold value.

With this structure, it is possible to prevent the ciliary body of the eye from becoming tense and reduce eye strain, while id preventing a video to be displayed to the user from blurring.

In addition, the beam curvature control unit is configured to lower the target value in the case where the result of the detection performed by the spot size detecting unit exceeds the threshold value.

With this structure, it becomes possible to adapt the HMD to a user who cannot focus on a distant point due to influence of near sight and the like.

In addition, the beam curvature control unit may be configured to change the curvature radius of the beam only when the variation range of the spot size within a predetermined time period is not greater than a predetermined value.

With this structure, it becomes possible to determine a spot size considering time required for the eye to adjust its crystalline body according to the change in the beam curvature radius.

In addition, the beam scanning-type display device further includes a motion detecting unit configured to detect a body motion change of the user. The beam curvature control unit may be configured to retain the curvature radius when the body motion change outputted through the detection is not less than a predetermined value.

This structure makes it possible to temporarily stop the processing when, for example, it is highly likely that the user is seeing the outside world without watching the displayed video when the user is moving, thereby reducing unnecessary processing.

In addition, the beam curvature control unit may cause an increase in the curvature radius of the beam in an increase period and cause a decrease in the curvature radius of the beam in a decrease period, the increase period and the decrease period are repeated alternately. This structure makes it possible to repeat relaxing and tensing the ciliary body in constantly alternating periods while preventing the displayed video from blurring. As a result, it becomes possible to reduce strain of the ciliary body, and mitigate eye strain.

Further, as another embodiment, the deflecting unit includes a substrate and a hologram mirror formed on at least a part of the substrate. The hologram mirror may include a deflection area for guiding the scanning light from the scanning unit toward the eye of the user, and a reflection body for reflecting a part of the beam outputted by the scanning unit toward the light detecting unit.

With this structure, it is possible to easily configure a small and light optical system for image processing, which makes it possible to make optical adjustments with high precision at high speed. Further, it becomes possible to easily perform processing for allowing the observer to recognize images precisely.

The reflection body may be formed in the deflection area, and the deflection area and the reflection body are multiplexed. With this structure, it is possible to easily configure a small and light optical system for image processing, which makes it possible to make optical adjustments with high precision at high speed. Further, it becomes possible to easily perform processing for allowing the observer to recognize images precisely.

In addition, the reflection body may be formed on at least a part of a peripheral area of the deflection area. With this structure, it becomes possible to make the light deflecting unit thinner, thereby achieving a small, light, and thin HMD. In addition, this makes it possible to make optical adjustments by scanning the surrounding part of the hologram mirror using a part of the scanning light without affecting the video to be displayed.

In addition, the reflection body may output a strongest reflected light when a spot size on the retina is an optimum value. With this structure, it becomes possible to further extend a servo range or further decrease an offset at the time when optical adjustments are made.

In addition, the light source includes: a red laser light source; a blue laser light source; and a green laser light source obtained by combining an infrared laser light source which emits infrared light having a central wavelength ranging from 750 nm to 1500 nm inclusive and a second-harmonic generation (SHG) element which converts a part of the infrared light to green light. The reflection body may be configured to reflect the infrared light.

With this structure, the device does not require a separate servo light source, it is possible to reduce the size, weight, and electric power consumption of the device. In addition, it is possible to arrange the servo light source and the light detecting unit at near positions, and thus it is possible to make optical adjustments in a more stable manner.

In addition, the deflecting unit may include a shielding film which shields infrared light on a surface opposite to a surface, of the substrate, to which the hologram mirror is attached. With this structure, it becomes possible to prevent infrared light from outside an external surface from entering the deflection surface. This further increases the SIN ratio of the infrared light, which makes it possible to perform light detection with high precision.

In addition, the light detecting unit may be configured to separately detect the curvature radiuses of beams, in two directions, vertical to an optical axis and orthogonal to each other, the curvature radiuses being included in the wavefront shape data of the reflected light.

In addition, the light detecting unit may be configured to detect a reflected light resulting from the beam from the scanning unit and reflected from one of the deflecting unit, the cornel of the eye of the user, the retina of the eye, and the iris of the eye. This structure makes it possible to further simplify the optical structure of the deflecting unit.

In addition, the wavefront shape changing unit may include a horizontal component changing unit which changes the wavefront shape of horizontal components of the beam, and a vertical component changing unit which changes the wavefront shape of vertical components of the beam.

This structure provides an advantageous effect of controlling a spot size even when the horizontal components and vertical components of the wavefront shape change differently. This advantageous effect is particularly effective in the case of an optical arrangement where the magnitude of a change in the optical path for a beam in the horizontal direction is different from the magnitude of a change in the optical path for a beam in the vertical direction. This provides an advantageous effect of achieving a thin HMD in which its optical system is disposed on a flat surface.

In addition, the horizontal component changing unit may be configured to change the wavefront shape of the beam more greatly than the vertical component changing unit.

This structure provides an advantageous effect of supporting a case where the wavefront shape changes greatly in the horizontal scanning than in the vertical scanning. In particular, in the case where the scanning unit is disposed at the temple of the user and the deflecting unit is disposed in front of the eye, the structure provides an advantageous effect of implementing an HMD which allows an arrangement where the optical path for the beam changes greatly in the horizontal direction than in the vertical direction. In addition, it is possible to reduce variation at a high-speed axis when a vertical scanning is performed along the high-speed axis of the scanning unit, and a horizontal scanning is performed along a low-speed axis of the scanning unit. Therefore, the structure provides an advantageous effect of implementing an HMD for high image-quality display even when the wavefront shape changing unit is slow to perform the operation.

In addition, the wavefront shape changing unit may be provided with the horizontal component changing unit and the vertical component changing unit arranged in series on an optical path, and may be configured to sequentially change the wavefront shape of the beam.

This structure makes it possible to implement the HMD using a unit for changing the horizontal components only and a unit for changing the vertical components only, instead of using a unit for changing the horizontal and vertical components simultaneously. Therefore, the structure makes it possible to achieve the HMD in a simpler manner and at lower cost.

The wavefront shape changing unit may be configured to change the wavefront shape of the beam more greatly in horizontal scanning performed by the scanning unit than in vertical scanning performed by the scanning unit.

This structure provides an advantageous effect of supporting a case where the wavefront shape changes greatly in the horizontal scanning than in the vertical scanning. In particular, in the case where the scanning unit is disposed at the temple of the user and the deflecting unit is disposed in front of the eye, the structure provides an advantageous effect of implementing an HMD which allows an arrangement where the optical path for the beam changes greatly in the horizontal direction than in the vertical direction. In addition, it is possible to reduce variation at the high-speed axis by performing a vertical scanning along the high-speed axis of the scanning unit, and performing a horizontal scanning along the low-speed axis. Therefore, the structure provides an advantageous effect of implementing an HMD for high image-quality display.

As another embodiment, the beam scanning-type display device is an eyeglass-type image display device. More specifically, the beam scanning-type display device includes: a pair of lenses each including the deflecting unit; a pair of temples each extending backwards from the outer periphery of a corresponding one of the lenses, and provided with at least a corresponding one of scanning units; and folding mirrors each (i) disposed at a position which allows the incidence angle of the beam to the corresponding one of the scanning units to be smaller than the incidence angle of the beam which has been emitted from the light source and directly enters the corresponding one of the scanning units, and (ii) guiding the beam from the light source toward the corresponding one of the scanning units. Each of the folding mirrors may be configured with: a first mirror which is disposed at a position apart from the scanning unit in the temple in a vertical direction, and reflects the beam from the light source; and a second mirror which is disposed at a position closer to the lens than the first mirror, and guides reflected light from the first mirror to the scanning unit.

This structure makes it possible to perform fast driving by reducing the incidence angle to the MEMS mirror which is the scanning unit without increasing the horizontal dimension of the temple, thereby implementing the eyeglass-type image display device which achieves high resolution and wears conformity.

In addition, the deflecting unit may be a hologram mirror and may include: an image reflection area for deflecting the scanning light from the scanning unit in the direction toward the eye of the user; and a folding reflection area which functions as the second mirror. This structure makes it possible to reduce the horizontal dimension to the minimum by eliminating a convex portion extending to the inside of the temple, thereby implementing the eyeglass-type image display device wearing conformity.

In addition, the folding reflection area may have aberration for correcting at least some of aberrations which occur in the deflection area.

In addition, the wavefront shape changing unit may include: a lens which receives the beam emitted from the light source; a mirror which reflects the beam condensed by the lens toward the lens; and a position control unit configured to control the distance between the lens and the mirror.

A beam scanning display method according to the present invention includes: emitting a beam; performing scanning using the beam emitted in the emitting; deflecting the beam used for the scanning performed in the performing scanning; and changing the wavefront shape of the beam emitted in the emitting so that the spot size of the beam falls within a predetermined allowable range, and outputting the beam for the performing scanning.

A program according to the present invention causes a computer to execute: emitting a beam; performing scanning using the beam emitted in the emitting; deflecting the beam used for the scanning performed in the performing scanning; and changing the wavefront shape of the beam emitted in the emitting so that the spot size of the beam falls within a predetermined allowable range, and outputting the beam for the performing scanning.

An integrated circuit according to the present invention includes: a light source which emits a beam; a scanning unit configured to perform scanning using the beam emitted from the light source; a deflecting unit configured to deflect the beam used for the scanning performed by the scanning unit towards an eye of a user; and a wavefront shape changing unit configured to change the wavefront shape of the beam emitted from the light source so that the spot size of the beam falls within a predetermined allowable range, and output the beam to the scanning unit.

It is to be noted that the present invention can be implemented not only as a beam scanning-type display device like this, but also as an integrated circuit which achieves the functions of the beam scanning-type display device, and as a program causing a computer to execute such functions. As a matter of course, such program can be distributed through recording media such as CD-ROMs and communication media such as the Internet. In addition, the present invention can be implemented not only as a data stream generated by the image coding device or generated according to the image coding method, but also as an integrated circuit which achieves the functions of the image coding device.

The beam scanning-type display device according to the present invention can adjust the spot size of a beam deflected by the deflecting unit to a size within a predetermined range by causing the wavefront shape changing unit to change the wavefront shape of the beam. As a result, the spot size falls within the predetermined range. As a result, variation in size of the pixels in an image is reduced. This provides an advantageous effect of displaying an image having a higher quality and a higher resolution. In addition, it becomes possible to adapt a greater change in wavefront shape. This provides an advantageous effect of displaying a large image and an eyeglass-type HMD which allows to dispose a light source at the temple of the user.

In addition, with the beam scanning-type HMD which changes the beam curvature radius while measuring the spot size of the beam on the retina of the user, it becomes possible to prevent eye strain while preventing the resulting video from blurring.

In addition, the present invention can make highly precise optical adjustments at high speed, thereby implementing an image display device which can display a high-definition video at high speed. In addition, use of a reflected light from a reflection body having a reflectance greater than that of a user's retina makes it possible to successfully perform highly precise optical adjustments, thereby stabilizing optical characteristics against influence such as disturbance, shielding of a part of the beams, or the like. As a result, it becomes possible to allow an observer to clearly recognize a precise image.

In addition, with the structure which allows reduction in the thickness of the temple in the horizontal direction to the minimum without increase in the MEMS mirror size, it becomes possible to achieve an eyeglass-type display device which can be constantly used in various daily activities.

BRIEF DESCRIPTION OF DRAWINGS

FIG. 11A is a diagram showing the relationship between spot sizes corresponding to visual resolutions and spot sizes corresponding to target resolutions.

FIG. 11B is a diagram showing an allowable range of spot sizes.

FIG. 11C is a diagram similar to FIG. 11A and showing a case where the scanning range does not match the center of the visual field.

FIG. 12 is a diagram corresponding to an association table showing the relationships between spot sizes, wavefront shapes, and visual field positions in Embodiment 1 according to the present invention.

FIG. 15 is a diagram showing an example of an association table showing the relationships between the curvature radiuses and beam spot sizes in Embodiment 2 according to the present invention.

FIG. 34A is a plan view of a conventional beam scanning-type display device.

FIG. 34B is a side view of the conventional beam o scanning-type display device.

Figure 1B:
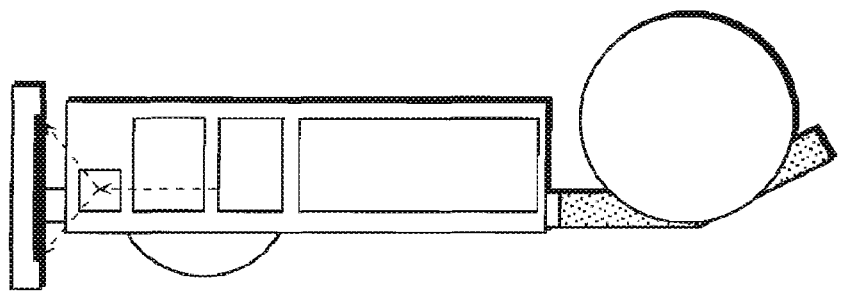
FIG. 1B is a side view of the beam scanning-type display device in Embodiment 1 according to the present invention.

NUMERICAL REFERENCES 10, 30, 50 Image display device
11, 91, 101 Light source
11a Collimater lens
11b Dichroic prism
11R, 211 Red laser light source (R light source)
11G, 213 Green laser light source (G light source)
11B, 212 Blue laser light source (B light source)
12, 12a Laser light
13, 92, 103 Scanning unit
13a Reflection mirror
14, 14a, 14b Scanning light
15 Pupil
16, 93, 104 Deflecting unit
16a Substrate
16b Hologram mirror
16c Deflection surface
16d External surface
16e Shielding film
16f, 51 Servo light generating hologram mirror
16g First reflection hologram mirror
16h Second reflection hologram mirror
17 Iris
17a Reflection body
17b Reflected light
17c, 17d, 19b Spot size
18, 52, 214 Light detecting unit
18a, 22, 23, 53 Light receiving element
18b, 21b Objective lens
18c Aperture
18d Diffraction grating
18f, 18g Diffracted light
18h Infrared laser light source
19, 88 Eye
19a, 1204 Retina
19c Focus position
20, 94, 105 Control unit
20a Beam shape adjusting unit
20b Servo mirror
21 Optical path length adjusting unit
21a Prism
22a, 22b, 22c, 23a, 23b, 23c Light receiving unit
31 Arrow
32, 32a, 32b Beam scanning direction
33 Beam deflection area
34 Servo light generating area
51a Hologram pattern
55 Apparent light emitting point
81 Eyeglass-type image display device
82 Eyeglass lens
83 Lens frame
84 Temple
85 Aperture
86 Laser beam
87 Image reflection area
89 External device
95, 96, 2202 Folding mirror
97 Scanning center axis
98 Folding reflection area
102 Wavefront shape changing unit
103a Mirror unit
103b Frame body
103c, 103d Axis part
106 Headphone unit
201, 2101 Focal length horizontal component changing unit
202, 2102 Focal length vertical component changing unit
203 Cylindrical lens
203a Flat surface
203b Curved surface
203c, 203d End surface
204 Mirror
401 Deflecting unit supporting unit
501 Central processing unit
502 Memory unit
503 Input/output control unit
520 Communication unit
531 Line-of-sight detecting unit
532 Visual field position determining unit
1201, 2006 Eyeball
1202 Crystalline lens
1203 Ciliary body
1205 incident light
1301 Object
1501 Spot size determining unit
1502 Beam curvature control unit
2001 Car
2002 Laser scanning unit
2003 Windshield
2004 Half mirror
2005 Driver 2007 Ceiling
2008 Supporting bar
2201 Monocular
2203 Camera
2301 Display
2302 Desk

DETAILED DESCRIPTION OF THE INVENTION

Embodiments of the present invention will be described below with reference to the drawings.

(Embodiment 1)

Figure 1A:
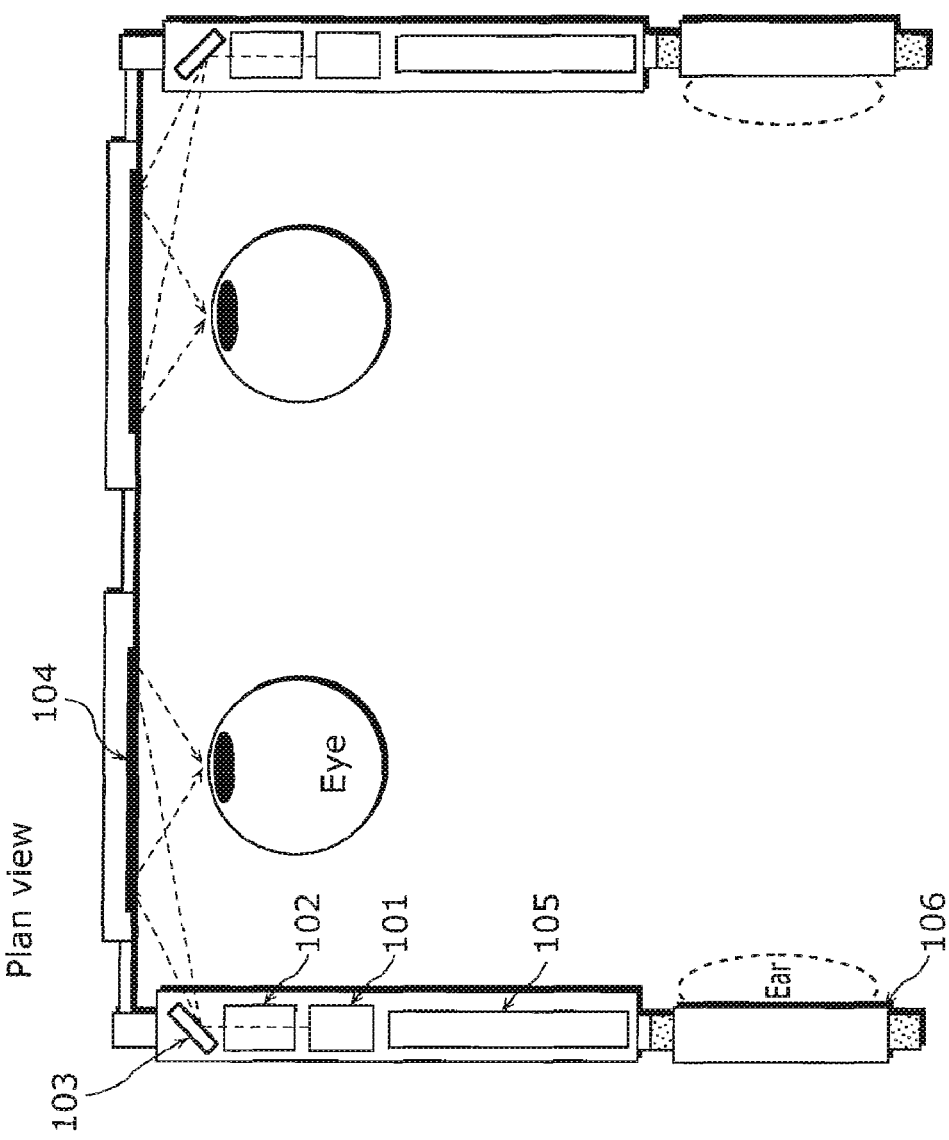
FIG. 1A is a plan view of a beam scanning-type display device in Embodiment 1 according to the present invention.
Figure 2:
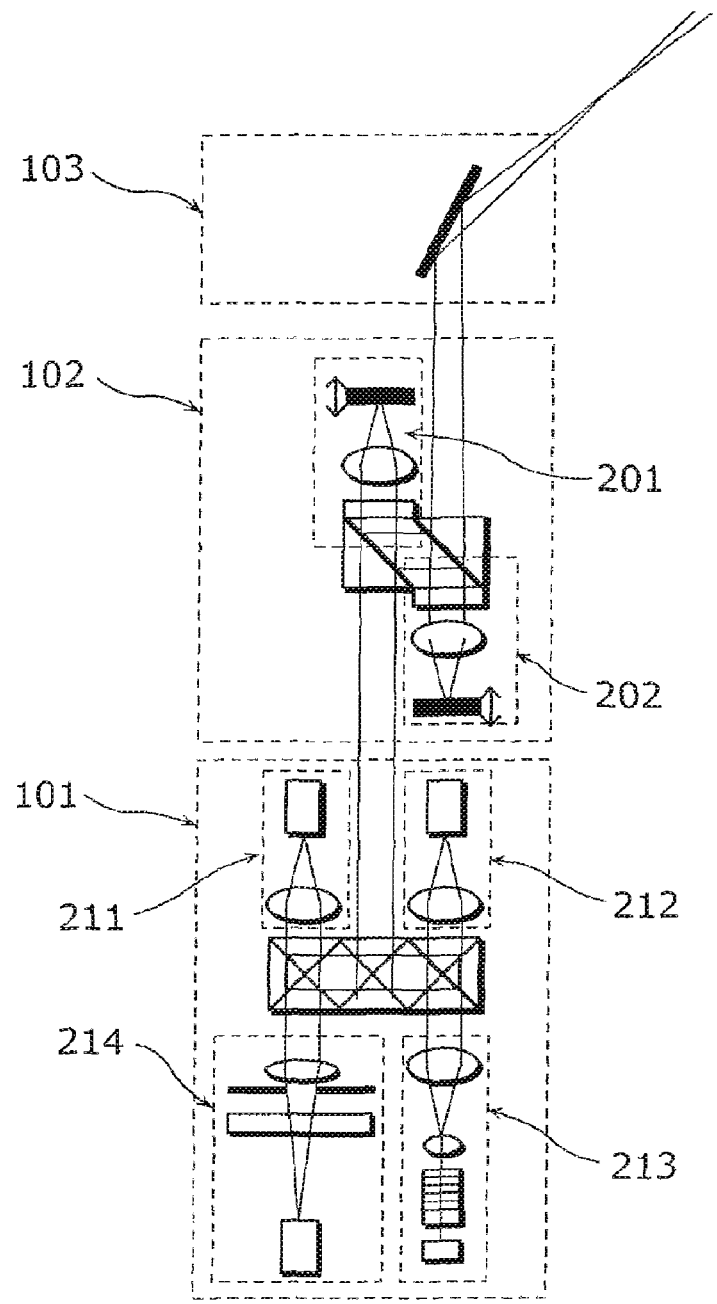
FIG. 2 is a diagram showing a detailed structure of the beam scanning-type display device in Embodiment 1 according to the present invention.
Figure 3:
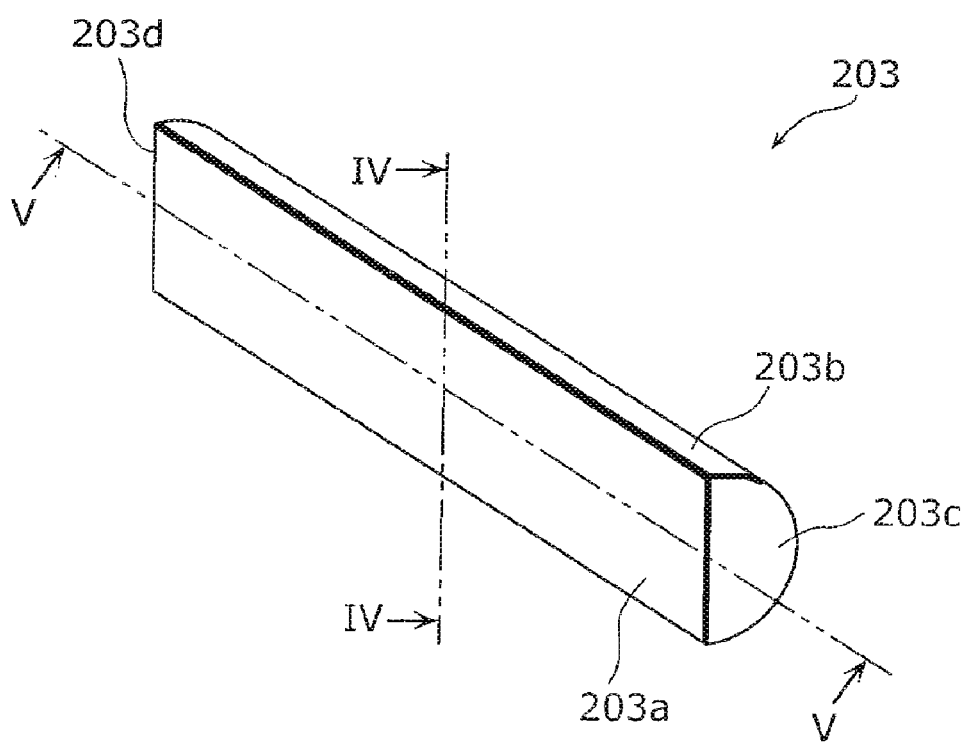
FIG. 3 is a perspective view showing the structure of a cylindrical lens.
Figure 4:
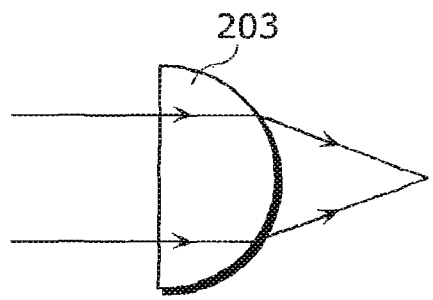
FIG. 4 is a cross-sectional view of FIG. 3 when cut along a line IV.
Figure 5:
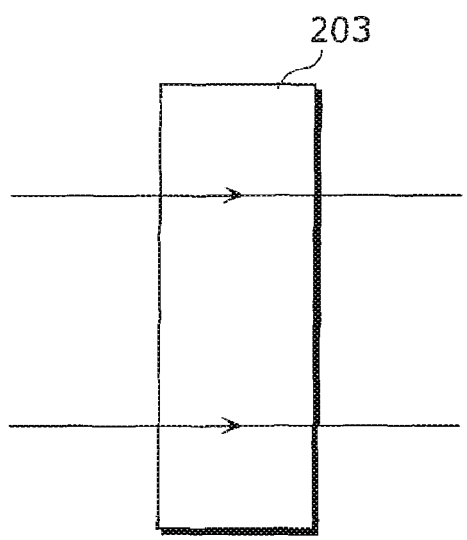
FIG. 5 is a cross-sectional view of FIG. 3 when cut along a line V.
Figure 6:
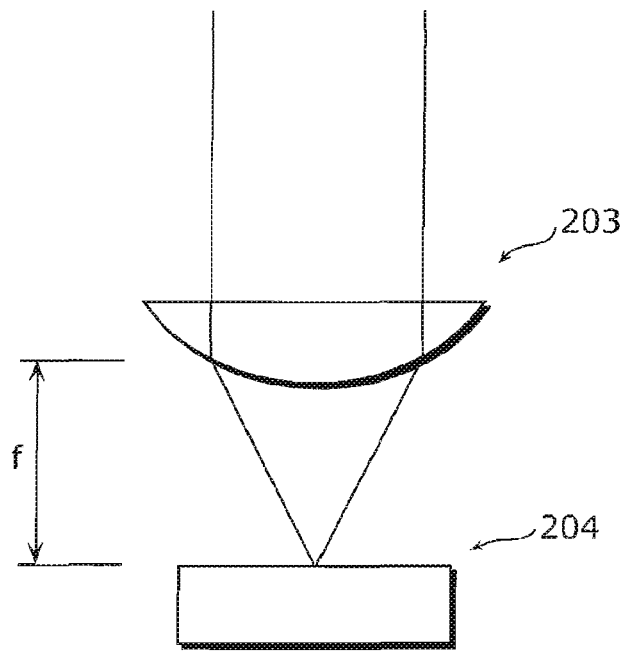
FIG. 6 is a diagram showing a state where the distance between the cylindrical lens and a mirror in a wavefront curvature changing unit matches the focal length of the cylindrical lens.
Figure 7:
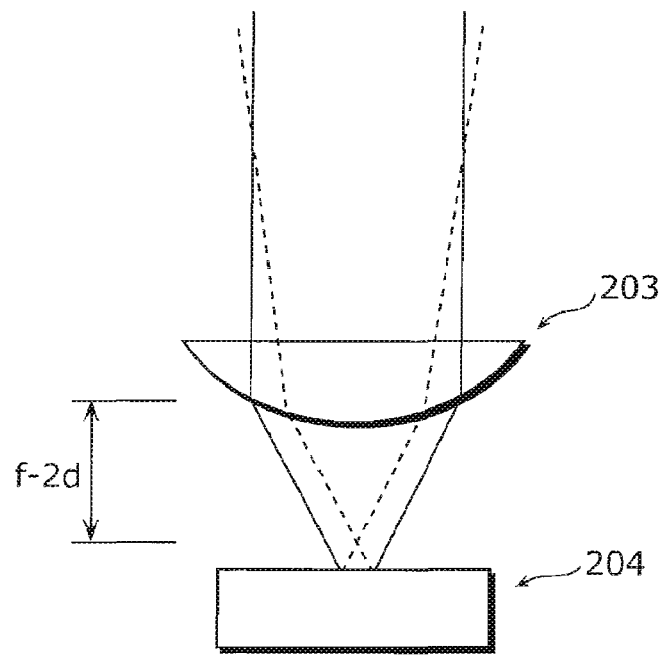
FIG. 7 is a diagram showing a state where the distance between the cylindrical lens and the mirror in the wavefront curvature changing unit is shorter than the distance that matches the focal length of the cylindrical lens.
Figure 8:
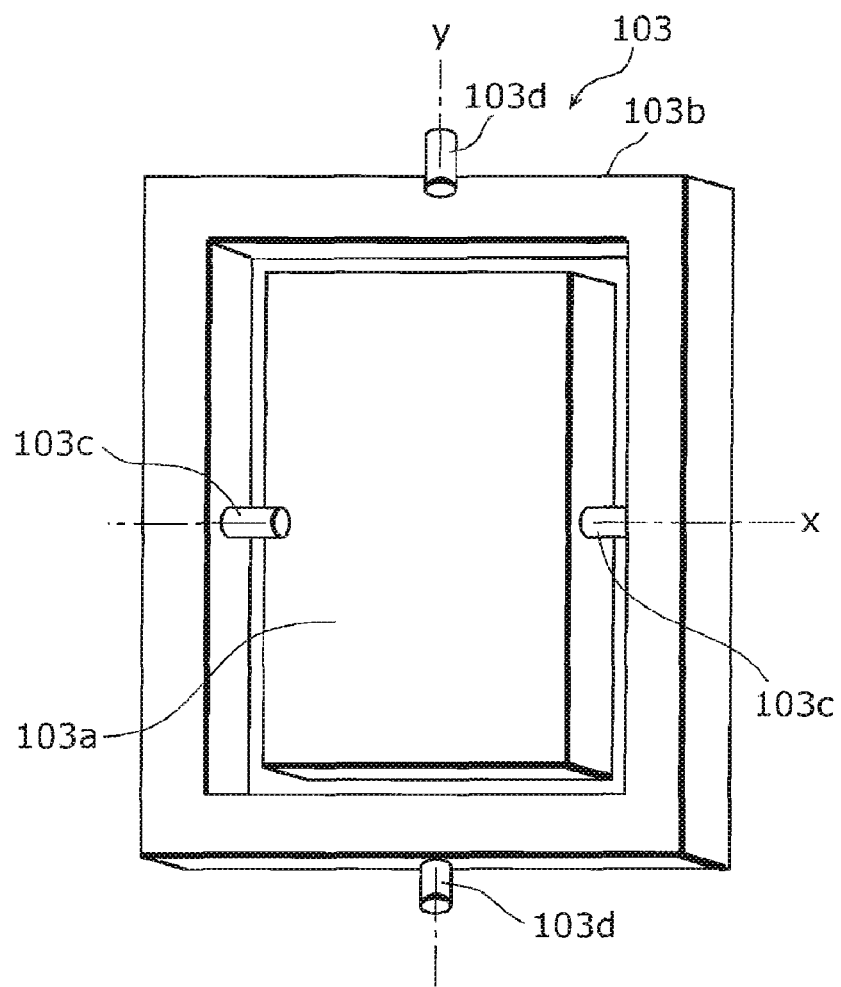
FIG. 8 is a perspective view showing the structure of a scanning unit.
Figure 9A:
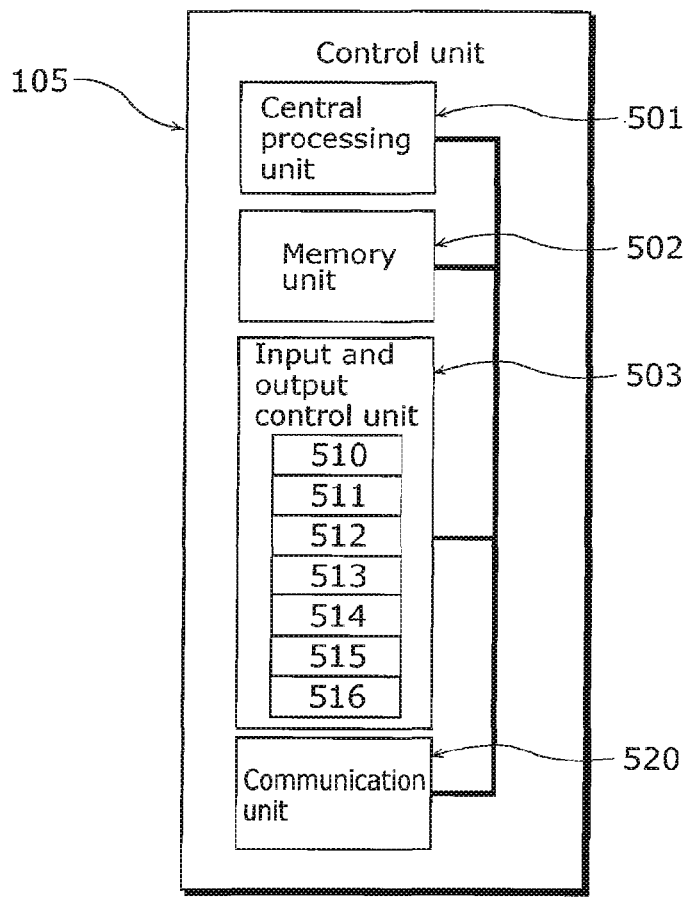
FIG. 9A is a block diagram of a beam scanning-type display device.
Figure 9B:
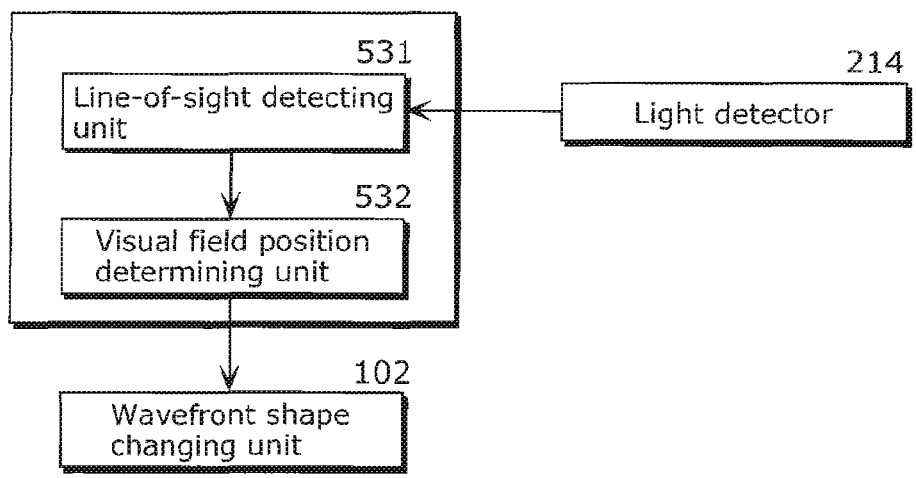
FIG. 9B is a diagram showing a detailed structure of a central processing unit in FIG. 9A in Embodiment 1 according to the present invention.

With reference to FIG. 1A to FIG. 9B, a beam scanning display device of Embodiment 1 according to the present invention is described. FIG. 1A is a structural diagram (a plan view) of an eyeglass-type head-mounted display (HMD) in Embodiment 1 according to the present invention, and 1B is a structural diagram (a side view) of the same. FIG. 2 is a diagram showing some parts of FIG. 1A in detail. Each of FIG. 3 to FIG. 5 is a diagram illustrating the shape and a function of a cylindrical lens. Each of FIG. 6 and FIG. 7 is a diagram illustrating a function of a wavefront shape changing unit. FIG. 8 is a diagram showing the structure of a scanning unit. Each of FIGS. 9A and 9B is a control block diagram of the HMD.

As shown in FIGS. 1A and 1B and FIG. 2, the beam scanning-type display device has frame parts in each of which a light source 101, a wavefront shape changing unit 102, a scanning unit 103, a control unit 105, and a headphone unit 106 are arranged, and has lenses in each of which a deflecting unit 104 is disposed. In FIGS. 1A and 1B, only the left part of the eyeglass is assigned with reference numerals, and reference numerals for the right part are omitted.

The light source 101 emits a beam. As shown in FIG. 2, the emitted beam is a laser light obtained by synthesizing laser lights emitted from a red laser light source 211, a blue laser light source 212, and a green laser light source 213. A proper modulation of the outputs from the respective laser light sources makes it possible to emit a laser light having an arbitrary color. Further, modulation implemented by causing a later-described wavefront shape changing unit 102 and scanning unit 103 to cooperate with each other makes it possible to form an image on a retina of a user.

In FIG. 2, the green laser light source 213 which emits a green beam is a combination of a semiconductor laser light source which emits infrared rays and a second-harmonic generation (SHG) element which converts the infrared rays to a green laser light. However, this may be replaced with a semi-conductor laser light source which emits a green laser light. Each of the light sources may be either a solid laser, a liquid laser, a gas laser, or a light emitting diode.

In FIG. 2, a laser light is modulated by each of the laser light sources. However, it is to be noted that a laser light may be modulated by each of combinations of a laser light source which emits a light and a unit for modulating the light emitted from the laser light source.

The light source 101 may include a light detecting unit 214 in FIG. 2. The light detecting unit 214 in Embodiment 1 can detect the line of sight of the user by detecting the intensity of a reflected light from a cornet of the user. The intensity of the reflected light from the user's cornet changes depending on the incidence angle on the surface of the cornet. More specifically, the reflectance of a beam entering vertically on the surface of the cornet is relatively high, and the reflectance of a beam entering obliquely on the surface of the cornel is relatively low. The light detecting unit 214 can detect the line-of-sight direction of the user by detecting the intensity of each reflected light.

The wavefront shape changing unit 102 changes the wavefront shape of the beam from the light source 101 such that the spot size of the beam deflected by a later-described deflecting unit 104 falls within a predetermined range.

A "spot size" of a beam, which is described later as a spot size on the user's retina, may be a spot size on the user's iris or cornel, or a spot size on a deflecting unit 104. The spot size on the retina is the same as the size of a pixel to be displayed. The "wavefront shape" is a three-dimensional shape of a beam wavefront, and may be a flat surface, spherical surface, or non-spherical surface.

As shown in FIG. 2, the wavefront shape changing unit 102 includes a focal-length horizontal component changing unit (horizontal component changing unit) 201 and a focal-length vertical component changing unit (vertical component changing unit) 202 arranged in series on an optical path. Therefore, the wavefront shape changing unit 102 can change curvature radiuses of the wavefront shape in the horizontal direction and the vertical direction separately.

Each of the focal-length horizontal component changing unit 201 and the focal-length vertical component changing unit 202 includes a cylindrical lens 203 which condenses a beam emitted from the light source 101, and a mirror 204 which reflects the beam condensed by the cylindrical lens 203 toward the cylindrical lens 203.

Each of the focal-length horizontal component changing unit 201 and the focal-length vertical component changing unit 202 changes the curvature radius of the beam by changing the distance between the cylindrical lens 203 and the mirror 204. The distance between the cylindrical lens 203 and the mirror 204 is controlled by a control unit 105 which functions as a position control unit.

Here, the mechanism of the wavefront shape changing unit 102 is described with reference to FIG. 3 and FIG. 7. FIG. 3 is a perspective view of the cylindrical lens 203. FIG. 4 is a cross-sectional view of the cylindrical lens 203 when cut along the line IV in FIG. 3. FIG. 5 is a cross-sectional view of the cylindrical lens 203 when cut along the line V in FIG. 3. FIG. 6 is a diagram showing the state where the distance between the cylindrical lens 203 and the mirror becomes equal to the focal length f of the cylindrical lens 203. FIG. 7 is a diagram showing the state where the mirror 204 is made closer, from the position shown in FIG. 6, to the cylindrical lens 203 by a distance d.

As shown in FIG. 3, the cylindrical lens 203 has a shape obtainable by cutting a cylinder on a flat surface vertical to the bottom surface, and includes a flat surface 203a corresponding to the cut surface, a curved surface 203b corresponding to a side surface of the cylinder, and a pair of end surfaces 203c and 203d corresponding to the bottom surface and upper surface of the cylinder. The wavefront shape changing unit 102 is provided with the cylindrical lens 203 such that a beam enters through the flat surface 203a side.

Next, as shown in FIG. 4, beam components parallel to the pair of end surfaces 203c and 203d (the flat surface IV of FIG. 3) in the beam passing through the cylindrical lens 203 refract according to the curvature of the curved surface 203b. On the other hand, as shown in FIG. 5, beam components vertical to the pair of end surfaces 203c and 203d (the flat surface V of FIG. 3) pass through without refraction.

The focal-length horizontal component changing unit 201 is configured such that the pair of end surfaces 203c and 203d face upward and downward (such that the the flat surface IV is parallel to the horizontal direction). On the other hand, the focal-length vertical component changing unit 202 is configured such that the pair of end surfaces 203c and 203d face leftward and rightward (such that the flat surface IV is vertical to the horizontal direction).

Next, as shown in FIG. 6, in the case where the distance between the cylindrical lens 203 and the mirror 204 becomes equal to the focal length f of the cylindrical lens 203, the parallel incident lights (each having an infinite curvature radius) to the cylindrical lens 203 are refracted to focus on the surface of the mirror 204. The beam reflected by the mirror 204 is re-refracted by the cylindrical lens 203 and is outputted as a parallel light (collimated).

On the other hand, as shown in FIG. 7, in the case where the mirror 204 is moved by a distance d such that the distance between the cylindrical lens 203 and the mirror 204 becomes shorter than the focal length f of the cylindrical lens 203, the parallel incident lights (shown by solid lines in FIG. 7) to the cylindrical lens 203 does not focus on the surface of the mirror 204. The parallel incident lights are reflected by the mirror 204 to focus at a position apart from the mirror 204 by the distance d (in other words, the position apart from the cylindrical lens 203 by f-2d). This beams do not return to parallel lights even after the re-passing through the cylindrical lens 203, and are outputted (without being collimated) as diffused lights (shown by broken lines in FIG. 7) having a predetermined curvature radius.

In other words, the curvature radius of each beam outputted from the wavefront shape changing unit 102 becomes greater as the distance between the cylindrical lens 203 and the mirror 204 becomes closer to the focal length f. On the other hand, the curvature radius of each beam outputted from the wavefront shape changing unit 102 becomes smaller as the distance between the cylindrical lens 203 and the mirror 204 becomes more distant from the focal length f.

As described above, it is possible to change the curvature radius of the beam by changing the distance between the cylindrical lens 203 and the mirror 204 as necessary. It is to be noted here that both the focal length horizontal component changing unit 201 and the focal length vertical component changing unit 202 change the diameter of the beam together with the change in the curvature radius.

The beam incident surface of the cylindrical lens 202 shown in FIG. 3 is the flat surface (a flat surface part 203a), but the beam incident surface may be a convex surface or a concave surface.

In addition, changing the horizontal curvature greatly than the vertical curvature makes it possible to follow a greater change in the horizontal direction. This is particularly effective in the case where a horizontal visual field angle within an image is desired to be greater than a vertical visual field angle within the image and in the case where a horizontal incidence angle of a beam from a scanning unit to a deflecting unit (described later) is greater than a vertical incidence angle of the beam, as in the case of an HMD which allows to arrange a scanning unit (described later) at the temple of the user.

In FIG. 2, changed data items among the data items indicating wavefront shapes are only the horizontal curvature radius and the beam diameter, and the vertical curvature radius and the beam diameter. However, there may be a unit which changes other data items such as a distribution of curvatures within the wavefront, and the shapes and sizes of the wavefront ends.

The wavefront shape changing unit 102 of FIG. 2 changes the wavefront shape using the cylindrical lenses 203 and the mirrors 204. The wavefront shape changing unit 102 may further use, as other means, shape-variable lenses such as liquid crystal lenses and liquid lenses, diffraction elements, and electro-optic (EC)) elements. The scanning unit 103 performs two-dimensional scanning with the beam outputted from the wavefront shape changing unit 102. The scanning unit 103 is a small single-plate mirror which can change an angle in a two-dimensional manner, and called micro-electro mechanical system (MEMS) mirror.

As shown in FIG. 8, the scanning unit 103 is structured with a combination of a mirror unit 103a which can rotate about the x axis and a frame body 103b which can rotate about the y axis perpendicular to the x axis. More specifically, the mirror unit 103a is rotatably attached inside the frame body 103b fixed by axis parts 103c extending in the x axis direction. In addition, the frame body 103b is rotatably attached inside a supporting member (not shown in the drawings) fixed by axis portions 103d extending in the y axis direction.

With the above-described structure, the mirror 103a can rotate about the axis parts 103c with respect to the frame body 103b. Likewise, the frame body 103b can rotate about the axis portions 103d with respect to the supporting member. When the frame body 103b rotates about the y axis, the mirror 103a also rotates in an integrated manner. As a result, the scanning unit 103 can perform two-dimensional scanning using beams.

It is to be note that the scanning unit 103 may be implemented as a combination of two or more kinds of scanning units such as a scanning unit for horizontal scanning and a scanning unit for vertical scanning. In addition, the use of the scanning unit is not limited to a method in which a mirror is physically tilted. The scanning unit is also applied in a method in which lenses are moved and/or deflection elements are rotated, and a method in which shape-variable lenses such as liquid lenses, and/or deflection elements such as acoustooptic (AO) elements and electro-optic (EO) conversion elements are used.

The deflecting unit 104 deflects the beam used for the scanning performed by the scanning unit 103 in the direction toward the user's eye. The deflecting unit 104 is configured to have a photopolymer layer in which a Lippmann volumetric hologram or the like is formed inside the eyeglass lens (toward the user's eye) such that the beam from the scanning unit 103 is diffracted and condensed to the user's iris.

In the photopolymer layer, three holograms which reflect red, green and blue lights from light sources may be formed in a multiplexed manner, or three holograms corresponding to the respective color lights may be laminated. In addition, it is possible to configure a see-through display by diffracting only lights having a light source wavelength and not diffracting lights having a wavelength other than the light source wavelength using the wavelength selectivity of the holograms. Almost all the lights from outside are the later.

It is to be noted that the deflecting unit 104 is not limited to a diffraction element such as a hologram, and may be a mirror such as a concave mirror or a lens such as a convex lens. In addition, the deflecting unit 104 supports a method in which some of diffused lights from a screen, for example, a reflection screen or a see-through screen, is deflected toward the user's eye as the result that the beam is diffused at the screen.

The control unit 105 includes an integrated circuit which controls the respective parts of the HMD. As shown in FIGS. 9A and 9B, the control unit 105 may include a central processing unit 501, a memory unit 502, and an input and output control unit 503.

The central processing unit 501 operates as a line-of-sight detecting unit 531, a visual field position determining unit 532 or the like. The memory unit 502 stores data used by the control unit 105. In Embodiment 1, the following are stored: a table indicating the relationships between visual field positions and beam spot sizes shown in FIG. 11B; a table indicating the relationships between beam spot sizes on the user's retina, the wavefront shapes of beams outputted from the wavefront shape changing unit 102, and visual field positions; and other various kinds of information shown in FIG. 12.

The input and output control unit 503 controls outputs of control signals to units as control targets and inputs of signals from the units. The units include the light source 101, the wavefront shape changing unit 102, and the scanning unit 103. More specifically, the input and output control unit 503 may include, for each kind of objects to be controlled, a light source input and output control unit 510, a wavefront-shape-change information input and output control unit 511, a scanning information input and output control unit 512, a deflection information input and output control unit 513, a headphone information input and output control unit 514, an electric power information input and output control unit 515, and a communication information input and output control unit 516. The input and output control unit 503 causes execution of input and output processing, which provides an advantageous effect of lowering the processing load on the central processing unit 501.

The central processing unit 501 executes information processing by exchanging signals with the memory unit 502 and the input and output control unit 503. The control method will be described in detail in later descriptions of operations.

The control unit 105 may include a communication unit 520 which receives video and audio signals when a wireless connection is established with peripheral devices such as a mobile phone. The control unit 105 may include a memory storing images to be presented to the user, or may obtain the images to be presented to the user from an external device through the wireless communication. The wireless connection between the HMD and a peripheral device provides an advantageous effect of increasing wearablity when the HMD is mounted.

The headphone unit 106 includes a speaker which outputs audio. The headphone unit may include battery which supplies electric power to the respective units of the HMD.

The respective units in FIG. 1A may be embedded in a single HMD, but does not need to be embedded in the single HMD. For example, all the respective units in FIG. 1A may be included in the is single HMD, and the headphone units 106 do not need to be included in the single HMD. The respective units may be arranged dispersedly. For example, some parts of the control unit 105 may be included in the scanning unit 103 or the wavefront shape changing unit 102. Each of the respective units in FIG. 1A may be plural. For example, two scanning units 103 for left and right eyes of a user may be included. Three wavefront shape changing units 102 for red, green, and blue may be included. Plural devices may share each of the units in FIG. 1A. For example, two HMDs may share each of the laser light sources 211, 212, and 213.

The beam scanning-type display device configured as described above changes the wavefront shape of the beam from the light source 101 such that the spot size of the beam falls within a predetermined allowable range. More specifically, the beam scanning-type display device determines the wavefront shape of the beam to be outputted next using the pre-stored visual field position detected by the light detecting unit 214, and the relationship between the pre-stored allowable range of spot sizes (FIG. 11B), the wavefront shape, and the spot size (FIG. 12).

Next, operations of the beam scanning-type display device are described in detail.

Figure 10:
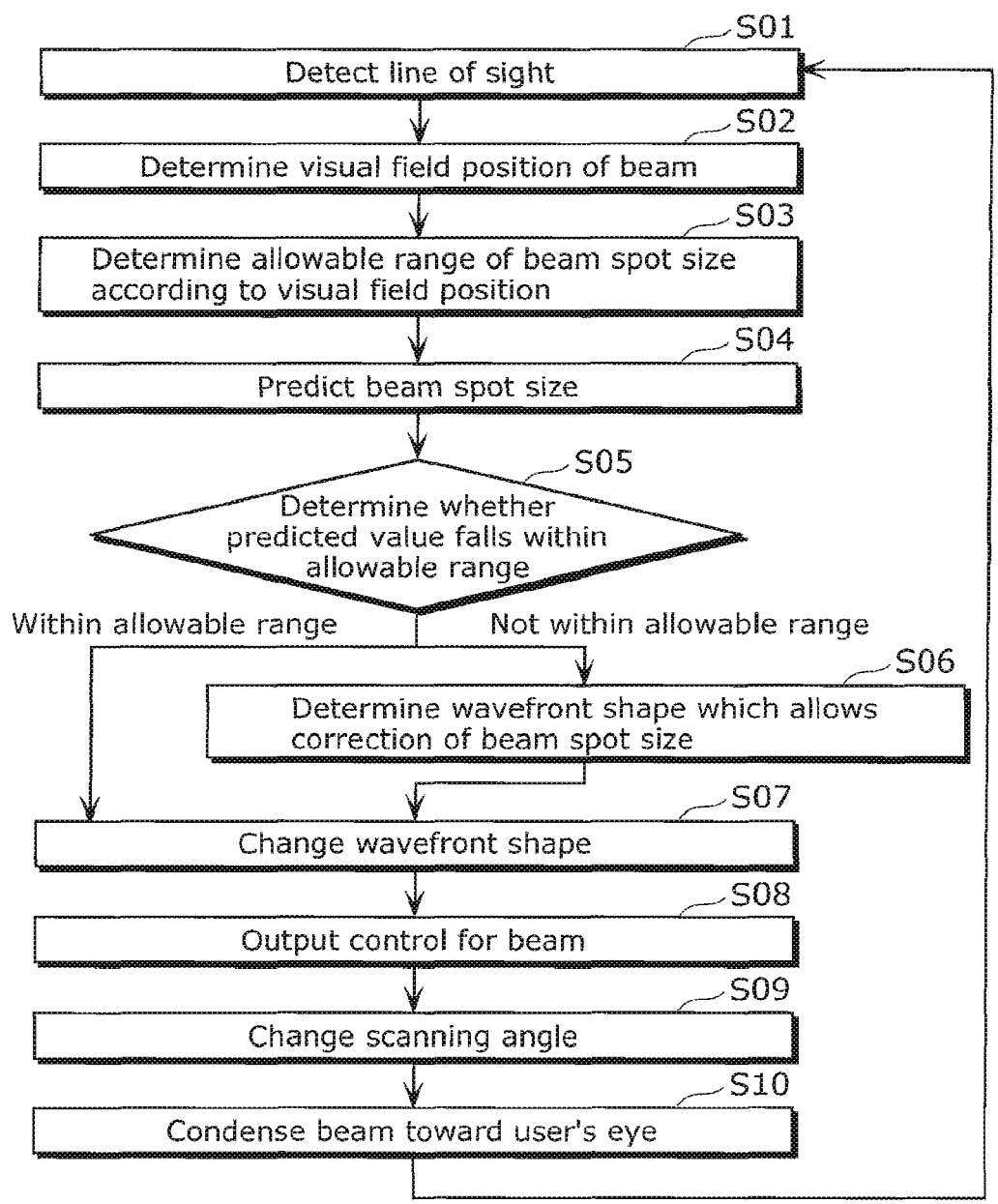
FIG. 10 is a flowchart of operations of the beam scanning-type display device in Embodiment 1 according to the present invention.

FIG. 10 shows that the beam scanning-type display device shown in FIGS. 1A and 1B performs operations for controlling spot sizes of beams by changing the wavefront shapes of the beams. Here, a description is given of how a pixel constituting a video to be displayed is drawn on the user's retina in a proper size.

(Step S01) The light detecting unit 214 detects the intensity of a reflected light from the user's eye. A transition is made to an operation in Step S02. When an incident beam enters the user's eye from the front face, a reflected light having a great intensity can be detected.

The intensity of the reflected light from the user's eye may be represented as a ratio between the intensity of the emitted light modulated by the light source and the intensity of the reflected light detected by the light detecting unit 214. In addition, invisible lights, such as infrared rays, having a constant intensity may be used for the scanning, and the reflected light may be detected.

(Step S02) The control unit 105 determines the position of the pixel which is in a visual field and displayed by the beam outputted previously, using the reflected light intensity detected in Step S01 (hereinafter, the position is referred to as "visual field position"). More specifically, the line-of-sight detecting unit 531 detects the line-of-sight direction of the user based on the reflected light intensity detected in Step S01. Next, the visual field position determining unit 532 determines the position of the beam in the visual field of the user using the detected line-of-sight direction. The visual field position determining unit 532 determines the visual field position of the beam to be outputted next at the same time. A transition to an operation in Step S03 is made.

The center position of the visual field means the position of the user's line of sight, and is referred to as "the center of the visual field" hereinafter. The "central visual field" means the visual field around the center of the visual field, and is used in comparison with "peripheral visual field" which means the peripheral area of the visual field.

When a reflected light having a great intensity from the front face of the user's eye is detected, it can be determined that the previously-outputted beam results in display of a pixel positioned in the center of the visual field. In addition, the positions of the parts other than the center of the visual field are determined based on the differences in scanning angle and scanning pattern in the scanning unit 103 between the parts and the center of the visual field. The visual field positions may be determined based on the intensity or a change in the intensity of the reflected light, or may be calculated based on time elapsed from the time point of the detection of the center of the visual field.

The visual field positions of the beam to be outputted next may be approximated to the visual field position of the beam outputted previously, and may be calculated based on data such as the scanning angle and scanning pattern from the scanning unit 103 or based on time elapsed from the time point of the detection of the center of the visual field.

A visual field position of a beam can be represented in form of two values indicating a horizontal angle and a vertical angle. It is assumed that the center of the visual field is 0 degrees. As for the horizontal angle, the left side of the visual field can be represented using a minus angle, and the right side of the visual field can be represented using a plus angle. As for the vertical angle, the lower side of the visual field can be represented using a minus angle, and the upper side of the visual field can be represented using a plus angle. For example, the center of the visual field can be represented using a horizontal angle of 0 degrees and a vertical angle of 0 degrees, and a point present in an upper-right peripheral visual field can be represented as having a horizontal angle of +40 degrees and a vertical angle of +30 degrees.

It is to be noted that, when no reflected light is detected in Step S01, predetermined values may be used to represent the visual field position. For example, in the case where no beam is outputted first and thus no reflected light can be detected, the visual field position may be determined as the center of the visual field or the like as the initial value.

It is to be noted that, in the case of an HMD not provided with a light detecting unit 214, the visual field position may be determined assuming that the line of sight is in front of the user's head.

(Step S03) The control unit 105 determines the allowable range of the beam spot size according to the visual field position (determined in Step S02) of the beam to be outputted next. A transition to an operation in Step S04 is made.

As shown in FIG. 11A, the visual resolutions of a human eye are higher in portions closer to the center of the visual field, and are lower in portions more distant from the center of the visual field. On the other hand, the spot sizes corresponding to target resolutions are constant irrespective of visual field positions. As a result, the relationship between the spot sizes corresponding to the visual is resolutions and the spot sizes corresponding to the target resolution is inversed between the central visual field and the peripheral visual field.

In other words, in the central visual field, the allowable range of spot sizes are calculated based on the target display resolution. However, since the visual resolutions in the peripheral visual field are lower than those in the central visual field, a spot size in the peripheral visual field may be greater than that in the central visual field to some extent because the user's eye cannot recognize the difference (FIG. 11A).

Accordingly, the allowable range of a spot size varies depending on whether a pixel to be displayed using a beam to be outputted next is drawn in the central visual field or in the peripheral visual field (in other words, depending on the visual field position). The allowable range is determined by a lower limit and an upper limit as shown in the shaded portions enclosed by bold lines in FIG. 11B.

The lower limit of the allowable range is determined according to the size corresponding to the target display resolution in the central visual field. On the other hand, the upper limit of the allowable range is determined based on the larger one of the size according to the visual resolution corresponding to the position in the visual field (in the case of the peripheral visual field) and the size corresponding to the target display resolution in the central visual field (in the case of the central visual field). In other words, as shown in FIG. 11B, the upper limit of the allowable range becomes smaller as the beam becomes closer to the center of the visual field of the user, and thus the upper limit of the allowable range becomes greater as the beam becomes more distant from the center of the visual field of the user.

It is to be noted that, as shown in the bold lines (line widths) in FIG. 11B, the allowable range may be extended by taking into consideration a predetermined shift in each of the upper limit and the lower limit.

In the case where a size is too small like a point B1 in FIG. 11B, the size needs to be made larger. In the case where a size is too big like a point B2 or a point B3 in FIG. 11B, the size needs to be made smaller. The point B3 and a point B4 are the same in size but different in visual field position, and therefore it is not necessary to change the size of the point B4.

The visual field position changes with a line-of-sight movement (eyeball rotation), and thus the allowable range of spot sizes changes even when a scanning angle of the scanning unit 103 is constant. In FIG. 11A, the center of a scanning range matches the center of the visual field. However, in FIG. 11C, the center of a scanning range is slightly shifted to the peripheral visual field, and thus the allowable range of spot sizes changes accordingly.

The visual field range along the horizontal axis of each of the diagrams of FIGS. 11A to 11C can be applied in both directions of a horizontal display direction and a vertical display direction. Compared to the central visual field, the allowable range of the upper and lower peripheral area extends in the same manner that the allowable range of the right and left peripheral area extends.

As the result that the allowable range of a beam spot in the peripheral visual field extends compared to the central visual field, the operation speed of the wavefront shape changing unit 102 may be decreased. This reduces the problem that the spot size changing speed cannot follow the scanning speed.

For example, a problem of size variation occurs in the case where a scanning speed of the scanning unit 103 in the vertical direction is faster than an operation speed for spot size control accompanied by the scanning in the vertical direction. Even in the case where the spot size changing speed is slow as in this case (or is not changed), a spot size may fall within the allowable range because the allowable range of a spot size is large in the peripheral visual field.

It is to be noted that the allowable range changes in the case where the line of sight moves upward and downward, which necessitates that a size is changed at a speed so as to follow a line-of-sight movement. The size is yet valid in the case where the scanning speed in the vertical direction is faster than the line-of-sight movement.

(Step S04) The control unit 105 predicts a beam spot size. A transition is made to an operation in Step S05. A predicted spot size is calculated by checking the visual field position calculated in Step S02 and the wavefront shape from the wavefront shape changing unit 102 with reference to the "Association table for Spot size—Wavefront shape—Visual field position".

For example, see Row 1 of FIG. 12. The wavefront shape in the center of the visual field (horizontal angle: 0 degrees, vertical angle: 0 degrees) is represented as 36 mm in the horizontal focal length, 29 mm in the vertical focal length, 2.4 mm in the horizontal diameter, and 1.6 mm in the vertical diameter. In addition, the beam spot size on a user's retina in this visual field position can be predicted to be 0.035 in the horizontal size and 0.027 mm in the vertical size.

In the association table illustrated as FIG. 12, specific numerical values are written in three rows only, but in reality, specific numerical values are written in a necessary number of rows.

In addition, there is no row composed of completely matching numerical values in the association table in FIG. 12, a spot size may be predicted with reference to a row composed of close numerical values. In contrast, there are plural rows composed of matching numerical values, a spot size may be predicted with reference to one of the rows.

In addition, instead of using the association table like FIG. 12, it is also good to predict a spot size by preparing an expression for calculation of a spot size, substituting values such as a wavefront shape and visual field position in the expression.

Further, the values in the association table of FIG. 12 need to be changed because a line-of-sight movement (an eyeball rotation) changes the positional relationships between the eyeball and the deflecting unit 104, the scanning unit 103 or the like. The changing operation may be performed at a timing in Step S04 before reference to the association table, or may be performed at a timing in Step S01 where a line-of-sight position has been detected or at a timing in Step S02.

The changing method may be a method for preparing, in advance, plural association tables corresponding to the amounts of line-of-sight movements and selecting a proper association table according to a line-of-sight movement, and may be a method for preparing an expression with which an association table is obtained by substituting a line-of-sight movement amount in the expression and calculating a spot size using the expression.

It is to be noted that the operation in Step S03 and the operation in Step S04 may be performed in an inversed order, or at the same time.

(Step S05) The control unit 105 compares the predicted spot size calculated in Step S04 and the allowable range calculated in Step S03. When the predicted values indicate that the spot size is not within the allowable range, a transition is made to an operation in Step S06. When the predicted values indicate that the spot size is within the allowable range, a transition is made to an operation in Step S07.

In the cases where one of the values indicating that the spot size is not within the allowable range, such as a case where one of the horizontal size and vertical size of the spot size is within the allowable range and the other one is not within the allowable range, the spot size is regarded as not within the allowable range, and a transition is made to the operation in Step S06.

(Step S06) The control unit 105 determines a proper wavefront shape with reference to FIG. 12 such that the beam spot size falls within the allowable range calculated in Step S03. A transition is made to the operation in Step S07. The control unit 105 calculates the wavefront shape checking the association table shown in FIG. 12 for the spot size within the allowable range calculated in Step S03 and the visual field position calculated in Step S02.

For example, when the horizontal angle of the visual field position is −30 degrees and the vertical angle is 0 degrees, the lower limits within the allowable range of a spot size calculated in Step S03 are 0.035 mm in horizontal size and 0.027 mm in vertical size. On the other hand, it is assumed that the predicted spot size values of the spot at the visual field position calculated in Step S04 are 0.018 mm in horizontal size and 0.019 mm in vertical size. In this case, the predicted spot size values of the spot is smaller than the lower limit of the allowable range, and thus the spot size needs to be increased up to the lower limit value or more.

This shows that changing a wavefront shape into a wavefront shape having a horizontal focal length of 27 mm, a vertical focal length of 22 mm, a horizontal diameter of 2.4 mm, and a vertical diameter of 1.6 mm with reference to Row 3 of FIG. 12 makes it possible to increase the spot size up to the lower limit value of the allowable range.

In the case where there is no row composed of completely matching numerical values in the association table in FIG. 12, a spot size may be predicted with reference to a row composed of close numerical values. In addition, there are plural rows composed of matching numerical values, a spot size may be predicted with reference to one of the rows. In addition, instead of using the association table like FIG. 12, it is also good to predict a wavefront shape by preparing an expression for calculation of the wavefront shape, substituting values such as a spot size and a visual field position in the expression.

(Step S07) The wavefront shape changing unit 102 changes the wavefront shape of the beam to the wavefront shape calculated in Step S06. A transition is made to an operation in Step S08. For example, when the horizontal focal length of the wavefront shape is desired to be changed, the horizontal focal length is changed by changing the distance between the cylindrical lens 203 and the mirror 204 in the focal length horizontal component changing unit 201. When the vertical focal length of the wavefront shape is desired to be changed, the vertical focal length is changed in the focal length vertical component changing unit 202 in the same manner.

When a transition to the operation in Step S07 is completed after determining in Step S05 that the spot size is within the allowable range, the same change as in the change in the wavefront shape of the previously outputted beam is made. However, it is not always necessary to change the wavefront shape in the same manner, and it is also good to change the wavefront shape differently as long as the spot size falls within the allowable range.

(Step S08) The light source 101 performs output control for a beam. A transition is made to an operation in Step S09. The light source 101 represents colors, chrominance, and luminance of pixels corresponding to a visual field position calculated in Step S02 of the beam to be outputted next by properly modulating the intensities of the beams respectively emitted from the red laser light source 211, the blue laser light source 212, and the green laser light source 213. In addition, the output control may be correction control in which influence of an optical system from the light source to a user's eye is taking into account. The optical system includes the scanning unit 103 and the deflecting unit 104.

(Step S09) The scanning unit 103 changes a scanning angle of the beam outputted in Step S08 by changing a tilt of a MEMS mirror. A transition is made to an operation in Step S10.

It is to be noted that the wavefront shape change in Step S07, the beam output in Step S08, and the scanning in Step S09 may be executed at the same time, or may be executed in a different order.

(Step S10) The deflecting unit 104 deflects the beam used for the scanning in Step 09 in the direction toward the user's eye. A transition is made to an operation in Step S01. The beam reflected due to a diffraction effect of the hologram mirror in the deflecting unit 104 is condensed to pupil of the eye of the user, passed through the pupil, reaches the retina, and perceived as an image by the user.

A pixel is drawn on a retina through sequential operations in Steps S07, S08, S09, and S10, but a line-of-sight detection in Step S01 does not need to be performed on a per pixel drawing basis. Thus, it is also good to make a transition to Step S02 after the operation in Step S10.

Changing the wavefront shape of the beam according to the above-described operations makes it possible to perform an operation of drawing a pixel, which makes up an image to be displayed, on a retina of the eye of the user in a proper size.

The beam scanning-type display device according to the present invention provides an advantageous effect of reducing size variation in pixels in an image by means that the wavefront shape changing unit 102 changes the wavefront shape such that the spot size of the beam deflected by the deflecting unit 104 falls within a predetermined range so as to display high-quality image at a higher resolution. As the result of reducing the wavefront shape change between pixels, the beam scanning-type display device according to the present invention further provides an advantageous effect of displaying a large image or implementing an eyeglass-type HMD for disposing a light source 101 at a temple of the user when the eyeglass-type HMD is mounted.

The operations from Step S01 to Step S10 may be processing operations represented using probability. For example, it is also good to calculate the predicted value of a spot size such that the spot size is Size A with a probability of 20%, or Size B with a probability of 80%, or such that the spot size is within an allowable range with a probability of 45%.

(Embodiment 2)

Next, a description is given of the beam scanning-type display device of Embodiment 2 according to the present invention. The structure of the device is the same as in Embodiment 1, and thus detailed description for the same parts are omitted in the following descriptions given with reference to FIG. 1A to FIG. 9A.

The light source 101 emits a beam. As shown in FIG. 2, the beam to be outputted is a laser light obtainable by synthesizing the laser lights respectively emitted from the red laser light source 211, the blue laser light source 212, and the green laser light source 213. A proper modulation of the outputs from the respective laser light sources makes it possible to output a laser light having an arbitrary color. Further, modulation implemented by causing a wavefront shape converting unit 102 and a scanning unit 103 to cooperate with each other makes it possible to form an image on a retina of a user.

In FIG. 2, the green laser light source 213 which emits a green beam is a combination of a semiconductor laser source which emits infrared rays and a second-harmonic generation (SHG) element which converts the infrared rays to a green laser light. However, this may be replaced with a semiconductor laser light source which emits a green laser light. Each of the light sources may be either a solid laser, a liquid laser, a gas laser, or a light emitting diode.

In FIG. 2, a laser light is modulated by each of the laser light sources. However, it is to be noted that a laser light may be modulated by each of combinations of a laser light source which emits a light and a unit for modulating the laser light emitted from the laser light source.

The light source 101 may include a light detecting unit 214 in FIG. 2. The light detecting unit 214 in Embodiment 2 detects a beam spot diameter on the retina of an eye of the user by detecting a reflected light from the retina.

The light detecting unit 214 may be an imaging element such as a CCD camera. In this case, the light detecting unit 214 may generate an image on the retina, and detect the beam spot diameter based on the beam spot formed thereon.

The wavefront shape changing unit 102 changes the wavefront shape of the beam from the light source 101 such that the spot size of the beam deflected by a later-described deflecting unit 104 falls within a predetermined range.

The "spot size" of a beam in Embodiment 2 is handled as the spot size on the retina of the eye of the user. The "wavefront shape" is a three-dimensional shape of a beam wavefront, and may be a flat surface, spherical surface, or non-spherical surface.

In FIG. 2, the wavefront shape changing unit 102 is configured with a focal length horizontal component changing unit 201 and a focal length vertical component changing unit 202 arranged in series on an optical path, thereby separately changing the curvature radiuses in the horizontal direction and the vertical direction of the wavefront shape. The focal length horizontal component changing unit 201 changes the curvature in the horizontal direction by changing the distance between a cylindrical lens and a mirror. The focal length vertical component changing unit 202 changes the curvature in the vertical direction by using a cylindrical lens disposed vertical to the cylindrical lens of the focal length horizontal component changing unit 201. It is to be noted here that both the focal length horizontal component changing unit 201 and the focal length vertical component changing unit 202 change the diameter of the beam together with the change in the curvature radius.

In addition, changing the horizontal curvature greatly than the vertical curvature makes it possible to adapt a greater change in the horizontal direction. This is particularly effective in the case where a horizontal visual angle in an image is desired to be greater than a vertical visual angle in the image and in the case where a horizontal incidence angle of a beam from a scanning unit to a deflecting unit (described later) is greater than a vertical incidence angle of the beam, as in the case of an HMD which allows to arrange the scanning unit (described later) at the temple of the user.

In FIG. 2, changed data items among the data items indicating wavefront shapes are only the horizontal curvature radius and the beam diameter, and the vertical curvature radius and the beam diameter. However, there may be a unit which changes other data items such as a distribution of curvatures within the wavefront, and the shapes and sizes of the wavefront ends.

The wavefront shape changing unit 102 in FIG. 2 changes the wavefront shapes using the cylindrical lenses and mirrors, but it may use, as other means, shape-variable lenses such as liquid crystal lenses and liquid lenses, diffraction elements, and electro-optic (EO) conversion elements.

The scanning unit 103 performs two-dimensional scanning using the beam from the wavefront shape changing unit 102. The scanning unit 103 is a single-plate mirror which can change an angle in a two-dimensional manner, and called MEMS mirror.

The scanning unit 103 may be implemented as a combination of two kinds of scanning units for horizontal scanning and vertical scanning.

The deflecting unit 104 deflects the beam used for the scanning performed by the scanning unit 103 in the direction toward the user's eye. The deflecting unit 104 is configured to have a photopolymer layer in which a Lippmann volumetric hologram or the like is formed inside the eyeglass lens (facing the user's eye) such that the beam from the scanning unit 103 is diffracted and condensed to the user's iris. In the photopolymer layer, three holograms which reflect red, green and blue lights from the light sources may be formed in a multiplexed manner, or three holograms corresponding to the respective color lights may be laminated. In addition, it is possible to configure a see-through display by diffracting only lights having a light source wavelength and not diffracting lights having a wavelength other than the light source wavelength using the wavelength selectivity of the holograms. Almost all the lights from outside are the latter.

It is to be noted that the deflecting unit 104 is not limited to a diffraction element such as a hologram, and may be a mirror such as a concave mirror or a lens such as a convex lens. In addition, the deflecting unit 104 supports a method in which some of diffused lights from a screen, for example, a reflection screen or a transparent screen is deflected toward the user's eye as the result that the beam is diffused at the screen.

The control unit 105 includes an integrated circuit which controls the respective parts of the HMD. As shown in FIG. 9A, the control unit 105 may include a central processing unit 501, a memory unit 502, an input and output control unit 503, and a communication unit 520.

Figure 13:
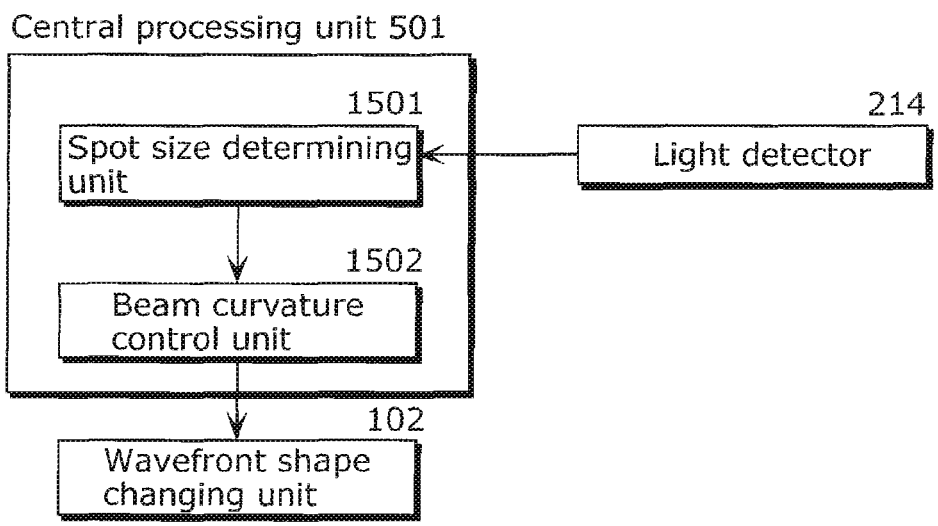
FIG. 13 is a diagram showing a detailed structure of the central processing unit in FIG. 9A in Embodiment 2 according to the present invention.

As shown in FIG. 13, the central processing unit 501 in Embodiment 2 functions also as a spot size determining unit 1501, and a beam curvature control unit 1502. In addition, the memory unit 502 in Embodiment 2 stores, for example, an association table indicating the relationships between spot sizes on the user's retina, beam curvature radiuses, and eye focal lengths, as shown in FIG. 15. The other things are the same as those in Embodiment 1.

It is to be noted that a single control unit 105 may control operations of the laser light sources 101, wavefront shape changing units 102, scanning units 103, and headphone units 106 corresponding to the above-described control units 105 for the right and left eyes.

The headphone unit 106 includes a speaker which outputs audio. The headphone unit may include battery which supplies electric power to the respective units of the HMD.

The respective units in FIG. 1A may be embedded in a single HMD, but does not need to be embedded in the single HMD. For example, all the respective units in FIG. 1A may be included in the single HMD, and the headphone unit does not need to be included in the single HMD. The respective units may be arranged dispersedly. For example, some parts of the control unit 105 may be included in the scanning unit 103 or the wavefront shape changing unit 102. Plural devices may share each of the units in FIG. 1A. For example, a laser light source 101 may be shared among two HMDs.

Figure 14:
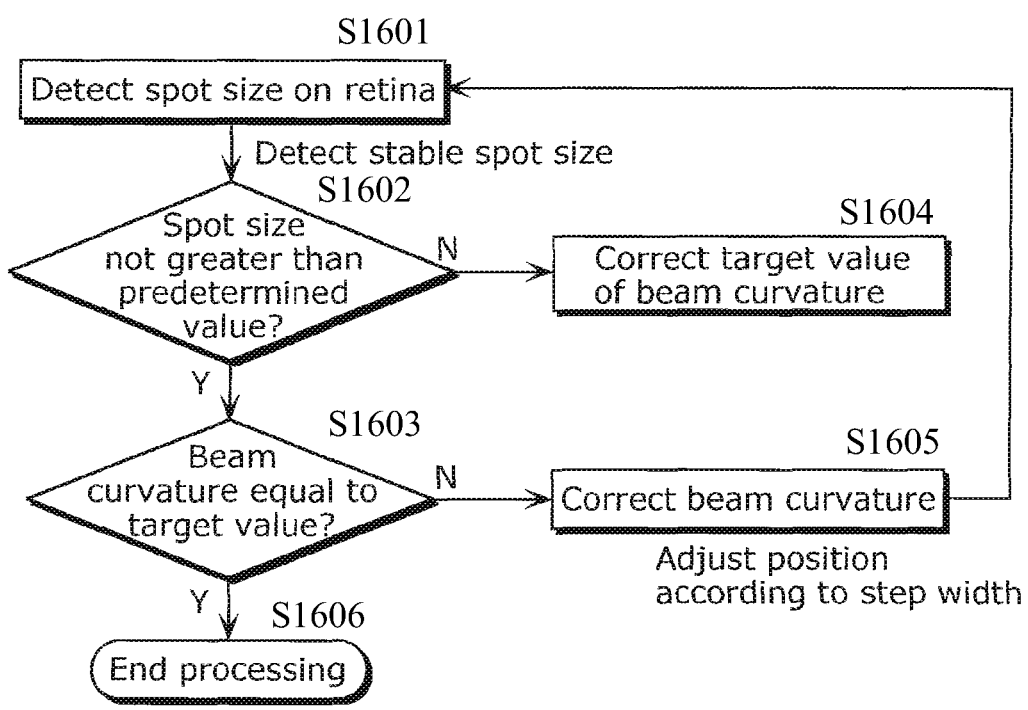
FIG. 14 is a flowchart of an operation for changing the curvature radius of a beam in Embodiment 2 according to the present invention.

The following describes an example of processing for relaxing eye muscles by changing the curvature radiuses of beams in the beam scanning-type display device shown in FIGS. 1A and 1B. This processing is performed by the execution of Steps S1601 to S1606 shown in FIG. 14.

(Step S1601: Obtainment of Spot Sizes of Beams on Retina)

In this step, the spot size determining unit 1501 determines a spot size of a beam on the retina of the user. In this embodiment, the light detecting unit 214 detects a reflected light from the user's retina, and generates an image formed on the retina and including a beam spot projected on the retina. The spot size determining unit 1501 determines a spot size S of the beam on the retina based on the retina image obtained by the light detecting unit 214.

Taking into consideration of a certain time required to stabilize the spot size of a beam on the retina after a change in the thickness of the crystalline lens, the spot size determining unit 1501 may determine, as the spot size S of the beam on the retina, the average value or median value of the beam spot size at a certain time T0. Otherwise, the spot size determining unit 1501 may determine the spot size S based on only outputs from the light detecting unit 214 in the certain time T0 after the spot size determining unit 1501 starts determination of a beam spot size.

When the determined beam spot size S is greater than a threshold value S1 stored in the spot size determining unit 1501, the spot size determining unit 1501 may restart measurement of a beam spot size S after the elapse of a certain time T1. Here, the certain time T1 is a value generated based on time required to change the thickness of the crystalline lens of the eye.

It is also good that the light detecting unit 214 only detects the intensity of a reflected light from the retina without generating a retina image, and that the spot size determining unit 1501 determines the spot size S of the beam on the retina, based on the result of the detection.

In addition, in the case where spot sizes of the beam vary depending on portions of the retina, the spot size determining unit 1501 may determine, as the value of the spot size S of the beam, the beam spot size at a particular portion of the retina, for example, a fovea or a macular. The spot size determining unit 1501 may use, as the spot size S of the beam, the average value of the spot sizes of the beam on the respective positions of the retina.

(Step 51602: Determination of Beam Spot Size)

In this step, the beam curvature control unit 1502 compares the beam spot size S determined in the previous step and a threshold value S0 determined by the beam curvature control unit 1502.

Here, the threshold value S0 is determined to be a value which does not give an impression that an image to be displayed is blurred to the user of the HMD, in the case where the beam spot size is less than S0.

When the value of the beam spot size S is greater than the threshold value S0, the beam curvature control unit 1502 determines that a current incident light cannot be adjusted to focus on the retina due to influence of near sight. In order to increase the curvature radius of the beam, a transition is made to processing of Step S1604.

In contrast, when the value of the beam spot size S is smaller than the threshold value S0, the beam curvature control unit 1502 determines that the user's ciliary body may be relaxed because the user clearly recognizes the image. The beam curvature control unit 1502 performs processing of Step 51603 in order to urge relaxation of the ciliary body of the eye of the user.

The threshold value S0 may be dynamically calculated from the value obtainable by dividing the whole area on the retina on which the incident light is projected by the resolution of an image to be displayed, or may be specified directly by the user.

(Step 51603: Determination of Beam Curvature Radius)

In this step, the beam curvature control unit 1502 compares a current beam curvature radius R with respect to the eye of the user and a target curvature radius R0. Here, the beam curvature radius R shows the curvature radius of the beam having a wavefront shape changed by the wavefront shape changing unit 102.

In general, a light from a distant object has a great curvature radius, and a light from an object at an infinite distance becomes a parallel light (having an infinite curvature radius). In contrast, a light from a near object has a small curvature radius, and enters an eye of the user as a spherical wave. These examples are illustrated in FIG. 16 and FIG. 17.

Figure 16:
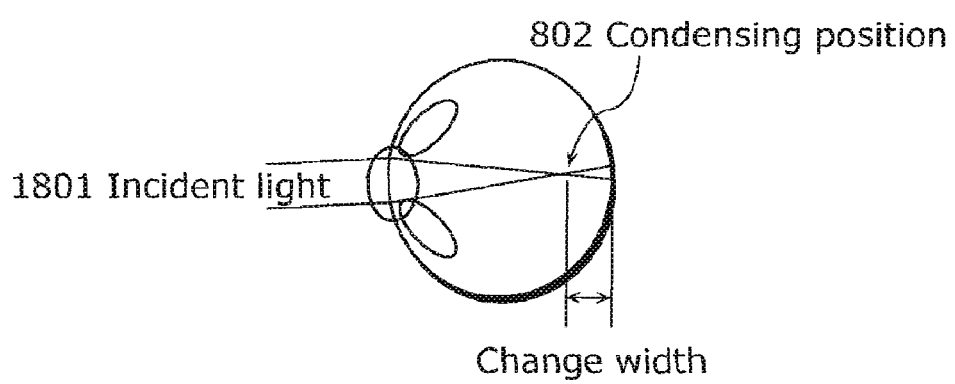
FIG. 16 is a diagram showing a change in condensing position of a beam when the curvature radius of the beam is made greater in Embodiment 2 according to the present invention.

FIG. 16 shows a beam condensing position 802 in the case of an incident beam having a curvature radius greater than R1 with respect to the user's eye including the crystalline lens having a thickness adjusted to condense the beam having the curvature radius of R1 on the retina of the eye. As shown in FIG. 16, the light having the great curvature radius is condensed to a condensing point between the pupil and the retina. At this time, the user's eye relaxes its ciliary body to make thinner the crystalline lens so that the beam condensing position 802 is just formed on the retina.

Figure 17:
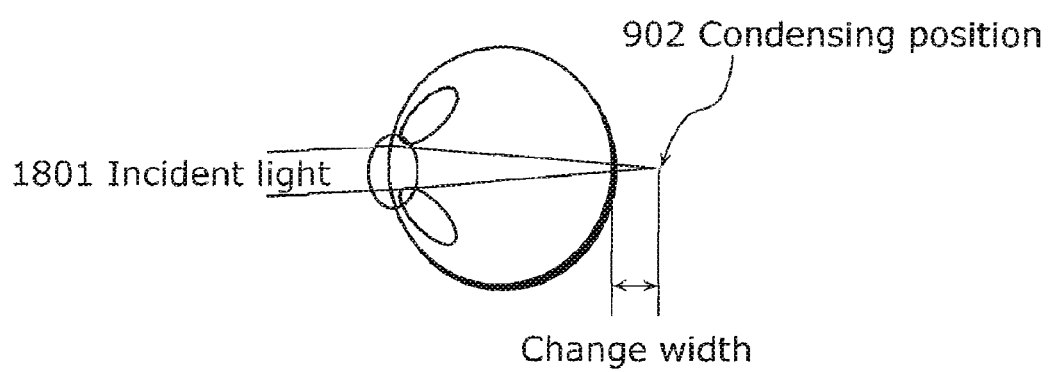
FIG. 17 is a diagram showing a change in condensing position of a beam when the curvature radius of the beam is made smaller in Embodiment 2 according to the present invention.

FIG. 17 shows a beam condensing position 902 in the case of an incident beam having a curvature radius smaller than R1 with respect to the user's eye including the crystalline lens having a thickness adjusted to condense the beam having the curvature radius of R1 on the retina of the eye. As shown in FIG. 17, the beam having a small curvature radius is condensed to a condensing point which is backward of the retina. At this time, the user's eye tenses its ciliary body to make thicker the crystalline lens so that the beam condensing position 902 is formed on the retina.

The HMD according to the present invention changes the value of the curvature radius of an incident light 1801 so as to urge relaxation of the ciliary body of a user within a range which allows the user to clearly recognize an image using the functional characteristics of the user's eyes.

When the current value of the curvature radius R of a beam is equal to the target curvature radius R0, the beam curvature control unit 1502 determines that the ciliary body of the eye of the user is sufficiently relaxed, and performs the processing of Step S1606.

In contrast, when the current value of the curvature radius R of a beam is not equal to the target curvature radius R0, the beam curvature control unit 1502 performs the processing of Step S1605.

In order to retain the quality of a video to be displayed to the user, when the wavefront shape changing unit 102 changes the beam curvature radius according to a beam projecting position on the retina, the beam curvature control unit 1502 may handle the curvature radius of the incident light entering into the fovea as the curvature radius R of the current incident light. In addition, it is also good to handle, as the curvature radius R of the current incident light, the average value or medium value of the curvature radius of the beam having a wavefront shape changed by the wavefront shape changing unit 102.

(Step 51604: Countermeasure for Near Sight)

In this step, the beam curvature control unit 1502 corrects the value of the afore-mentioned target curvature radius R0.

When it is judged in Step S1602 that the spot size S of a current beam is greater than the threshold value S0, the beam curvature control unit 1502 determines that the user's eye cannot successfully form an image resulting from a light from a distant point on its retina due to influence of near sight. At this time, the beam curvature control unit 1502 subtracts a curvature radius correction width R1 from the target curvature radius R0 (decreases the target value). In this embodiment, the curvature radius correction width R1 is stored in the memory unit of the beam curvature control unit 1502 in advance.

It is to be noted that the value of the curvature radius correction width R1 may be dynamically calculated based on the value of the curvature radius R of the current incident light. Processing performed in this case is, for example, processing for determining, as the value of R1, the value corresponding to one-tenth of the current curvature radius R.

In other words, repetition of the processing approximates the target curvature radius R0 up to the maximum value within a range preventing the spot size determined by the spot size determining unit 1501 exceeding the predetermined threshold value S0.

A description in Step S1604 is given of a case of a near-sighted user, but this description can be applied in the case of a far-sighted user, or a presbyope. When it is judged that the current spot size S of the beam is greater than the threshold value S0, the beam curvature control unit 1502 adds a curvature radius correction width R1 to the value of the target curvature radius R0 (increases the target value).

(Step S1605: Change of Beam Curvature Radius)

In this step, the beam curvature control unit 1502 changes the current curvature radius R of the beam.

The beam curvature control unit 1502 gradually approximates the curvature radius R to the target curvature radius R0 by adding or subtracting the value of the curvature radius change width R2 to or from the current beam curvature radius R. Here, if the current curvature radius R of the beam is changed to the target curvature radius R0 in one step, the change amount in the curvature radius may become too great. This may prevent the user from clearly recognizing an image because the user's eye cannot follow the change.

The curvature radius change width R2 is a value determined such that a beam spot size S on the user's retina cannot become too great when the beam curvature radius R is changed to the value obtained from R+R2 or R−R2. In this embodiment, the curvature radius change width R2 is stored in the beam curvature control unit 1502.

FIG. 15 shows an example of the relationship between beam spot sizes, beam curvature radiuses, and focal lengths of the eye. Preparation of these vales allows the beam curvature control unit 1502 to determine a proper curvature radius change width R2.

The beam curvature control unit 1502 adds the curvature radius change width R2 to the value of R when the value of the current curvature radius R of the beam is below R0. As shown in FIG. 16, this moves the beam condensing position from a point on the retina to a point at the side of the crystalline lens. At this time, the user unconsciously relaxes the ciliary body of the eye to make the crystalline lens thinner so that the beam condensing position is moved to a point on the retina.

In contrast, the value of the current curvature radius R of the beam exceeds the target curvature radius R0, the beam curvature control unit 1502 subtracts the curvature radius change width R2 from the value of R. As shown in FIG. 17, this moves the beam condensing position to a backward point of the retina. At this time, the user unconsciously tenses the ciliary body of the eye to make the crystalline lens thicker so that the beam condensing position is moved to a point on the retina.

For example, this processing may be performed in the case where the curvature radius correction width R1 is subtracted from the value of the target curvature radius R0 in Step S1604. In other words, this processing is performed for correcting the curvature radius in the case where the image cannot be successfully formed on the retina as the result of increasing the beam curvature radius too much.

After the beam curvature radius control unit 1502 changes the beam curvature radius R, it controls the wavefront shape changing unit 102 so that the curvature radius of the beam which actually enters the user's eye matches the changed R.

It is also good that the curvature radius change width R2 is dynamically calculated based on the value of the current curvature radius R of the beam. In this case, for example, one-tenth of the value of R0 is determined as the value of R2 in the processing. It is also good to dynamically calculate the value of R2 that yields the value of the beam spot size R within a predetermined range by defining, in advance, the relationships between the curvature radiuses R and the spot sizes S as functions.

When the wavefront shape changing unit 102 changes the beam curvature radius of the incident light according to a beam projecting position on the user's retina in order to retain the quality of a video to be displayed to the user, the beam curvature radius control unit 1502 may change the curvature radius by increasing or decreasing the beam curvature radius determined for each projecting position on the retina by the value of the curvature radius changing width R2. It is also good to use a method of storing, in the beam curvature control unit 1502, the values of curvature radius change widths differently determined for beam projecting positions on the retina, and to add or subtract the values to or from the curvature radiuses of the respective incident lights.

It is also good to determine beam curvature radiuses differently for the vertical direction and the horizontal direction. In this case, the beam curvature control unit 1502 stores the values of the curvature radius change width in the vertical direction and the curvature radius change width in the horizontal direction, and changes the current curvature radiuses of the beam in the vertical and horizontal directions based on the values.

The beam curvature control unit 1502 changes the beam curvature radius R, returns to Step S1601, and repeats the processing in Steps S1601 to S1605. In this way, the target curvature radius R0 is adjusted to the maximum value within the range which yields the value of a spot size S not greater than the threshold value 0. Since the current curvature radius R of the beam is gradually made closer to the target curvature radius R0, the user can relax the ciliary body of the eye of the user within a range which allows the user to clearly recognize the image.

(Step S1606: End)

When the beam curvature radius of the incident light is equal to the target curvature radius R0, the user's crystalline lens is sufficiently made thin, and the ciliary body is relaxed. Thus, the burden on the ciliary body is light even in the case where the user has watched the image displayed on the HMD for a long time. This makes it possible to reduce eye strain in VDT operations.

It is also good that the user directly inputs the value of the target curvature radius R0 through the user interface of the HMD. In addition, it is also good to use a method in which the user increases or decreases the value of R0 which has been preset in the HMD.

The HMD used in this embodiment is an HMD which displays an image for right and left eyes, but this HMD may be replaced with a binocular HMD which displays a video only for one of the right and left eyes.

It is to be noted that the HMD according to the present invention may stop changing a beam curvature radius in the case where the HMD includes a means, such as a head tracker, for detecting a body motion of the user, and it is judged that the user's body is moving based on a change width outputted from the means exceeding a predetermined value. When the user is moving, it is judged that the user's eyes are directed not to the video to be displayed on the HMD but to the external world. Eliminating unnecessary processing reduces processing cost and electric power consumption.

The processing illustrated in this embodiment is processing for making a beam curvature radius greater, but it is also possible to make a beam curvature radius smaller by setting a small value as the target curvature radius R0. At this time, alternately repeating a period in which a large value is determined as the target curvature radius R0 and a period in which a small value is determined as the target curvature radius R0 makes it possible to alternately repeat a period in which the crystalline lens of the eye becomes thin and the period in which the crystalline lens of the eye becomes thick. In the processing, the ciliary body of the eye is repeatedly relaxed and tensed, and thus a proper exercise effect can be obtained. As a result, the strain of the ciliary body of the eye is further mitigated, which increases the effect of preventing eye strain.

In the determination of the target curvature radius R0, it is also good to determine the value of R0 within a range from the upper limit value RU and the lower limit value RD of the predetermined curvature radius. Determining a small RU value for a near-sighted user and determining a great RD value for a far-sighted user or a presbyope makes it possible to reduce processing cost for making the current value of the curvature radius close to the target curvature radius R0.

(Embodiment 3)

Figure 18:
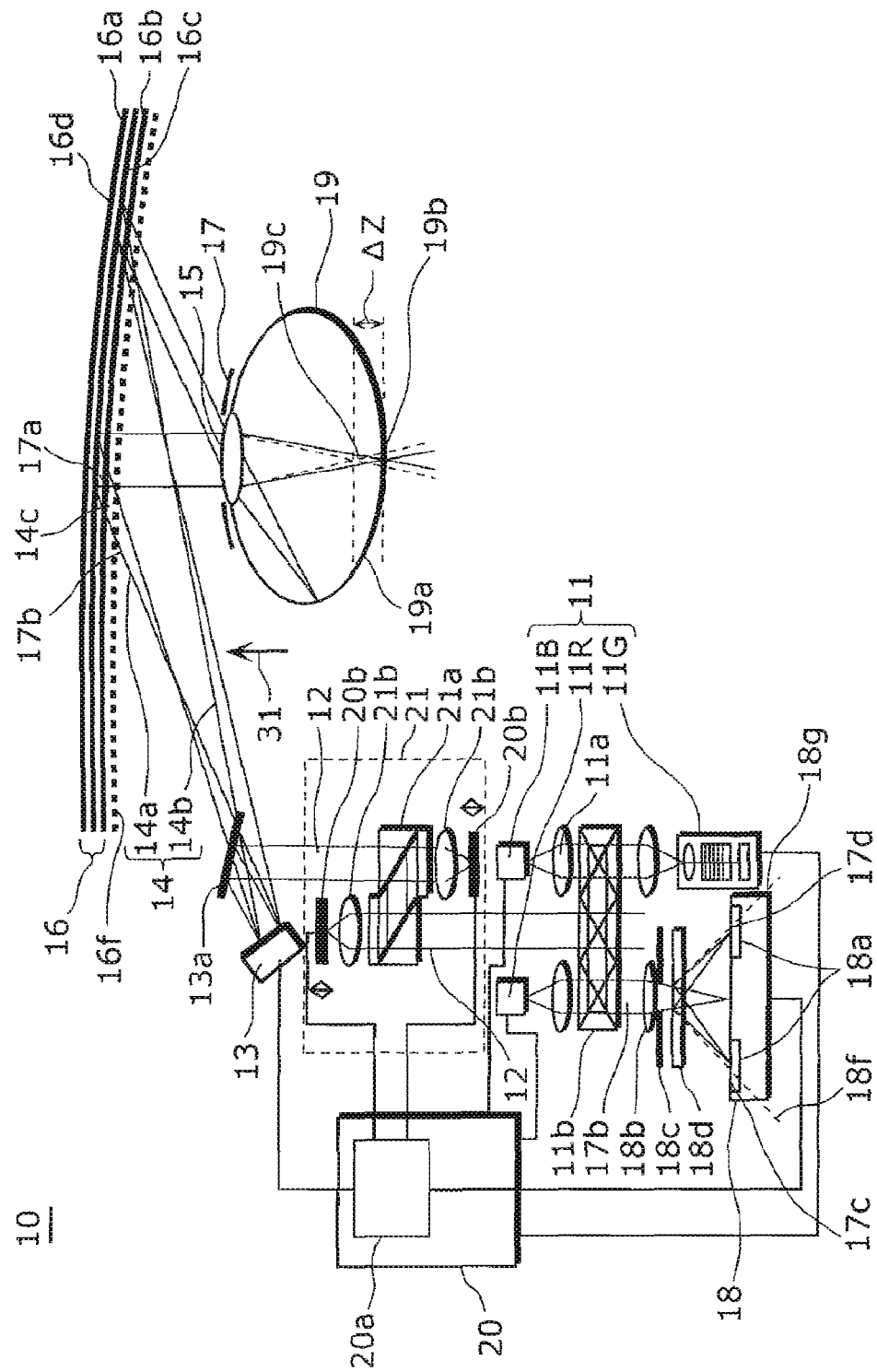
FIG. 18 is a schematic structural diagram of an image display device in Embodiment 3 according to the present invention.

FIG. 18 shows a schematic structural diagram of an image display device 10 of Embodiment 3 according to the present invention.

The image display device 10 of Embodiment 3 includes a light source 11, a scanning unit 13 which performs scanning using a laser light 12 emitted from the light source 11, and a deflecting unit 16 which deflects and guides the scanning light 14 from the scanning unit 13 toward the pupil 15 of an observer. A part of the scanning light 14 is reflected as a reflected light 17b from a reflection body 17a. The image display device 10 includes a light detector 18 which detects a spot size 17c of the reflected light 17b and a beam shape adjusting unit 20a which controls the spot size 19b on a retina of the observer at a predefined value or less by changing the beam shape 14c of the scanning light 14 based on the output signal from the light detecting unit 18. In this way, the image display device 10 of Embodiment 3 projects a video on the retina 19a of the eye 19 of the observer using the scanning light 14.

Here, as shown in FIG. 18, the deflecting unit 16 is structured with a substrate 16a, and a hologram mirror 16b formed on at least a part of the substrate 16a.

Next, a specific description is given of main optical operations of the image display device 10 of Embodiment 3. As shown in FIG. 18, the description is given of operations of the left part of an optical system in the bilaterally symmetrical optical system.

As shown in FIG. 18, the light source 11 is an RGB light source composed of at least a red laser light source (hereinafter referred to as "R light source") 11R, a green laser light source (hereinafter referred to as "G light source") 11G, and a blue laser light source (hereinafter referred to as "B light source") 11B. The light sources used here as the R light source 11R and the B light source 11B are semiconductor lasers which emit laser lights having wavelengths of 650 nm and 450 nm, respectively. The light source used here as the G light source is an SHG laser obtained by exciting a semiconductor laser which emits a laser light having a wavelength of 530 nm.

The laser lights emitted from the R light source 11R, the G light source 11G, and the B light source 11B are respectively converted into parallel lights by a collimator lens 11a. Subsequently, the laser lights enter into a dichroic prism 11b where the laser lights are integrated into one as a laser light 12, and the laser light 12 is emitted from the dichroic prism 11b.

The laser light 12 enters an optical path length adjusting unit 21 (corresponding to the "wavefront shape changing unit 102" in Embodiments 1 and 2). The optical path length adjusting unit 21 adjusts the length of an optical path leading to the deflecting unit 16 by moving the position of a servo mirror 20b in the direction shown by an arrow. This processing is controlled by a beam shape adjusting unit 20a included in the control unit 20.

Subsequently, the laser light 12 is reflected from the reflection mirror 13a toward the scanning unit 13. The scanning unit changes reflection angles arbitrarily, and performs two-dimensional scanning with the light from the reflection mirror 13a on the hologram mirror 16b of the deflecting unit 16 using predetermined spot sizes. Here, when a MEMS mirror is employed as the scanning unit 13, it becomes possible to perform high-precision scanning using the scanning light 14 on the hologram mirror 16b.

Subsequently, the scanning light 14 is deflected by the hologram mirror 16b, enters the pupil 15 of the eye 19 of the observer, and is to be projected on the retina 19a as a video.

It is desirable that the spot size 19b of the scanning light 14 projected on the retina 19a is not greater than 20 μm when a focus is placed on the retina 19a. This size is required to display an image with 1000 dots in the horizontal direction when the visual field angle in the horizontal direction is 100 degrees, for example. If the spot size on the retina exceeds 20 μm, adjoining dots are overlapped with each other, which makes it impossible to obtain a predetermined resolution.

In addition, in the case where the beam shapes of the scanning lights 14 (14a, 14b) are different from the predetermined shapes and deflected by the hologram mirror 16b toward the eye 19 of the observer, the focus position 19c of the scanning lights 14 (14a, 14b) is shifted by a defocus amount $\Delta Z$, as shown in FIG. 18. This $\Delta Z$ is reflected on the magnitude of the spot sizes 17c and 17d on the light receiving surface of the light receiving element 18a of the light detecting unit 18 disposed around the light source 11 shown in FIG. 18, and can be detected as described later.

In other words, a part of each of the scanning lights 14 (14a, 14b) is reflected as the reflected light 17b by the reflection body 17a. The reflected light 17b travels inversely on the optical path on which the laser light 12 has been emitted and enters the dichroic prism 11b. Subsequently, the reflected light 17b projects the spot sizes 17c and 17d on the light receiving surface of the light receiving element 18a of the light detecting unit 18.

The light detecting unit 18 generates an output signal based on the spot sizes 17c and 17d of the reflected light 17b. The beam shape adjusting unit 20a adjusts, based on the output signal, the beam shape of the scanning lights 14 (14a, 14b) by moving the servo mirror 20b of the optical path length adjusting unit 21 in the direction shown by the arrow. As a result, the beam shape adjusting unit 20a controls the spot size 19b on the retina 19a at or below the predefined value, for example, 20 µm.

Changing the wavefront shape of the beam by feeding back the part of the scanning light 14 makes it possible to always project the optimum video on the retina 19a of the eye 19 of the observer. The optical path length adjusting unit 21 is provided with a light guiding prism 21a and two objective lenses 21b between two servo mirrors 20b, and controls the optical paths for and beam shapes of the laser light 12 and reflected light 17b.

The optical path length adjusting unit 21 structured like this can make optical adjustments with high precision at high speed. As a result, it becomes possible to implement an image display device 10 which displays a video having a high resolution at high speed. In addition, the reflected light used here is the reflected light 17b from the reflection body 17a having a reflectance greater than that of the retina 19a, such optical adjustments can be made securely and precisely. As a result, it becomes possible to stabilize optical characteristics with respect to influence of disturbance, shielding of a part of the beams, or the like, thereby allowing the observer to recognize the image precisely and clearly.

Figure 23A:
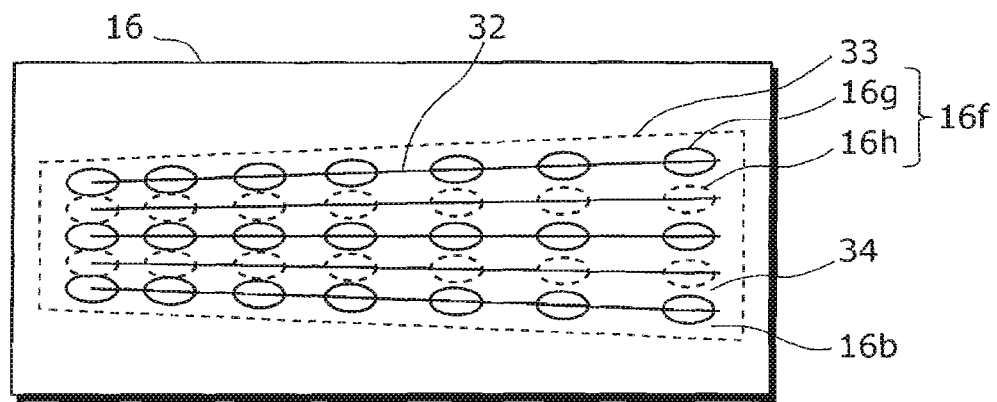
FIG. 23A is a diagram showing an example of a hologram mirror.
Figure 23B:
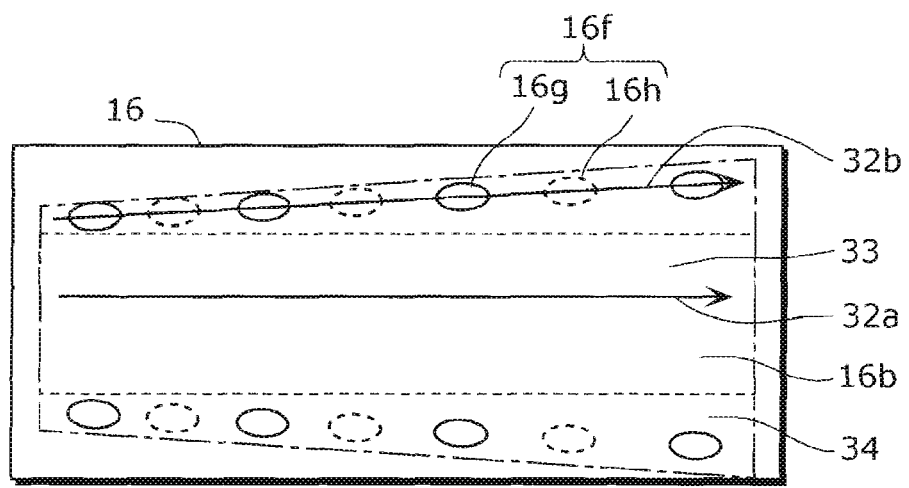
FIG. 23B is a diagram showing an example of the hologram mirror.

As shown in FIG. 23A, the reflection body 17a may be a servo light generating hologram mirror 16f formed in a multiplexed manner within the hologram mirror 16b (deflection area) formed on the substrate 16a of the deflecting unit 16. Otherwise, as shown in FIG. 23B, the reflection body 17a may be a servo light generating hologram mirror formed on a position different from the position at which the hologram mirror 16 is formed (the different position is around the hologram mirror 16b in FIG. 23B).

With this structure, it becomes possible to easily structure an optical system for image processing which is further smaller and lighter. As a result, it becomes possible to make optical adjustments with high precision at high speed. In addition, it becomes possible to easily perform processing for allowing the observer to recognize a precise image.

Further, multiplexing plural hologram mirrors makes it possible to make the deflecting unit thinner, thereby implementing a small, light, and thin HMD.

Here, as shown in FIG. 18, the servo light generating hologram mirror 16f is formed such that it is a reflection hologram mirror having a lens power for outputting the maximum reflected light 17b when the spot size 19b on the retina 19a becomes the optimum value.

With this structure, it becomes possible to further extend a servo range or further decrease an offset at the time when later-described optical adjustments are made.

This embodiment illustrates an example where the reflection body 17a provided to the deflecting unit 16 is a servo light generating hologram mirror, but the reflection body 17a is not limited to this. It is also good to use, as the reflection body 17a, the iris 17 in the pupil 15 of the eye 19 of the observer, or the retina 19a of the eye 19 so that the light detecting unit 18 can detect the reflected light from one of these. With this structure, it becomes possible to simplify the optical structure of the deflecting unit 16.

As shown in FIG. 18, the reflected light 17b travels inversely from the scanning light 14 and enters the dichroic prism 11b, and then is emitted toward the light detecting unit 18. Subsequently, the reflected light 17b is condensed by the objective lens 18b, passing through the aperture 18c, is subjected to complementary lens effects by a light detecting diffraction grating 18d so as to be divided into diffracted lights 18f and 18g.

The light detecting unit 18 includes two light receiving elements 18a for receiving these two diffracted lights 18f and 18g. These two light receiving elements 18a are arranged apart such that they have an equal optical length from the diffraction grating 18d. Accordingly, when the scanning light 14 focuses on the retina 19a of the eye 19 of the observer, the spot sizes of the diffracted lights 18f and 18g are the same on the light receiving element 18a. In contrast, when the scanning light 14 does not focus on the retina 19a of the eye 19 of the observer, the diffracted lights 18f and 18g are different in spot sizes on the light receiving element 18a, Thus, for example, it is possible to detect the focus position 19c based on the difference obtained from the results of the detection by the two light receiving elements 18a.

Figure 19A:
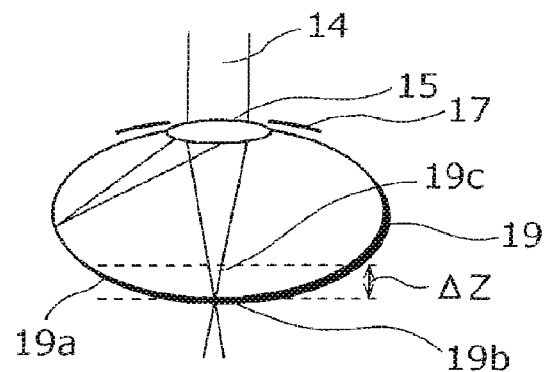
FIG. 19A is a diagram showing the position of the focal point of a scanning light formed in a user's eye.
Figure 19B:
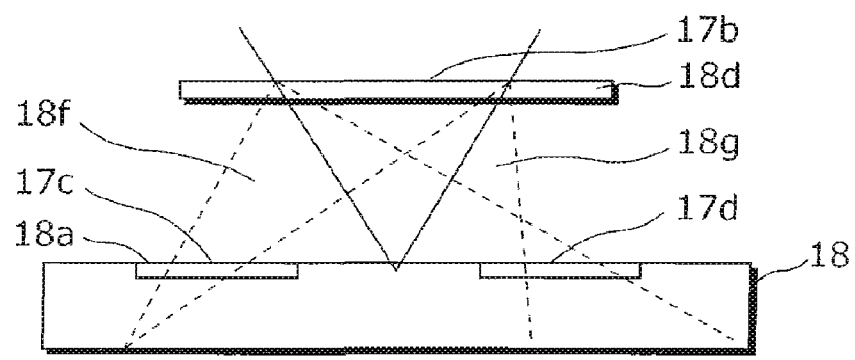
FIG. 19B is a diagram showing a state where a diffracted light is received by a light detecting unit.
Figure 19C:
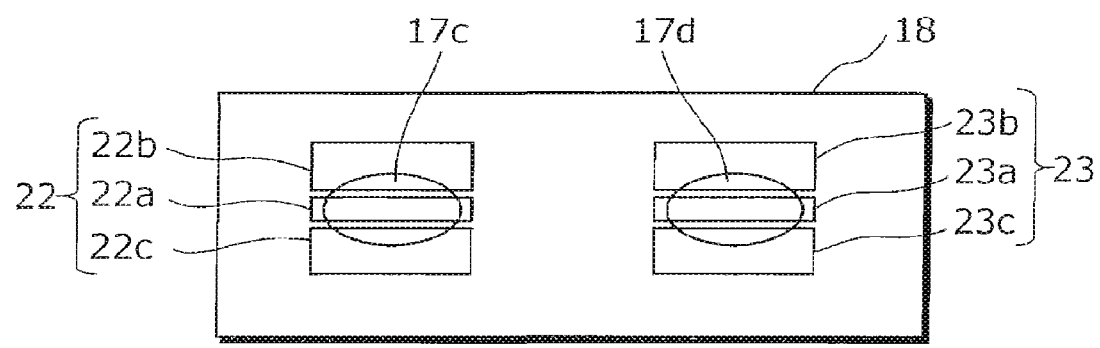
FIG. 19 is a diagram showing spot sizes on light receiving elements in the light detecting unit.
Figure 20A:
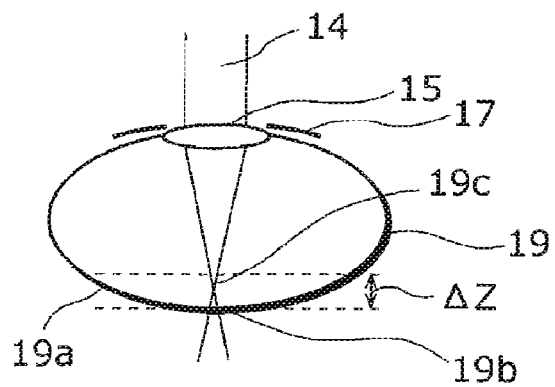
FIG. 20A is a diagram showing the position of the focal point of a scanning light formed in the user's eye.
Figure 20B:
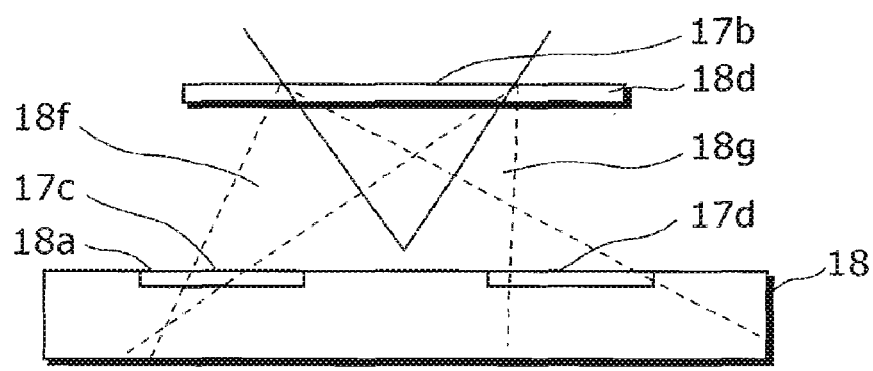
FIG. 20B is a diagram showing a state where diffracted lights are received by a light detecting unit.
Figure 20C:
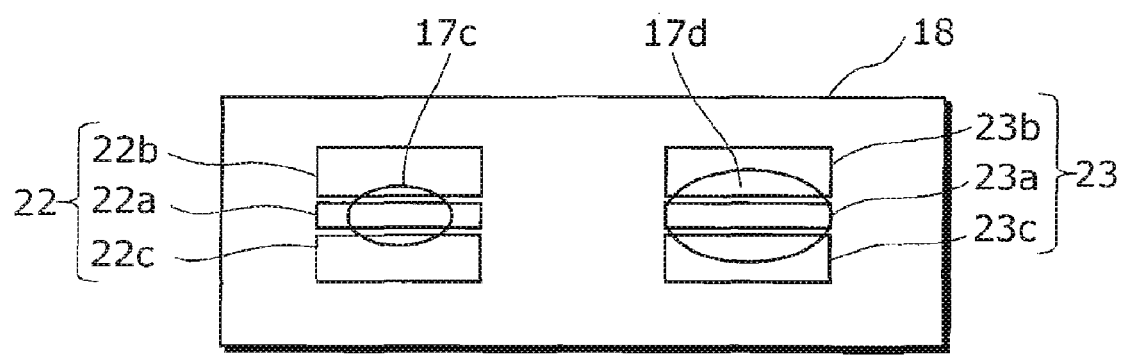
FIG. 20C is a diagram showing spot sizes on the light receiving elements in the light detecting unit.
Figure 21A:
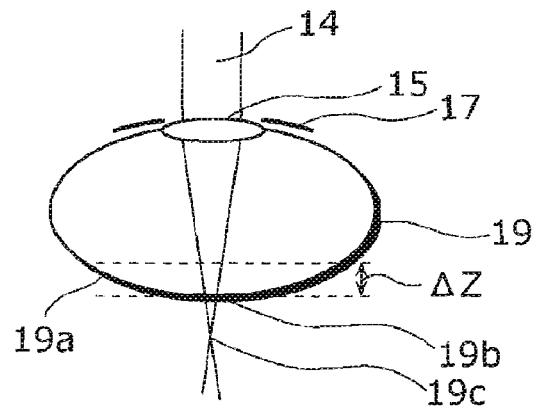
FIG. 21A is a diagram showing the position of the focal point of a scanning light formed in the user's eye.
Figure 21B:
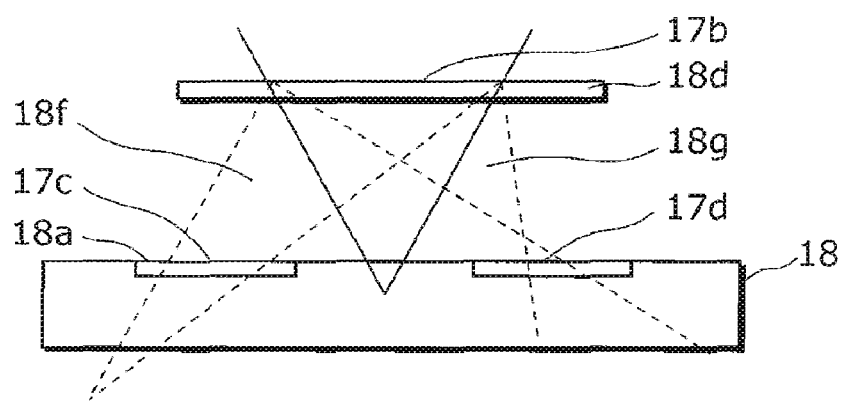
FIG. 21B is a diagram showing a state where diffracted lights are received by the light detecting unit.
Figure 21C:
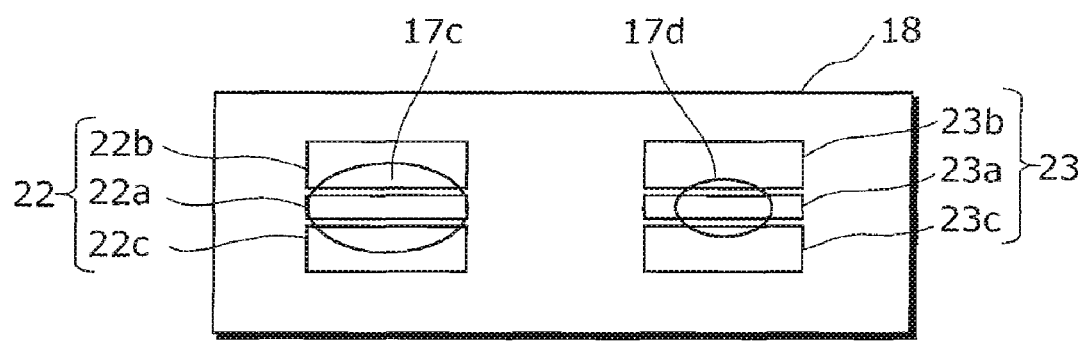
FIG. 21C is a diagram showing spot sizes on the light receiving elements in the light detecting unit.

Each of FIG. 19A to FIG. 21C is a diagram showing the relationship between the focus position 19c of the scanning light 14 in the eye 19 of the observer and a state where the reflected light 17b is detected in the light detecting unit 18. FIG. 19A, FIG. 20A, and FIG. 21A are diagrams each showing a focus position 19c of the scanning light 14 in the eye 19. FIG. 19B, FIG. 20B, and FIG. 21B are diagrams each showing a state where the diffracted lights 18f and 18g are received by the light detecting unit 18. FIG. 19C, FIG. 20C, and FIG. 21C are diagrams each showing the spot sizes 17c and 17d on the light receiving element 18a of the light detecting unit 18.

Each of FIGS. 19A and 19B is a diagram showing a case where the focus position 19c is on the retina 19a, that is, a state where a focus having a spot size 19b is not greater than 20 µm on the retina 19a of the eye 19. As shown in FIG. 19B, the two diffracted lights 18f and 18g on the light receiving element 18a have the same magnitude. Thus, the difference between the detected signals of the two light receiving elements 18a becomes approximately 0. Accordingly, it can be detected that the focus position 19c is on the retina 19a of the eye 19.

Each of FIGS. 20A and 20B is a diagram showing a state where it is detected that the focus position 19c is in front of the retina 19a. As shown in FIG. 20B, the spot size 17c on the left-hand light receiving element 18a is smaller than the spot size 17c shown in FIG. 19B, and the spot size 17d on the right-hand light receiving element 18a is greater than the spot size 17d shown in FIG. 19B. The focus position 19c can be detected based on the difference in magnitude of the right and left spot sizes 17c and 17d.

In contrast to FIGS. 20A and 20B, each of FIGS. 21A and 21B is a diagram showing a state where it is detected that the focus position 19c is at a point behind the retina 19a, that is, at a point outside the eye 19. At this time, the relationship of the magnitudes of the spot sizes 17c and 17d on the light receiving element 18a on the light detecting unit 18 is inverse to that of FIGS. 20A and 20B, but the focus position 19c can be detected in a similar manner.

In addition, as shown in FIG. 19C, 20C, and 21C, it is also good to use a pair of light receiving elements 22 and 23 each divided into plural elements (divided into three in this embodiment). This light receiving element 22 has a light receiving unit 22a in the middle and light receiving units 22b and 22c in the both ends in each of which a light amount is detected, and thus the light receiving element 22 can determine the magnitude of the spot size 17c based on the differences. Likewise, it is possible to detect the focus position 19c by means that the light receiving element 23 (23a, 23b, 23c) determines the magnitude of the spot size 17d and calculates the difference between the light receiving element 22 (22a, 22b, 22c) and the light receiving element 23 (23a, 23b, 23c).

With this structure, it is possible to make optical adjustments with high precision at high speed, thereby implementing an image display device 10 which displays a video having a high resolution at high speed. In addition, the reflected light used here is the reflected light 17b from the reflection body 17a having a reflectance greater than that of the retina 19a, such optical adjustments can be made successfully and precisely. Therefore, it becomes possible to stabilize optical characteristics against influence of disturbance, shielding of a part of the beams, or the like, thereby allowing the observer to recognize the image precisely and clearly.

(Embodiment 4)

Figure 22:
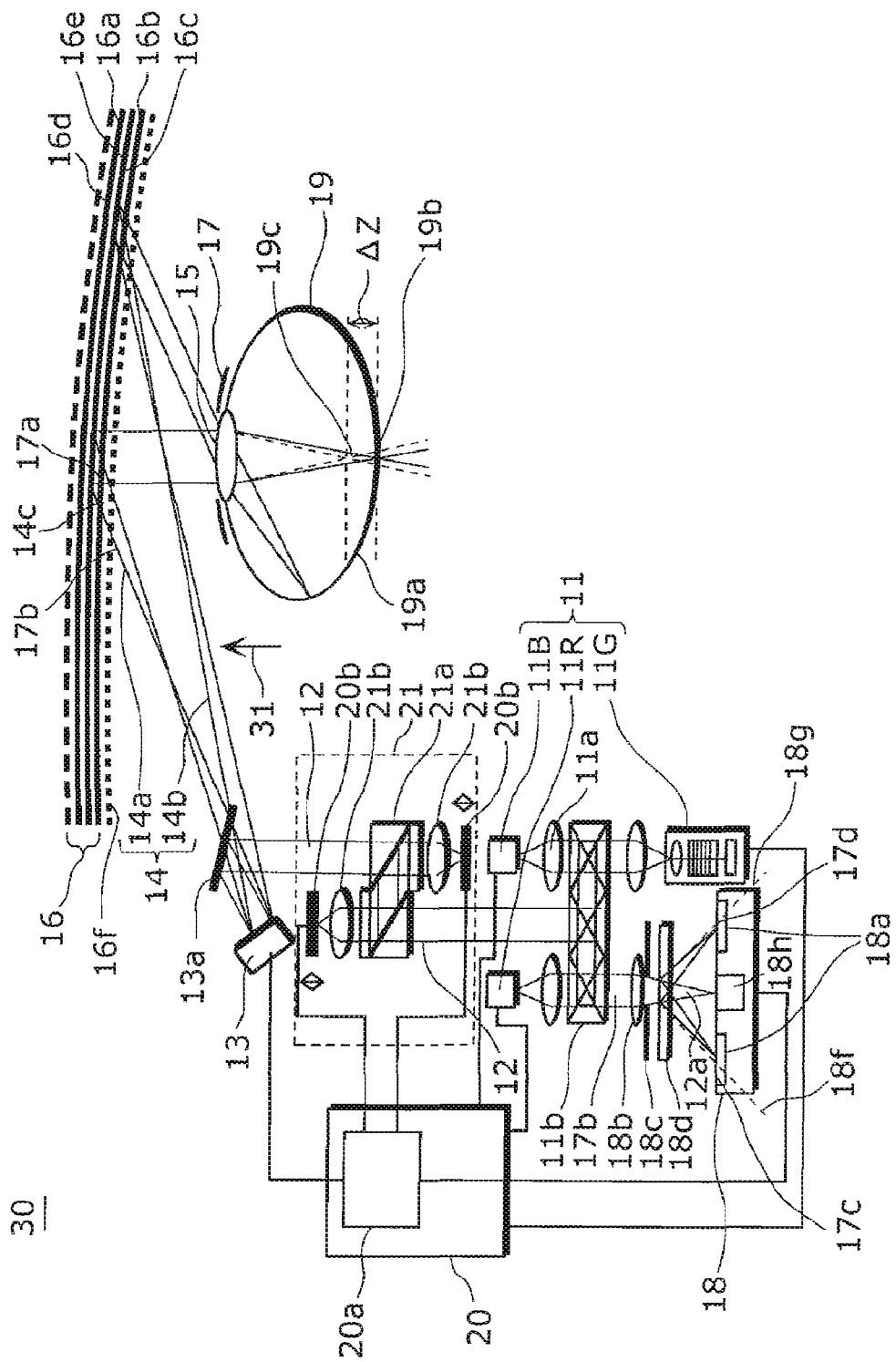
FIG. 22 is a schematic structural diagram of the image display device in Embodiment 4 according to the present invention.

FIG. 22 shows a schematic structural diagram of an image display device 30 of Embodiment 4 according to the present invention.

Embodiment 4 has approximately the same structure as Embodiment 3, and further includes an infrared laser light source 18h which emits a laser having a red to infrared wavelength in addition to the light source 11 which is an RGB light source.

In other words, the image display device 30 shown in FIG. 22 includes a light detecting unit 18 provided with an infrared laser light source 18h which emits a laser having a central wavelength of 750 nm to 1500 nm inclusive, in addition to the structure of the image display device 10 shown in FIG. 18. This infrared laser light source 18h is, for example, an infrared semiconductor laser which emits a laser having a central wavelength of 780 nm which is used for optical discs such as CDs.

This servo laser light 12a emitted from the infrared laser light source 18h enters the dichroic prism 11b, propagates on the optical path for the laser light 12, and is reflected from the servo light generating hologram mirror 16f formed on the deflecting unit 16. Subsequently, the reflected light 17b generated by the servo light generating hologram mirror 16f propagates on the optical path described in Embodiment 3 (that is, travels inversely to the laser light 12), and reaches the light receiving element 18a of the light detecting unit 18.

The beam shape adjusting unit 20a moves the servo mirror 20b of the optical path length adjusting unit 21 in the direction shown by the arrow, based on the output signal of the light receiving element 18a as in Embodiment 3, thereby changing the beam shapes of the scanning light 14 (14a, 14b). As a result, the beam shape adjusting unit 20a controls the spot size 19b on the retina 19a at or below the predefined value, for example, 20 μm or less.

With this structure, it is possible to arrange the servo infrared laser light source 18h and the light detecting unit 18 at close positions, thereby making further stable optical adjustments. Furthermore, it is possible to make optical adjustments with high precision at high speed, thereby implementing an image display device 30 which displays a video having a high resolution at high speed.

In addition, the reflected light used here is the reflected light 17b from the reflection body 17a having a reflectance greater than that of the retina 19a, such optical adjustments can be performed successfully and precisely. As a result, it becomes possible to stabilize optical characteristics against influence of disturbance, shielding of a part of the beams, and the like, thereby allowing the observer to recognize the image precisely and clearly.

Here, it is also good to configure the G light source 11G by combining the infrared laser light source 18h and an SHG element which converts a part of the infrared light into a green light. More specifically, for example, the infrared laser light source may be employed as an infrared semiconductor laser for excitation having a center wavelength of 1060 nm, and the SHG element may be employed as LiNbO3.

The servo light generating hologram mirror 16f of the deflecting unit 16 may reflect infrared light which has not been converted into a green light by the SHG element among the infrared light emitted from the infrared light source.

With this structure, the device does not require a separate servo light source, it is possible to reduce the size, weight, and electric power consumption of the device.

In order to increase the S/N ratio of the detected signal using an infrared laser light like this as the servo light source, the deflecting unit 16 may further include a shielding film 16e which shields infrared light on the external surface 16d opposite to the deflection surface 16c which deflects the scanning light 14.

With this structure, it is possible to prevent infrared light from outside the external surface 16d from entering the deflection surface 16c, thereby increasing the S/N ratio of the infrared light. This makes it possible to perform light detection with high precision. It is also possible to shield infrared light from outside from entering the eye 19, thereby increasing the S/N ratio of a video to be projected on the retina 19a.

In addition, the shielding film 16e may be structured to shield at least a beam having a central wavelength of 750 nm to 1500 nm inclusive. With this structure, it is possible to effectively prevent infrared light from outside the external surface 16d from entering the deflection surface 16c. This further increases the S/N ratio of the infrared light, which makes it possible to perform light detection and video projection with high precision.

FIG. 23A and FIG. 23B are diagrams showing examples of hologram mirrors of Embodiment 3 and 4, respectively, and show the deflecting units 16 and the servo light generating hologram mirrors 16f of the image display devices 10 and 30 shown in FIG. 18 and FIG. 20 when seen in the direction shown by the arrow 31, respectively.

In FIG. 23A, a servo light generating hologram mirror 16f multiplexed as a reflection body 17a is formed on the hologram mirror 16b (deflection area) formed on the deflecting unit 16.

With this, among the scanning light 14 used for the scanning in the beam scanning direction 32 shown in FIG. 23A, the deflected scanning light 14 is guided to the eye 19 of the observer, and the reflected light 17b as a servo light reflected from the servo light generating hologram mirror 16f is guided to the light detecting unit 18.

It is also good that the servo light generating hologram mirror 16f is structured to have at least a pair of reflection hologram mirrors composed of: a first reflection hologram mirror 16g which has a lens power greater than those in usual states when the spot size 19b on the retina 19a is the optimum value; and a second reflection hologram mirror 16h which has a lens power smaller than those in usual states when the spot size 19b on the retina 19a is the optimum value. At this time, the diffraction grating 18d disposed in front of the light detecting unit 18 is a simple diffraction grating having an equal grating interval and not having a lens power.

With this structure, it becomes possible to further extend a servo range or further decrease an offset at the time when optical adjustments are made. Here, "usual states" in the above description can be interpreted as states where spot sizes 19b do not correspond to the optimum values.

On the other hand, in FIG. 23B, the reflection body 17a is a servo light generating hologram mirror 16f formed on at least a part of the surrounding area of the hologram mirror 16b. As in FIG. 23A, as shown in FIG. 23B, it is also good that the servo light generating hologram mirror 16f is formed as a pair of reflection hologram mirrors composed of a first reflection hologram mirror 16g and a second reflection hologram mirror 16h.

With the deflecting unit 16 in FIG. 23B, when the scanning light 14 is used for the scanning in the beam scanning direction 32a, the scanning light 14 deflected on the beam deflection area 33 is used to project a video on the eye 19 of the observer. In contrast, when the scanning light 14 is used for the scanning in the beam scanning direction 32b, the reflected light 17b reflected from an area 34 in which a servo light is generated is detected by the light detecting unit 18.

With this structure, it becomes possible to further extend a servo range or further decrease an offset at the time when optical adjustments are made.

In FIG. 23B, it is also good to perform scanning on the whole deflecting unit 16 using all the RGB light and infrared light, and to perform scanning on the beam deflection area 33 using the RGB light, and on the area 34 in which the servo light is generated using the infrared light.

It is possible to fabricate a servo light generating hologram mirror 16f like this by irradiating a laser light emitted from a MEMS mirror and its phase conjugate light (which has the same beam shape but travels in the direction opposite to the direction in which the laser light travels) on a hologram material such as a photopolymer at the same time, and recording the interference pattern on the hologram material.

(Embodiment 5)

Figure 24A:
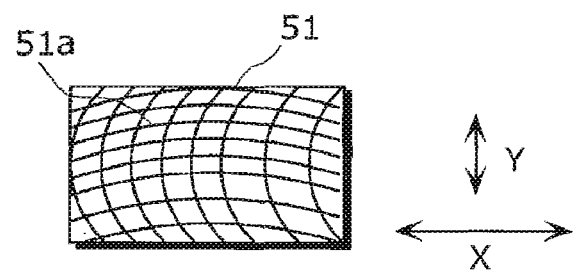
FIG. 24A is a diagram showing a hologram pattern of a servo light generating hologram mirror.
Figure 24B:
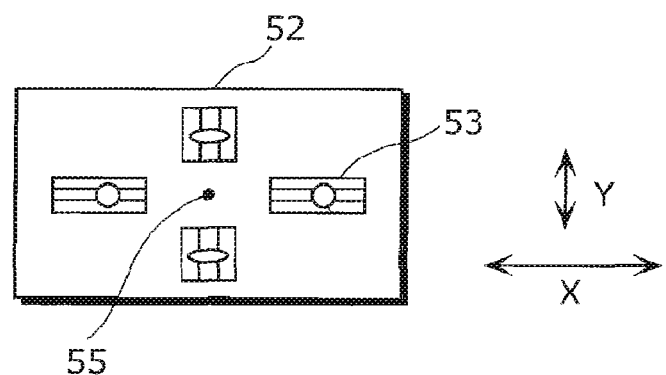
FIG. 24B is a diagram showing the light detecting unit which detects curvature radiuses of beams in two directions.
Figure 25:
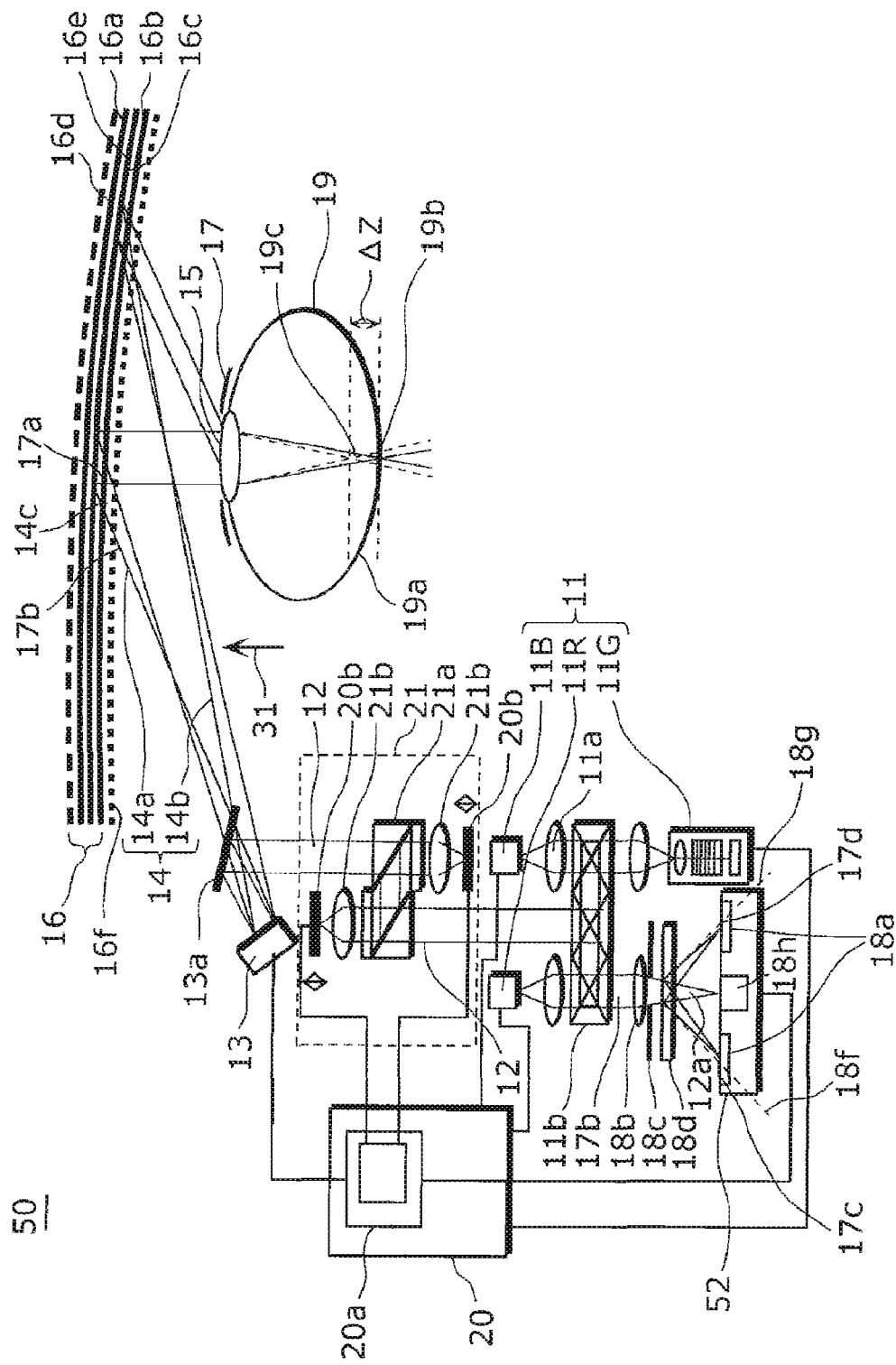
FIG. 25 is a diagram showing a magnified view of main parts of the image display device in Embodiment 5 according to the present invention.

A description is given of a beam scanning-type image display device 50 of Embodiment 5 according to the present invention with reference to FIGS. 24A and 24B, and FIG. 25. FIG. 24A is a diagram showing a servo light generating hologram mirror 51, and FIG. 24B is a diagram showing a light detecting unit 52. FIG. 25 is a schematic structural diagram of the image display device 50.

As shown in FIG. 24A, the hologram pattern 51a is formed such that the curvature radiuses are different between the X direction and the Y direction perpendicular to each other. Thus, a generated reflected light 17b is subjected to different optical effects in the X direction and the Y direction.

As shown in FIG. 24B, the light detecting unit 52 can separately detect the curvature radiuses of the beams in the two directions perpendicular to each other. In other words, among four light receiving elements 53, the two light receiving elements 53 arranged right and left of an apparent light emitting point 55 detect X-direction components of a reflected light 17b, and the two light receiving elements 53 arranged upward and downward of the apparent light emitting point 55 detect Y-direction components of the reflected light 17b.

Further, as shown in FIG. 25, an optical path length adjusting unit 21 of the image display device 50 includes a focal length horizontal component changing unit which changes the wavefront shape of the horizontal direction components (X-direction components) of the laser light 12, and a focal length vertical component changing unit which changes the wavefront shape of the vertical direction components (Y-direction components) of the laser light 12.

With this structure, the focal length horizontal component changing unit changes the wavefront shape of the horizontal direction components of the laser light 12, based on the result of the detection of the X-direction components of the reflected light 17b. Next, the focal length vertical component changing unit changes the wavefront of the vertical direction components of the laser light 12, based on the result of the detection of the Y-direction components of the reflected light 17b.

Highly precise optical adjustments can be made by separately controlling the horizontal direction components and vertical direction components of the wavefront shape of the laser 12 in this way. With this structure, it is possible to make optical adjustments with high precision at high speed, thereby implementing the image display device 50 which displays a video having a high resolution at high speed. In addition, the reflected light used here is the reflected light 17b from the reflection body 17a having a reflectance greater than that of the retina 19a, such optical adjustments can be performed successfully and precisely. As a result, it becomes possible to stabilize optical characteristics against influence of disturbance, shielding of a part of the beams, and the like, thereby allowing the observer to recognize the images precisely and clearly.

(Embodiment 6)

Figure 26A:
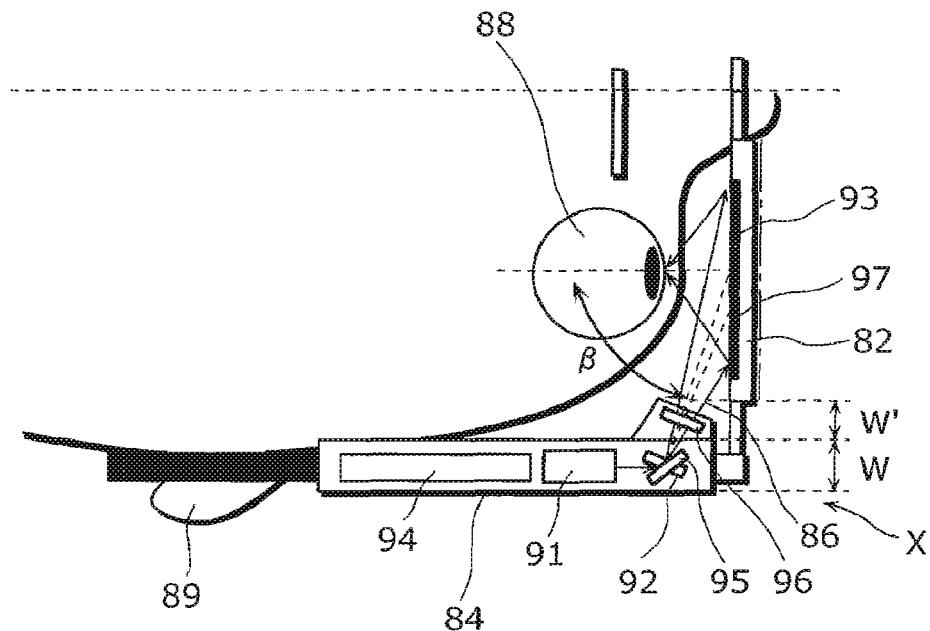
FIG. 26A is a plan view of an eyeglass-type image display device in Embodiment 6 according to the present invention.
Figure 26B:
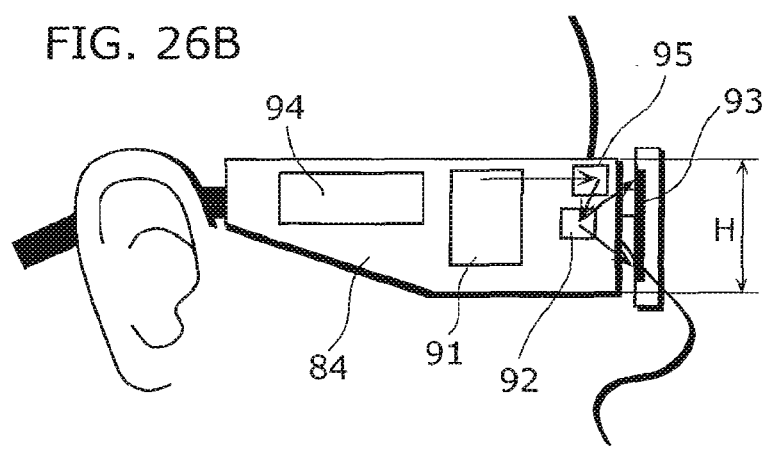
FIG. 26B is a side view of the eyeglass-type image display device in Embodiment 6 according to the present invention.
Figure 26C:
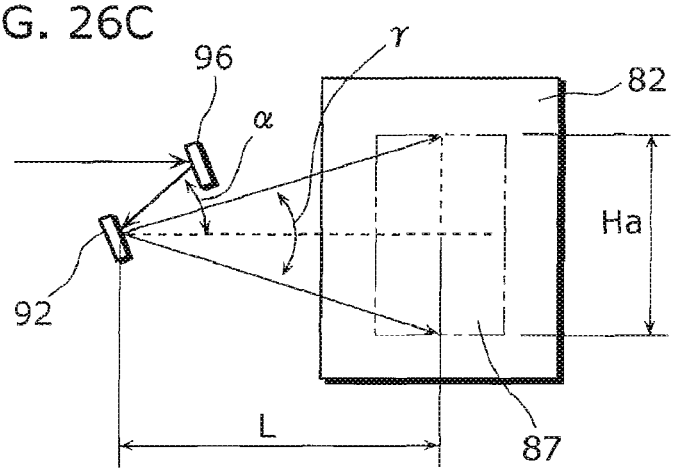
FIG. 26C is an X-arrow view of the eyeglass-type image display device in Embodiment 6 according to the present invention.

Each of FIGS. 26A to 26C shows the structure of the eyeglass-type image display device of Embodiment 6 according to the present invention. FIG. 26A is a plan view of the eyeglass-type image display device, FIG. 26B is a side view of the the same, and FIG. 26C is an arrow view of the same when seen in the X direction vertical to a scanning center axis 97 of the scanning unit.

Figure 38:
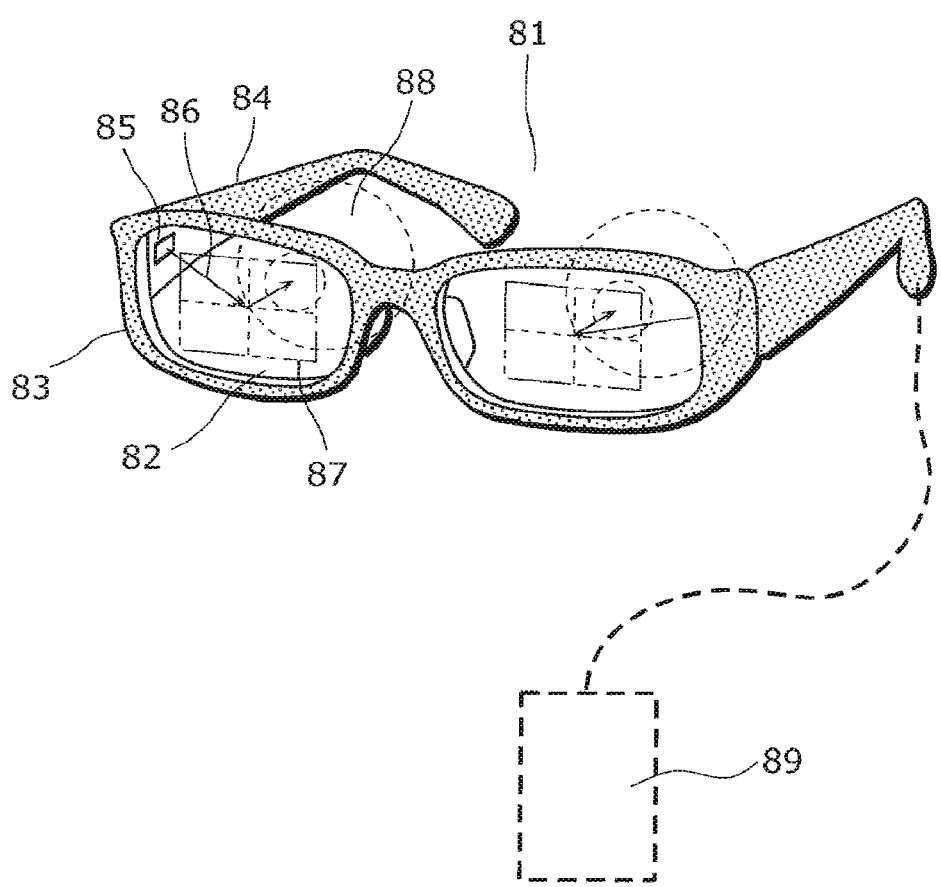
FIG. 38 is a perspective view showing an exemplary appearance of an eyeglass-type image display device.
Figure 39A:
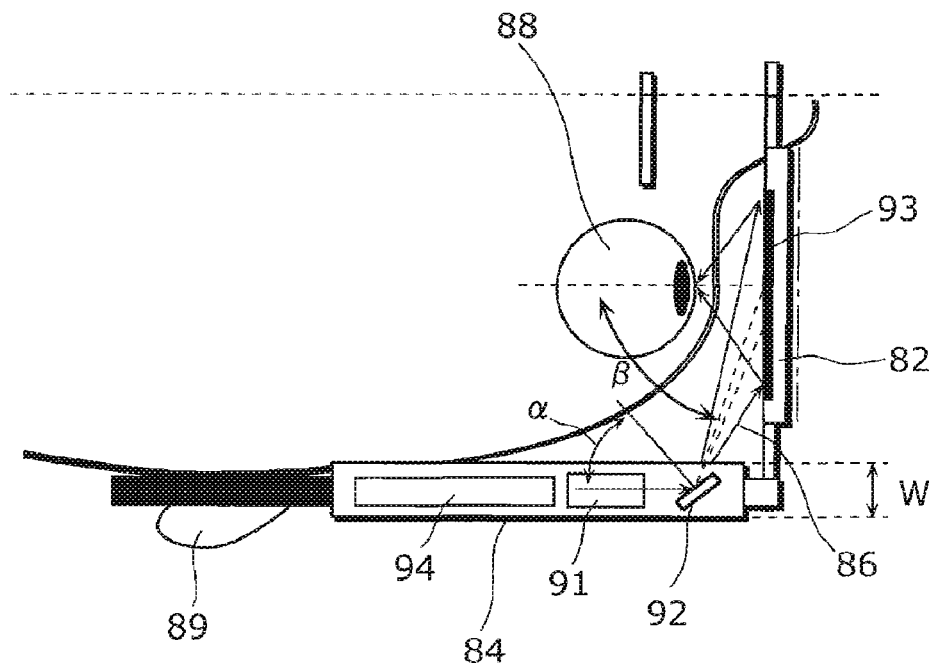
FIG. 39A is a plan view showing a first example of a conventional eyeglass-type image display device.
Figure 39B:
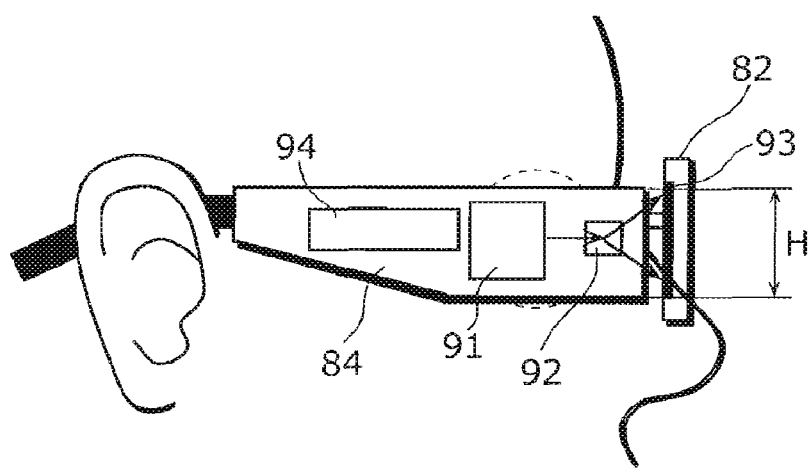
FIG. 39B is a side view showing the first example of the conventional eyeglass-type image display device.
Figure 40A:
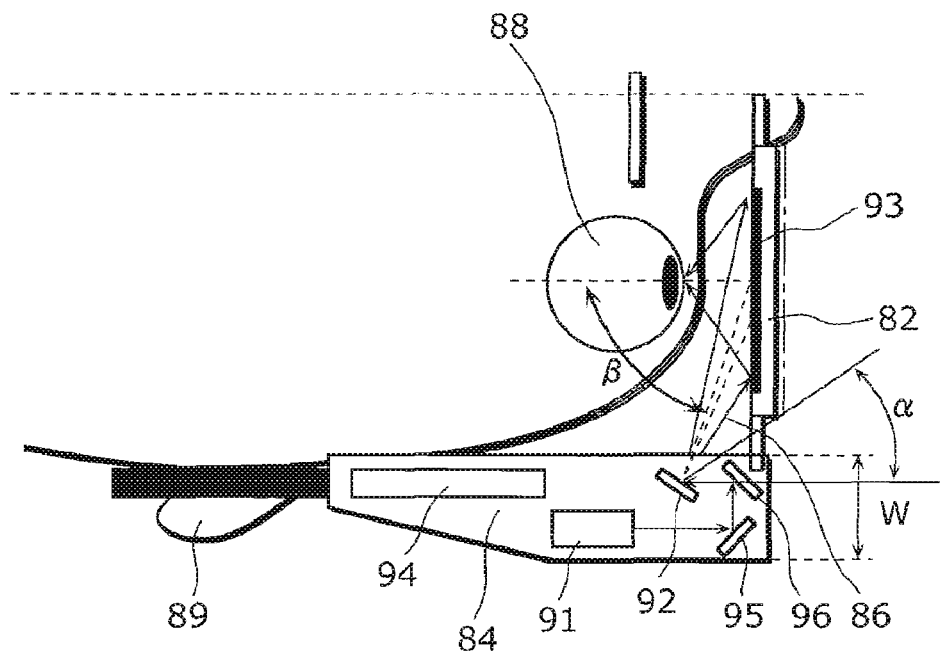
FIG. 40A is a plan view showing a second example of a conventional eyeglass-type image display device.
Figure 40B:
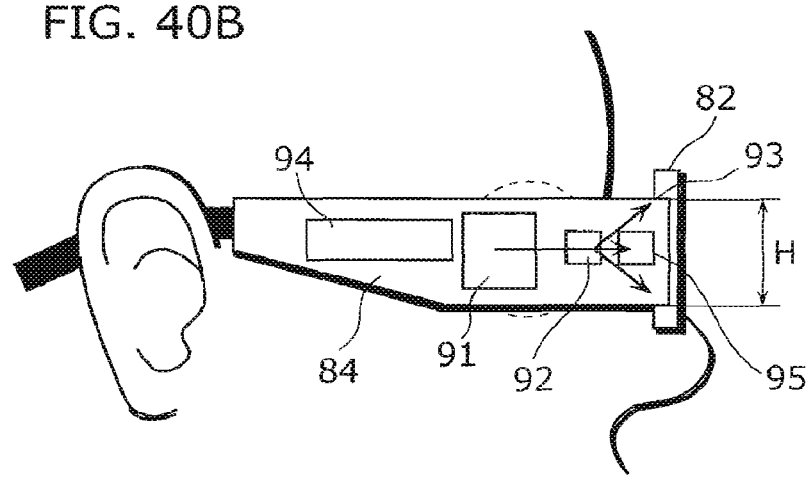
FIG. 40B is a side view showing the second example of the conventional eyeglass-type image display device.
Figure 41:
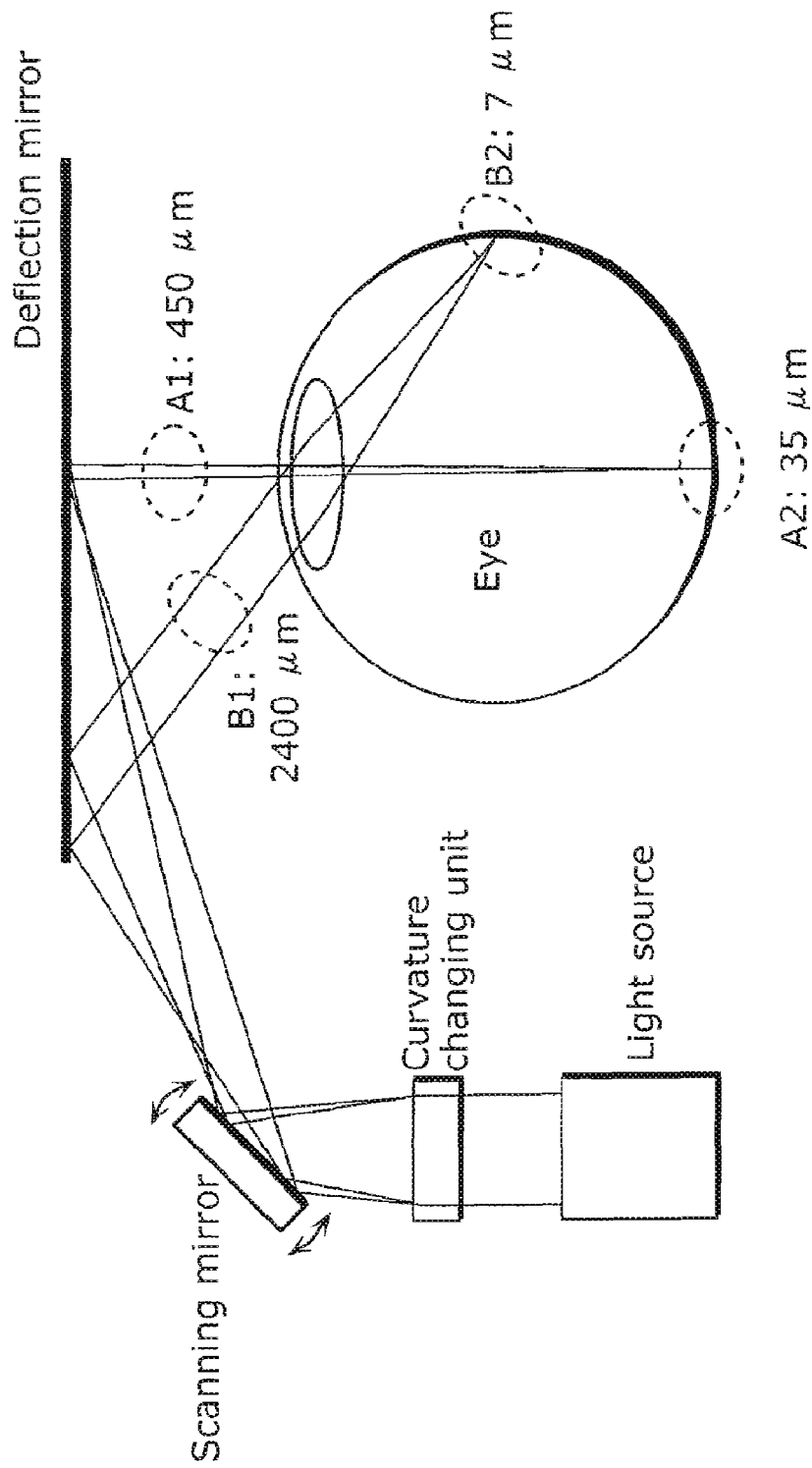
FIG. 41 is a diagram showing a problem in the prior art.
Figure 42:
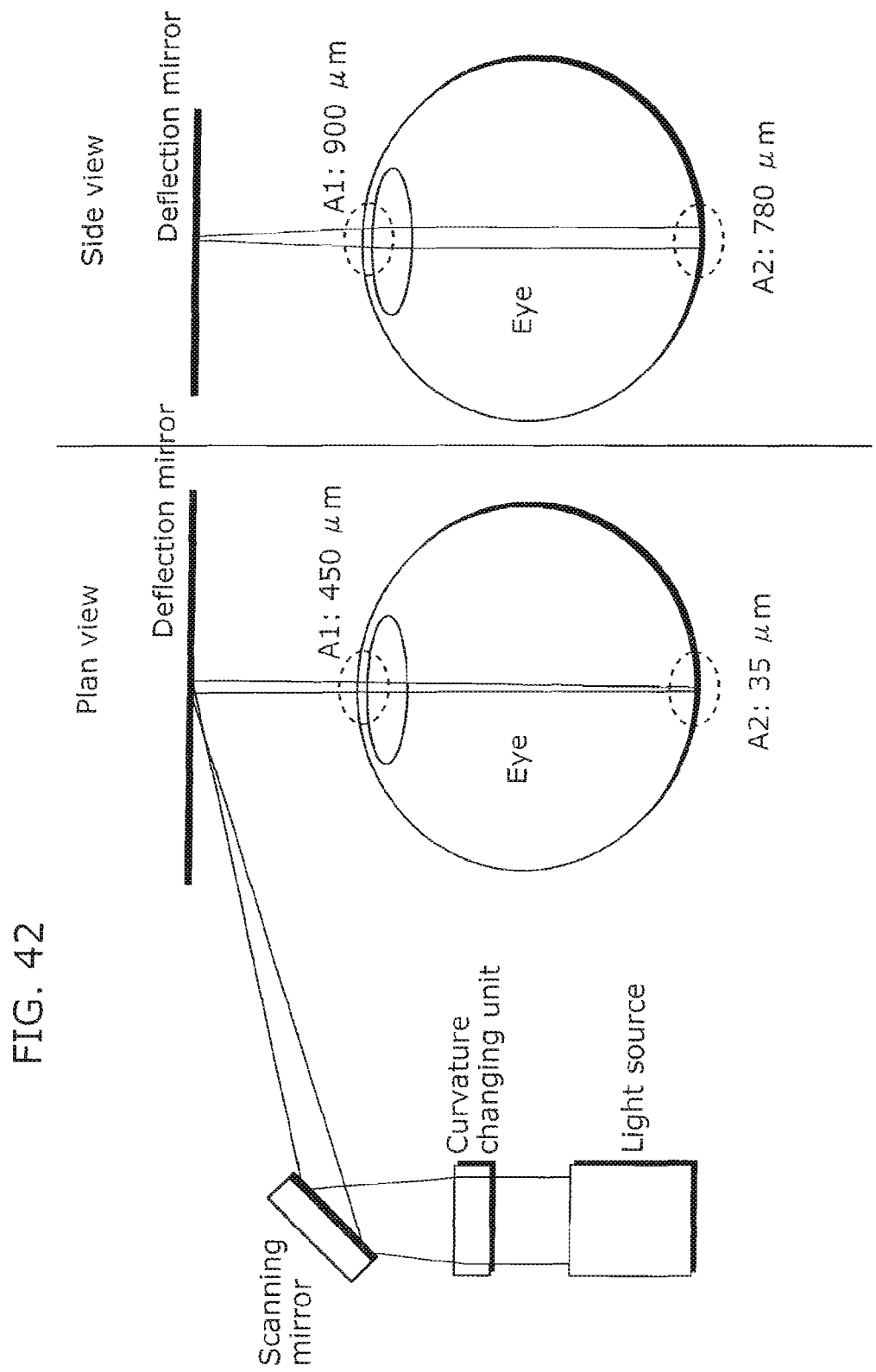
FIG. 42 is a diagram showing a problem in the prior art.

The eyeglass-type image display device 81 shown in each of FIGS. 26A to 26C has the same basic structure as the one in FIG. 38, and includes a pair of eyeglass lenses 82, a lens frame 83 keeping the pair of eyeglass lenses 82 at the positions in front of the right and left eyes, and a pair of temples 84 extending backwards from the outer periphery of the lens frame 83. It is also good to attach the temples 84 directly to the outer periphery of the eyeglass lenses 82 without using the lens frame 83.

The pair of eyeglass lenses 82 have the surfaces facing the eyes 88, and the respective surfaces are provided with deflecting units 93 which deflect a laser beam 86 toward the eyes. Each of the pair of temples 84 mounts therein a light source 91 which emits a laser beam 86, a scanning unit 92 which performs two-dimensional scanning using the laser beam 86, and a control unit 94 which controls the respective units.

The light source 91 is structured to include one of a semiconductor laser, a solid laser, a wavelength converting element, a collimate optical system, and the like, and to form a light condensing spot at a predetermined position on an optical path. In the case of using beams having plural wavelengths for color display, these beams are synthesized into a single beam using a wave synthesizing optical system. It is also good to include a focus control optical system so that a focus is properly placed on a user's retina.

The control unit 94 modulates the intensity of the light from the light source 91 according to an image to be displayed such that the scanning unit 92 operates in synchronization with the modulation. In the modulation control, the laser light source may be modulated directly, or a modulating element such as an acoustooptic (AO) element may also be used.

The scanning unit 92 uses a small MEMS mirror. Devices supporting the following various driving methods can be applied: an electromagnet driving method, an electrostatic driving method, a piezo-electric driving method, a thermal driving method, and possible combinations of these driving methods.

A laser beam 86 is projected toward the eyeglass lens 82 by the scanning unit 92, is reflected by the deflecting unit 93 which is a hologram mirror formed on the surface of the eyeglass lens 82, enters the user's eye 88, and forms an image on the user's retina. The hologram mirror is a photopolymer layer on which a Lippman volumetric hologram is formed. The hologram mirror has a wave selectivity, and thus reflects only the laser beam having a particular wavelength. As a result, the user can visually recognize both the landscape and the image drawn by the laser beam at the same time.

When performing color display, it is also good to form three holograms which reflect light from the red, green, and blue light sources on the photopolymer layer in a multiplexed manner, or to laminate the three holograms corresponding to the respective color lights.

This structure is different from the structure shown in each of FIG. 39A to FIG. 40B in that a folding mirror 95 is provided at a position isolated from the MEMS mirror in the vertical direction (upwardly, in Embodiment 6), and a folding mirror 96 is disposed in the direction toward the eyeglass lens 82 when seen from the MEMS mirror 96.

In other words, firstly, the folding mirror 95 disposed upward of the MEMS mirror deflects the laser beam in the direction toward the scanning center axis 97, and secondly, the folding mirror 96 returns the deflected light to the MEMS mirror. This makes it possible to make an incidence angle of the laser beam 86 emitted from the light source 91 smaller than the one obtainable in the case of allowing the laser beam 86 to enter the scanning unit 92 directly. More specifically, as shown in FIG. 26C, the folding mirror 96 is disposed such that it does not interfere the laser beam in the scanning range in the vertical direction.

In other words, the folding mirror 95 is disposed such that the horizontal position is within an area enclosed by the left and right ends of the scanning unit 92 and the deflecting unit 93, and the vertical position is outside an area enclosed by the upper and lower ends of the scanning unit 92 and the deflecting unit 93.

In this example, the vertical scanning angle is represented as =ATAN (Ha/2/L)=16 degrees when a vertical scanning area Ha is 20 mm, a projection distance L is 35 mm; the incidence angle α is around 20 to 25 degrees. Accordingly, the structure in this example can be made smaller than the structure in FIGS. 40A and 40B.

When the incidence angle α is 25 degrees, a MEMS mirror size Dm may be 1.1 times the laser beam diameter Db. In addition, since the folding mirror 95 is disposed above the MEMS mirror, it is unnecessary to secure space outside the MEMS mirror, and thus there is no possibility that the horizontal dimension W becomes great. In the case of disposing the folding mirror 96 at a position in a range from the MEMS mirror to, the eyeglass lens 82, a small convex having a horizontal dimension W' is necessary inside the temple 84. However, the small convex does not affect the appearance so much, and thus does not damage the design and comfort.

In the case of disposing the folding mirror 96 along the vertical surface including the scanning center axis 97 of the scanning unit 92, the incidence angle in the horizontal direction is 0 degrees, which allows use of a small MEMS mirror.

This structure eliminates the necessity of using a large MEMS mirror, thereby reducing the horizontal dimension of the temple 84. Therefore, it is possible to implement comfortable eyeglass-type image display device 81 which wears comfort and achieves high-resolution image display.

The folding mirrors 95 and 96 are arranged above the scanning units 92 in this embodiment, but they may be arranged below the scanning units 92.

(Embodiment 7)

Figure 27A:
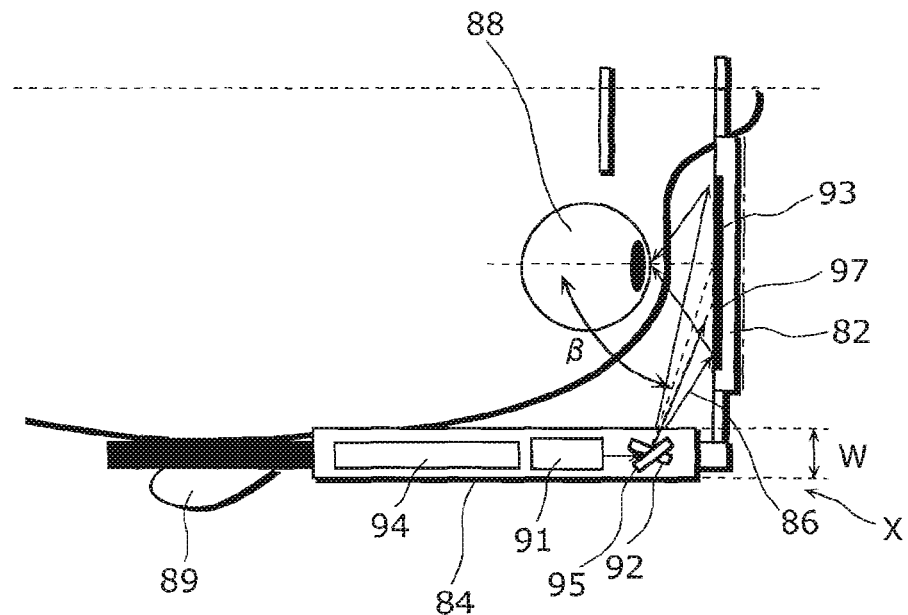
FIG. 27A is a plan view of an eyeglass-type image display device in Embodiment 7 according to the present invention.
Figure 27B:
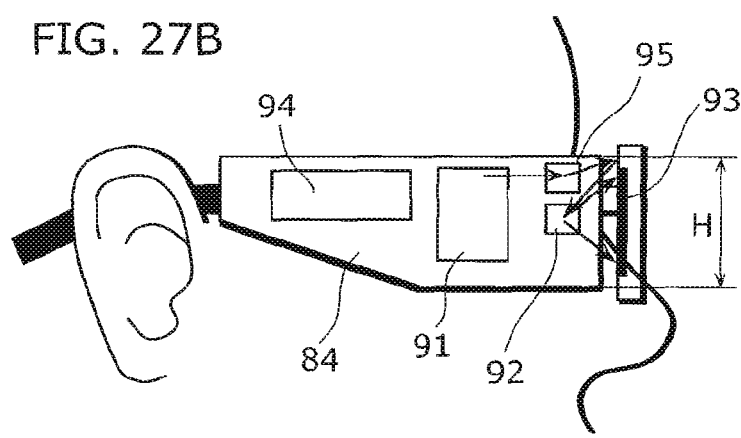
FIG. 27B is a side view of the eyeglass-type image display device in Embodiment 7 according to the present invention.
Figure 27C:
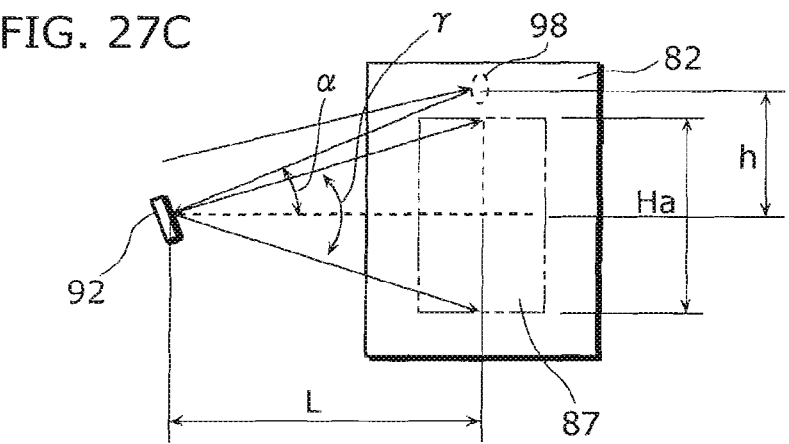
FIG. 27C is an X-arrow view of the eyeglass-type image display device in Embodiment 7 according to the present invention.

Each of FIGS. 27A to 27C shows the structure of the eyeglass-type image display device 81 of Embodiment 7 according to the present invention. FIG. 27A is a plan view of the eyeglass-type image display device 81, FIG. 27B is a side view of the same, and FIG. 27C is an arrow view of the same when seen from the X direction vertical to the scanning center axis 97.

Likewise the structure shown in FIGS. 26A to 26C, in FIGS. 27A to 27C, the eyeglass-type image display device 81 mounts therein: a temple 84 including: a light source 91 which emits a laser beam 86, a scanning unit 92 which performs two-dimensional scanning using the laser beam 86, and a control unit 94 which controls the respective units. The laser beam 86 is projected toward the eyeglass lens 82 by the scanning unit 92, is reflected by the deflecting unit 93 which is a hologram mirror formed on the surface of the eyeglass lens 82, enters the user's eye 88, and forms an image on the user's retina. The hologram mirror is a photopolymer layer on which a Lippman volumetric hologram is formed. The hologram mirror has a wave selectivity, and thus reflects only the laser beam having a particular wavelength. As a result, the user can visually recognize both the landscape and the image drawn by the laser beam at the same time.

The difference with Embodiment 6 lies in the point that the deflecting unit 93 includes an image reflection area 87, and a folding reflection area 98 as a second deflecting unit on the upper part of the image reflection area 87. The folding reflection area 98 substitutes the folding mirror 96 in Embodiment 6 by functioning similarly.

In other words, firstly, the folding mirror 95 disposed upward of the MEMS mirror deflects the laser beam in the direction toward the scanning center axis 97, and secondly, the folding reflection area 98 disposed upward of the image reflection area 87 of the deflecting unit 93 folds the deflected laser beam in the direction toward the MEMS mirror, so as to decrease the incident angle of the laser beam.

More specifically, as shown in FIG. 27C, the folding reflection area 98 is formed adjacently above the image reflection area 87, which makes it possible to prevent the laser beam from interference in the scanning range in the vertical direction and reduce the incidence angle α to a half of the vertical scanning angle γ.

The vertical scanning angle γ in Embodiment 6 is represented as γ=ATAN (Ha/2/L)=16 degrees when a vertical scanning area Ha is 20 mm, a projection distance L is 35 mm; the incidence angle α is around 20 to 25 degrees. Disposing the folding reflection area 98 at a position represented as height h=12 mm from the scanning center reduces the incident angle α to approximately 19 degrees. Accordingly, the structure in this example can be made smaller than the structure in FIGS. 26A to 26C.

When α is 19 degrees, the MEMS mirror size Dm may be 1.06 times the laser beam diameter Db.

In addition, since the folding mirror 95 is disposed above the MEMS mirror, it is unnecessary to secure space outside the MEMS mirror, and thus there is no possibility that the horizontal dimension W becomes great. Providing the folding reflection area 98 as the second deflecting unit on the eyeglass lens 82 eliminates the necessity of additionally disposing a mirror at a position in a range from the MEMS mirror to the eyeglass lens 82 and thus the temple 84 does not have any convex inside. This structure is the optimum in view of design and conformity.

In addition, disposing the folding reflection area 98 along the vertical surface including the scanning center axis of the scanning unit 92 as in Embodiment 6 reduces the incidence angle in the horizontal direction to 0 degrees. This allows use of a small MEMS mirror.

This structure eliminates the necessity of using a large MEMS mirror, thereby reducing the horizontal dimension of the temple 84. Therefore, it is possible to implement comfortable eyeglass-type image display device 81 which achieves high-resolution image display.

Furthermore, this structure provides the folding reflection area 98 with aberration characteristics. This can be achieved by providing a first generation optical system which forms an image reflection area 87 and a second generation optical system which forms a folding reflection area 98, and adding aberration components to a reference light of the second generation optical system, in forming the hologram mirror which is the deflecting unit 93.

It is only necessary to determine aberration components which correct a coma aberration and the like of the deflecting unit 93. The deflecting unit 93 is structured so that light emitted from the scanning center of the scanning unit 92 is condensed to the user's eye 88. However, since the light enters obliquely in the horizontal direction, the deflecting unit 93 has a characteristic that the light condensing powers change sequentially depending on the beam scanning positions in the horizontal direction.

Thus, when a laser beam is irradiated on a certain part, a coma aberration may occur because the light condensing power is slightly different at opposing positions on the periphery of the beam. In this case, the condensing spot on the user's retina is spread, resulting in a decrease in the resolution. The coma aberration like this can be corrected by irradiating aberration on the folding reflection area 98 having aberration characteristics, which allows display with higher resolution.

The folding reflection area 98 is provided above the image reflection area 87 in this embodiment, but it is to be noted that the folding reflection area 98 may be provided below the image reflection area 87. In addition, the eyeglass lens 82 may have or may not have a corrective power.

The above description has been given of the structure in which the deflecting unit 93 is directly formed on the eyeglass lens 82, but the same advantageous effect can be obtained according to a scheme in which a deflecting unit is formed on a substrate and then attached inside the eyeglass lens 82.

It is to be noted that each of the embodiments solely provides the advantageous effect as a matter of course, and further provides a synergy effect when they are arbitrarily combined. For example, an idea is using the hologram mirror in Embodiment 3 as a deflecting unit 104 in Embodiments 1 and 2.

The control processing in each of the above-described embodiments is performed when a CPU interprets and executes predetermined program data for executing the above-described procedures stored on a recording means (such as a ROM, a RAM, a hard disc, or the like). In this case, the program data may be introduced inside the recording means through a recording medium. Here, recording media include a ROM, a RAM, a semiconductor memory such as a flash memory, a magnetic disc memory such as a flexible disc and a hard disk, an optical disc such as a CD-ROM, a DVD, a BD, and the like, and a memory card such as an SD card. The concept of recording media includes communication media such as a telephone network and a carrier path.

Further, each of the functional blocks of the beam scanning-type display device shown in FIG. 9A may be implemented as an LSI which is an integrated circuit. This LSI may be integrated into one chip, or may be integrated into plural chips. For example, the functional blocks other than a memory may be integrated into one chip. Here, it is called LSI, but it may also be called IC, system LSI, super LSI, or ultra LSI depending on the degree of integration.

Moreover, ways to achieve an integrated circuit are not limited to the use of the LSI. A special circuit or a general purpose processor and so forth may also be used for achieving the integration. A field programmable gate array (FPGA) that can be programmed or a reconfigurable processor that allows re-configuration of the connection or configuration of LSI may be used after LSI is manufactured.

Next, a description is given of various applications of the beam scanning-type display device according to the above-described embodiments with reference to FIG. 28 to FIG. 33. The following applications are described taking Embodiment 1 as an example, but these applications may be applied to each of Embodiments 2 to 7 or any combination of Embodiments 1 to 7. As a matter of course, the applications for the beam scanning-type display device according to the respective embodiments are illustrative, and thus applications for the beam scanning-type display device are not limited to the illustrative applications.

(Embodiment 8)

Figure 28:
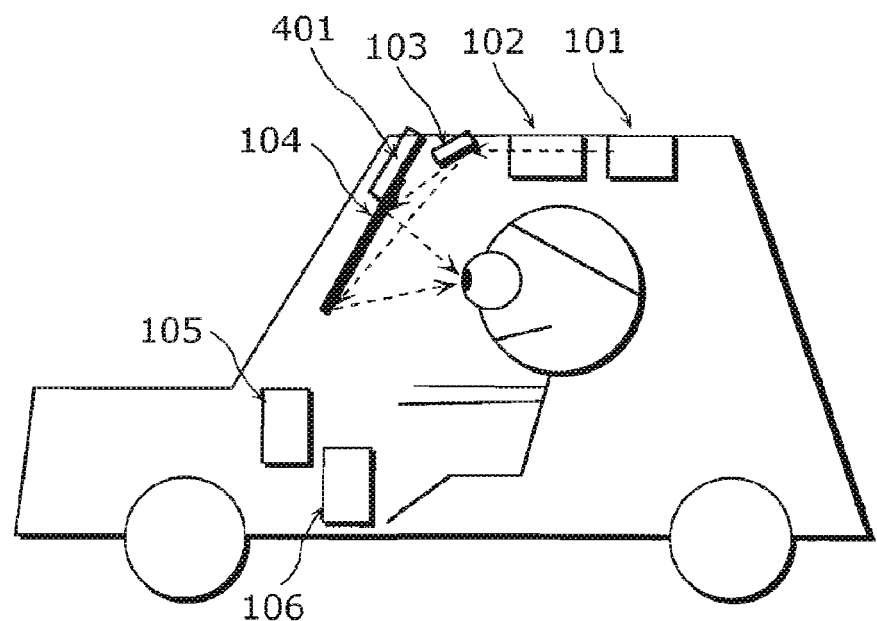
FIG. 28 is a structural diagram of a HUD for cars in Embodiment 8 according to the present invention.

FIG. 28 is a structural diagram of a head-up display (HUD) for cars in Embodiment 8 according to the present invention.

The HUD includes a light source 101, a wavefront shape changing unit 102, a scanning unit 103, a deflecting unit 104, a control unit 105, and a headphone unit 106 which have the same basic structures as those in Embodiment 1, and thus operate similarly.

In this embodiment, a video is displayed to a user in a car. As in Embodiment 1, the deflecting unit 104 has a characteristic of reflecting a beam and a characteristic of transmitting visible light from outside the car, which allows the user to watch display according to the present invention while seeing landscape outside the car. This provides an advantageous effect of allowing the user to watch information relating to a car speed, a caution and alert, driving actions such as navigation guidance, a current location, and the like, while seeing the landscape outside the car.

As shown in FIG. 28, the light source 101, the wavefront shape changing unit 102, and the scanning unit 103 may be arranged at positions around the ceiling of the car. This provides an advantageous effect of not shielding the user's visual field from outside the window. Further, since they are arranged at the positions close to the user's eyes, the optical path becomes shorter, which provides an advantageous effect of increasing display precision. In addition, the HUD may be structured such that the light source 101 is disposed at a position, such as a position below the car body, which is distant from the wavefront shape changing unit 102, and beams are transmitted from the light source 101 to the wavefront shape changing unit 102 via an optical fiber. This provides an advantageous effect of decreasing the dimensions of an area, on the ceiling part, on which the light source 101 is disposed.

The control unit 105 may be disposed inside a dashboard of the car. The control unit 105 may be integrated into a control device which is not the display device according to the present invention. For example, the control device may be a car speed management device, or a guidance control device (car navigation system). This makes it possible to provide an advantageous effect of decreasing the total number of control devices.

It is not necessary that the headphone unit 106 is in contact with an ear of the user, and for example, the headphone unit 106 may be a speaker attached on a car surface around the user or may be mounted inside a door or a front dashboard of the car.

The deflecting unit supporting unit 401 is attached on the ceiling or an upper part of a window, and supports the deflecting unit 104. The deflecting unit supporting unit 401 has a position adjusting function for adjusting the position and orientation of the deflecting unit 104 according to the position of the user's head. The HUD may be structured to allow a user to manually make such adjustments, or to make such adjustments automatically. A good method for automatic adjustment is a method of setting a camera at a position around the deflecting unit supporting unit 401, causing the camera to capture images so as to recognize the positional variations of the head so and eyes of the user, and adjusting the position and angle of the deflecting unit 104 to a proper position and angle by moving and rotating the deflecting unit 104.

(Embodiment 9)

Figure 29:
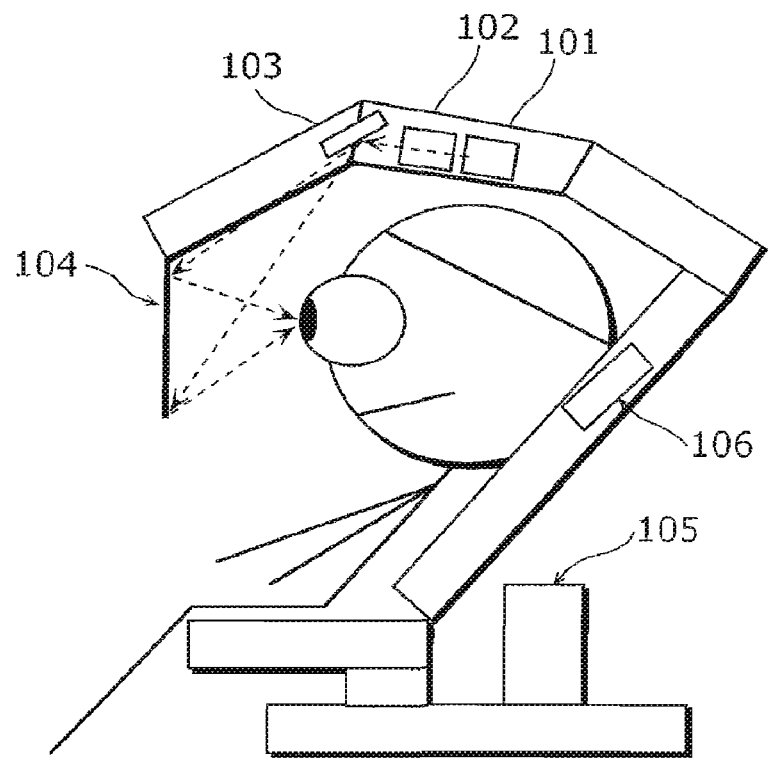
FIG. 29 is a structural diagram of a display device for chairs in Embodiment 9 according to the present invention.

FIG. 29 is a structural diagram of a car-seat attachable-type display device in Embodiment 9 according to the present invention.

The display device includes a light source 101, a wavefront shape changing unit 102, a scanning unit 103, a deflecting unit 104, a control unit 105, and a headphone unit 106 which have the same basic structures as those in Embodiment 1, and thus operate similarly. In this embodiment, a video is displayed to the user sit on a car seat.

As shown in FIG. 29, the light source 101, wavefront shape changing unit 102, scanning unit 103 of the display device may be arranged at positions toward the deflecting unit 104 in front of an eye of the user from the seat back. In FIG. 29, they are arranged above the user's head, but they may be arranged near a temple of the user or below the head.

The control unit 105 may be disposed below the seat. The control unit 105 may be integrated into a control device which is not the display device according to the present invention. For example, the control device may be a massage control device. This makes it possible to provide an advantageous effect of decreasing the total number of control devices.

The headphone unit 106 may be a headphone in contact with an ear of the user or a speaker attached to a position near a back or side of the user's head.

(Embodiment 10)

Figure 30:
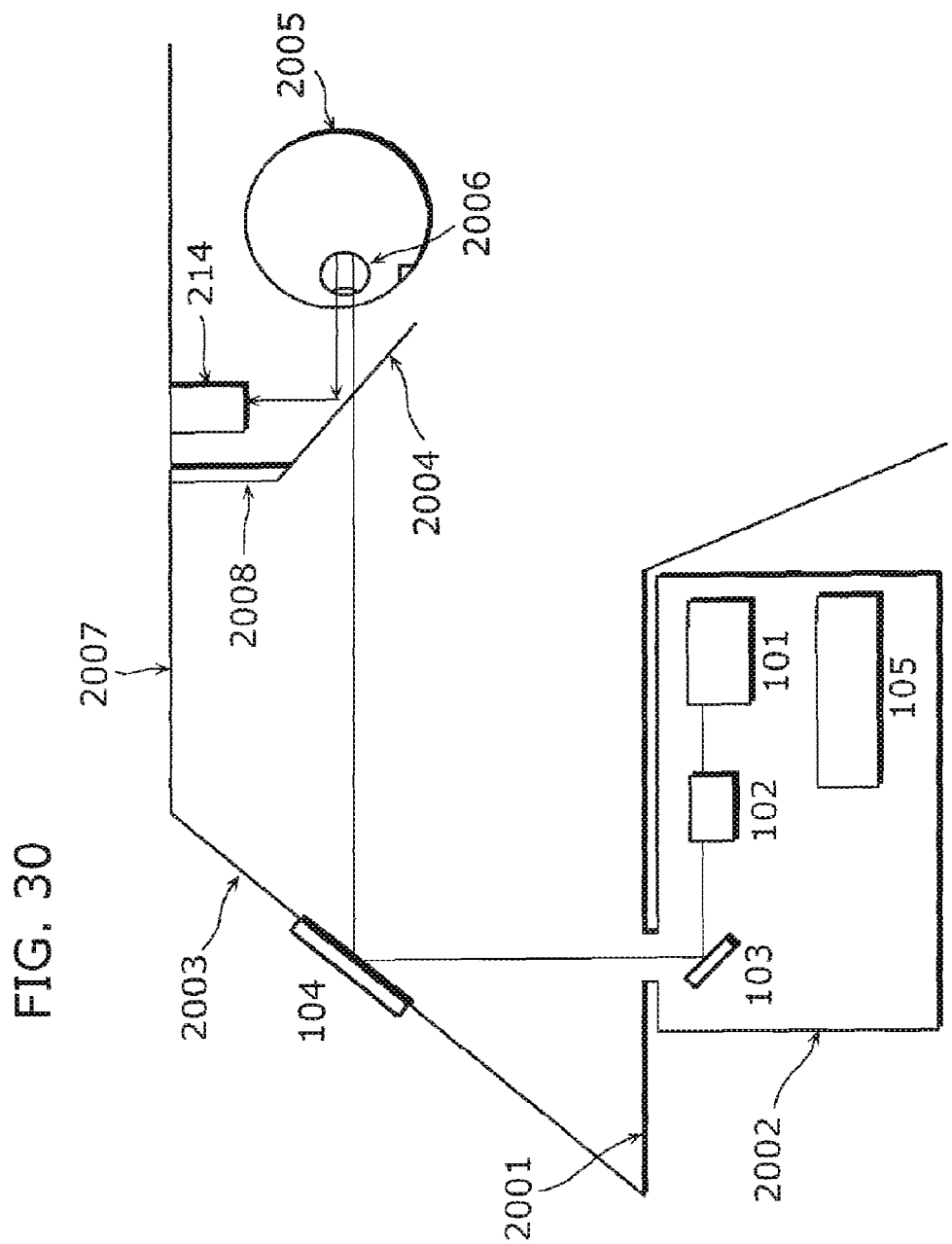
FIG. 30 is a structural diagram of an HUD in Embodiment 10 according to the present invention.
Figure 31:
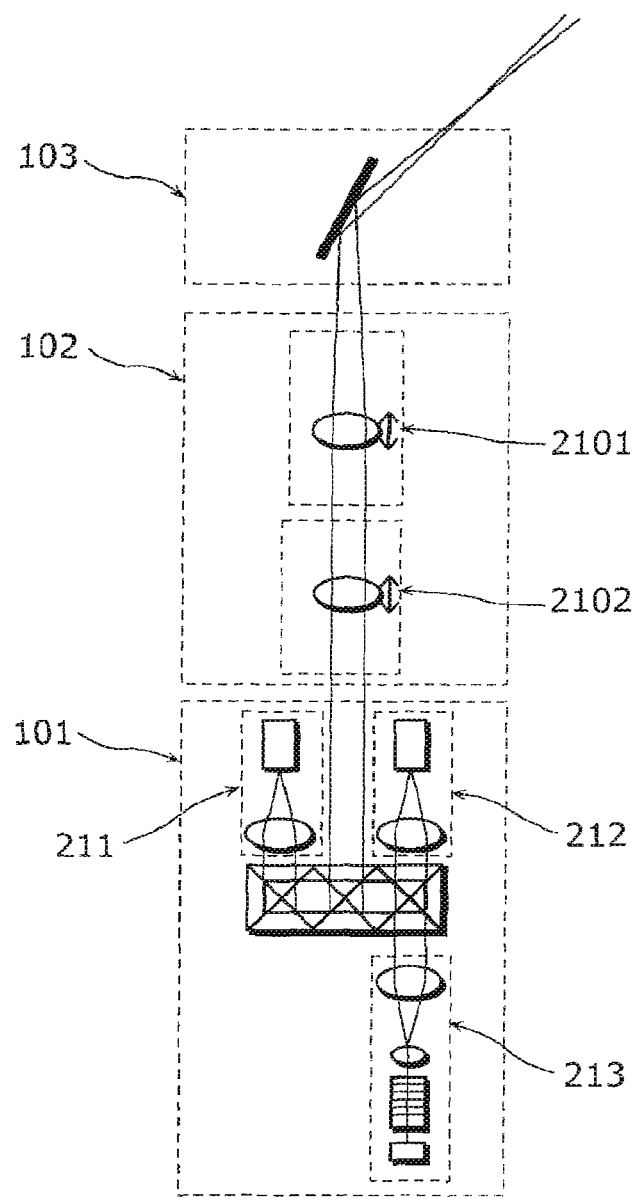
FIG. 31 is a detailed diagram of a laser scanning unit shown in FIG. 30.

FIG. 30 is a structural diagram (side view) of a laser scanning-type head-up display (HUD) in Embodiment 10 according to the present invention. FIG. 31 is a detailed structural diagram of the laser scanning unit 2002 shown in FIG. 30.

The laser scanning unit 2002 is disposed below a windshield 2003 of a car 2001, more specifically, inside an instrument panel of the car, which reduces the space required for the display device.

The laser scanning unit 2002 may be disposed not inside but outside the instrument panel. This makes easier replacement of and positional change in the laser scanning unit 2002.

The light used for the scanning performed by the laser scanning unit 2002 is reflected by the deflecting unit 104 attached to the windshield 2003, passes through a half mirror 2004, and reaches the eyeball 2006 of the driver 2005, which allows the user to visually recognize a resulting video. With this HUD, the user can watch map information and alert information displayed by the laser scanning unit 2002 while seeing landscape in the external world through the windshield 2003. This makes it possible to increase safety and userfriendliness for the driver.

The reflected light of the laser projected on the user's retina is reflected by the half mirror 2004 disposed in front of the user's eye, and detected by the light detecting unit 214.

The laser scanning unit 2002 is structured with the light source 101, the wavefront shape changing unit 102, the scanning unit 103, and the control unit 105. FIG. 31 shows exemplary structures of the light source 101, wavefront shape changing unit 102, and deflecting unit 104 in this embodiment.

As in FIG. 2, the light source 101 in FIG. 31 is composed of a red laser light source 211, a blue laser light source 212, and a green laser light source 213. In this embodiment, as shown in FIG. 30, the light detecting unit 214 is not included in the light source 101, and disposed at a position on a ceiling 2007 of the car. With this structure, it becomes possible to shorten the distance between the user's retina and the light detecting unit 214, thereby facilitating detection of spot sizes on the retina.

The wavefront shape changing unit 102 in FIG. 31 includes a focal length horizontal component changing unit 2101 and a focal length vertical component changing unit 2102 in series on optical path. This makes it possible to separately change the curvatures in the horizontal and vertical directions of the waveform shape. In this embodiment, the focal length horizontal component changing unit 2101 and the focal length vertical component changing unit 2102 change the curvatures in the horizontal and vertical directions by changing the positions of their cylindrical lenses.

As in the wavefront shape changing unit 102 in Embodiment 1 shown in FIG. 2, each of the focal length horizontal component changing unit 2101 and the focal length vertical component changing unit 2102 may change the wavefront shape by using a combination of its cylindrical lens and a mirror and changing the position of the mirror. In this case, fast vibration of the mirror makes it possible to properly change the wavefront shape even in the case of displaying an image having a high resolution or a video having a high frame rate.

In addition, the deflecting unit 104 in this embodiment is implemented as a see-through hologram. In this embodiment, for example, the deflecting unit 104 including a photopolymer layer in which a Lippman volumetric hologram is formed is formed inside the windshield 2003 (the side facing the user's eye) so that a beam from the scanning unit 103 is diffracted and condensed to the user's pupil.

In the photopolymer layer, three holograms which reflect red, green and blue lights from corresponding light sources may be formed in a multiplexed manner, or three holograms corresponding to the respective color lights may be laminated. In addition, it is possible to configure a see-through display by diffracting only lights having a light source wavelength and not diffracting lights having a wavelength other than the light source wavelength using the wavelength selectivity of the holograms. Almost all the lights from outside are the latter.

It is also good that the deflecting unit 104 may be freely attachable/detachable from/to the windshield 2003. In this case, detaching the deflecting unit 104 when display on display screen is unnecessary makes it possible to render the windshield 2003 transparent, thereby increasing safety for the driver.

The deflecting unit 104 may reflect the light from the scanning unit 103 not to one of the user's eyes but to both of the user's eyes. In this case, it becomes possible to display a video on both the user's eyes using a single deflecting unit 104 only.

In Embodiment 10 according to the present invention, a half mirror 2004 is disposed in front of a user's eye so that the half mirror 2004 reflects a reflected light from the user's retina to the light detecting unit 214. The half mirror 2004 is supported by the supporting bars 2008 to be attached on the ceiling 2007 of the car 2001. With this structure, it is possible to detect spot sizes on the user's retina without forcing the user to mount the device on the head.

The half mirror 2004 and the light detecting unit 214 may be attached not to the ceiling of the car 2001 but to an eyeglass or a cap that the driver is wearing. In this case, it is unlikely that the user's head touches the half mirror even when the user's head moves forward and backward, which increases safety for the driver.

The control unit 105 includes an integrated circuit which controls the respective units of the HUD. The control unit 105 controls the output by the respective lasers, the wavefront shape changing unit 102, the scanning unit 103, and the light detecting unit 214. In this embodiment, the light detecting unit 214 is attached to the ceiling, and the control unit 105 is disposed inside the instrument panel. However, communications between the light detecting unit 214 and the control unit 105 may be established through either wireless communication or wired communication using a cable in the car.

FIG. 30 shows only one of the user's eyes. However, it is also good to prepare another laser scanning unit 2002, deflecting unit 104, and light detecting unit 214, and use these units in control of the curvature radiuses of beams that enter the eye. In this case, it is possible to set different beam curvature radiuses for the respective eyes when the visual resolutions of the right eye and left eye are different from each other. This prevents a situation where a video is blurred in either one of the eyes.

(Embodiment 11)

Figure 32:
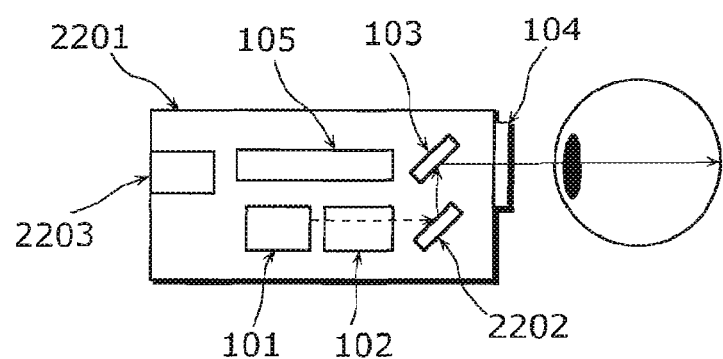
FIG. 32 is a structural diagram of a laser scanning-type monocular in Embodiment 11 according to the present invention.

FIG. 32 is a structural diagram (side view) of a laser scanning-type monocular 2201 in Embodiment 11 according to the present invention.

The monocular 2201 includes a camera 2203, and thus the user can watch a video captured by the camera 2203 and a video from an external video device connected to an input terminal of the monocular 2201 when looking into the monocular 2201. With the structure shown in FIG. 32, the user does not need to mount the device on the head as in the case of the HMD, and thus the user can easily use the beam scanning-type display device outdoor.

The monocular 2201 includes a light source 101, a wavefront shape changing unit 102, a scanning unit 103, a deflecting unit 104, a control unit 105, a camera 2203, and a folding mirror 2202.

As in FIG. 2, the light source 101 in FIG. 32 includes a red laser light source 211, a blue laser light source 212, a green laser light source 213, and a light detecting unit 214.

The wavefront shape changing unit 102 in FIG. 32 includes a focal length horizontal component changing unit 201 and a focal length vertical component changing unit 202 which are arranged in series on an optical path. This makes it possible to separately change the curvatures in the horizontal and vertical directions of the waveform shape. In this embodiment, as shown in FIG. 2, the wavefront shape in the vertical direction and the horizontal direction is changed by changing the positions of mirrors in the pairs of a cylindrical lens and a mirror.

The beam from the wavefront shape changing unit 102 is folded by the folding mirror 2202, is scanned by the scanning unit 103, and enters the deflecting unit 104.

The deflecting unit 104 is an ocular lens disposed at an ocular portion of the monocular 2201, and condenses the light from the scanning unit 103 on the user's pupil. The deflecting unit 104 may be a see-through hologram, instead of a convex lens. In this case, it is possible to make the monocular 2201 smaller by making the ocular lens portion thinner.

The reflected light from the user's retina inversely tracks the path for the incident light, and is detected by the light detecting unit 214.

The control unit 105 includes an integrated circuit which controls the respective units of the monocular 2201. The control unit 105 controls the emission by the respective lasers, the wavefront shape changing unit 102, the scanning unit 103, the light detecting unit 214, and the camera 2203.

FIG. 32 shows only one of the user's eyes. However, it is also good to prepare a binocular including another light source 101, wavefront shape changing unit 102, scanning unit 103, deflecting unit 104, and light detecting unit 214, and to control the curvature radiuses of beams that enter the eyes. In this case, it is possible to set different beam curvature radiuses for the respective eyes when the visual resolutions of the right eye and left eye are different from each other. This prevents a situation where a video is blurred in either one of the eyes.

In the case of a binocular, it is also good to employ a method of dispersing the beam from the light source 101 using a prism or the like so that the dispersed beam enters into the wavefront shape changing units 102 used for display for the right and left eyes using the same light source 101 for display for the right and left eyes.

In this case, it becomes possible to make the binocular smaller because the required number of light sources decreases, and reduce electric power consumption.

(Embodiment 12)

Figure 33:
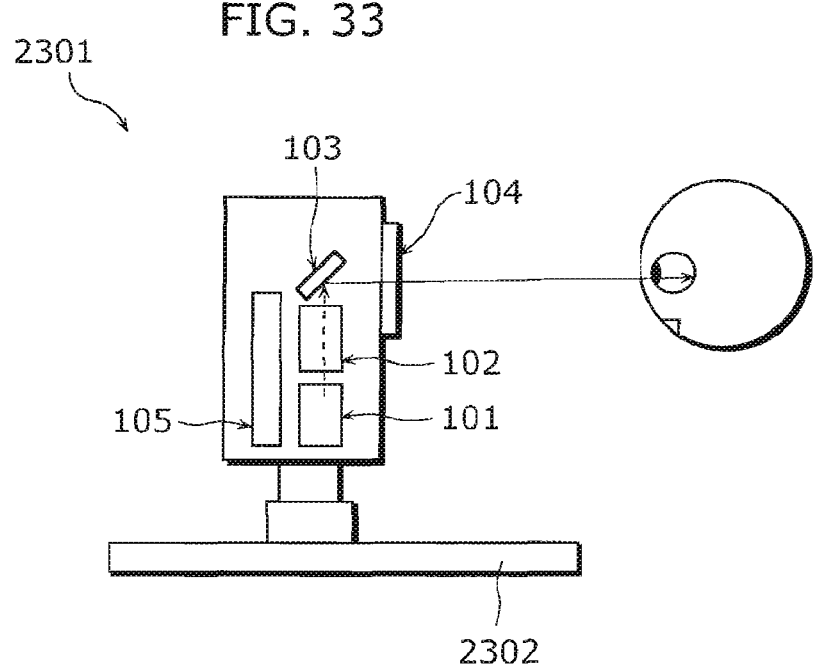
FIG. 33 is a structural diagram of a laser scanning-type display in Embodiment 12 according to the present invention.
Figure 35:
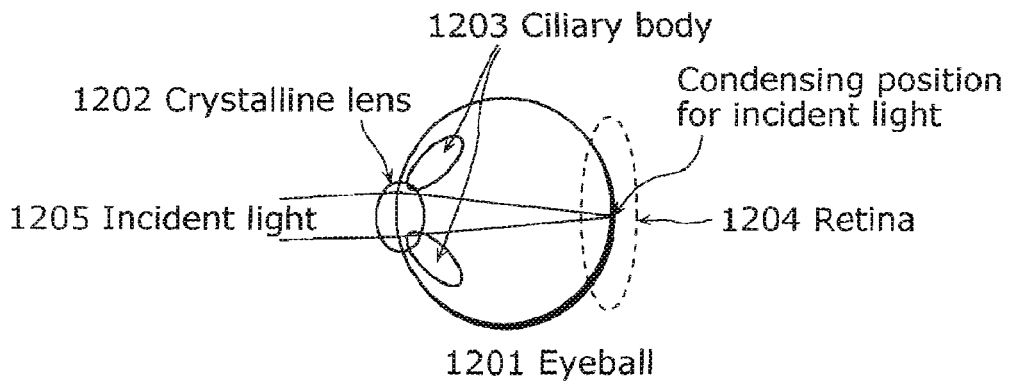
FIG. 35 is a cross-sectional view showing the structure of a human eye.
Figure 36:
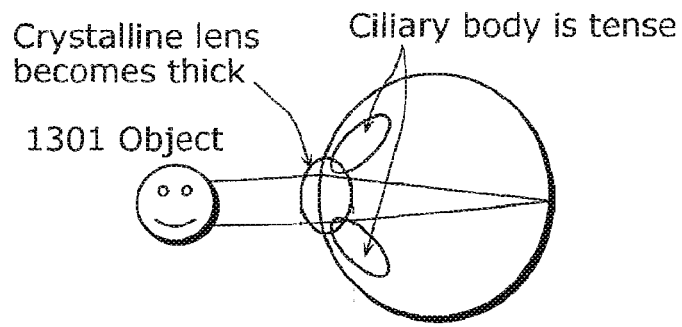
FIG. 36 is a diagram showing the states of a crystalline lens and ciliary bodies of a human eye when the eye looks at a near object.
Figure 37:
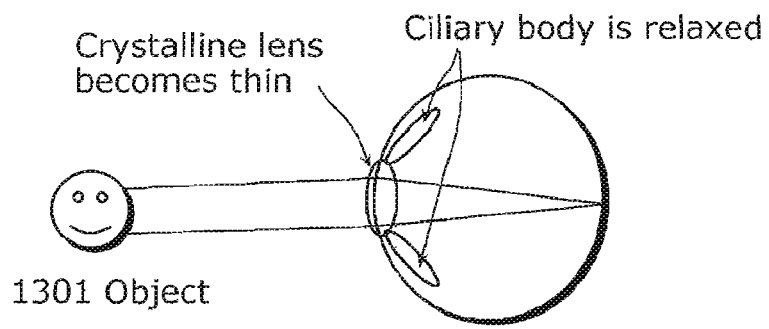
FIG. 37 is a diagram showing the states of a crystalline lens and ciliary bodies in a human eye when the eye looks at a distant object.

FIG. 33 is a structural diagram (side view) of a laser scanning-type display 2301 in Embodiment 12 according to the present invention.

The display 2301 includes a light source 101, a wavefront shape changing unit 102, a scanning unit 103, a deflecting unit 104, and a control unit 105. The user places this display on the desk 2302 for use. With this structure shown in FIG. 33, the user does not need to mount the device on the head as in the case of an HMD. In addition, the user does not need to hold the device for a long time as in the case of a binocular. Thus, the user can use the display for a long time without burden, As in FIG. 3, the light source 101 in FIG. 33 includes a red laser light source 211, a blue laser light source 212, a green laser light source 213, and a light detecting unit 214.

The wavefront shape changing unit 102 in FIG. 33 includes a focal length horizontal component changing unit 201 and a focal length vertical component changing unit 202 which are arranged in series on an optical path. This makes it possible to separately change the curvatures in the horizontal and vertical directions of the waveform shapes. In this embodiment, as shown in FIG. 2, the wavefront shapes in the vertical direction and the horizontal direction are changed by changing the positions of mirrors in the pairs of a cylindrical lens and a mirror.

The beam from the wavefront shape changing unit 102 is used for scanning by the scanning unit 103, and enters the deflecting unit 104.

The deflecting unit 104 in this embodiment is implemented as a see-through hologram. In this embodiment, the deflecting unit 104 is disposed on the surface of the display, and condenses light from the scanning unit 103 on the user's pupil.

The reflected light from the user's retina inversely tracks the path for the incident light, and is detected by the light detecting unit 214.

The control unit 105 includes an integrated circuit which controls the respective units of the HUD. The control unit 105 controls the output by the respective lasers, the wavefront shape changing unit 102, the scanning unit 103, and the light detecting unit 214.

FIG. 33 shows only one of the user's eyes. However, it is also good to prepare another light source 101, wavefront shape changing unit 102, scanning unit 103, deflecting unit 104, and light detecting unit 214, and use these in control of the curvature radiuses of beams that enter the eyes. In this case, it is possible to set different beam curvature radiuses for the respective eyes when the visual resolutions of the right eye and left eye are different from each other. This prevents a situation where a video is blurred in either one of the eyes.

It is also good to employ a method of dispersing the beam from the light source 101 using a prism or the like so that the dispersed beam enters into the wavefront shape changing units 102 used for display for the right and left eyes using the same light source 101 for display for the right and left eyes. In this case, it becomes possible to implement a smaller display because the required number of light sources decreases, and reduce electric power consumption.

Embodiments have been described above with reference to the drawings, but the present invention is not limited to the embodiments shown in the drawings. The illustrated embodiments can be corrected or modified in various manners within the same or equivalent scope of the present invention.

The beam scanning-type display device according to the present invention includes a wavefront shape changing unit, and is applicable for use such as display devices, display systems, display methods, and display programs.

The invention claimed is:

1. A beam scanning-type display device, comprising:
a light source which emits a beam;
a scanning unit configured to perform scanning the beam emitted from the light source;
a deflecting unit configured to deflect the beam used for the scanning performed by the scanning unit towards an eye of a user;
a wavefront shape changing unit configured to change a wavefront shape of the beam emitted from the light source so that a spot size of the beam falls within a predetermined allowable range, and output the beam to the scanning unit;
a light detecting unit configured to detect a part of the beam used for the scanning performed by the scanning unit, the part of the beam being a reflected light of the beam when the beam enters the eye of the user and is reflected from a cornea of the eye;
a line-of-sight detecting unit configured to detect a line-of-sight direction of the user based on intensity of the reflected light detected by the light detecting unit; and
a visual field position determining unit configured to determine a position of the beam in a visual field of the user, based on the line-of-sight direction detected by the line-of-sight detecting unit,
wherein the wavefront shape changing unit is configured to change the wavefront shape of the beam, based on the allowable range which varies depending on the position of the beam determined by the visual field position determining unit.

2. The beam scanning-type display device according to claim 1, wherein an upper limit of the allowable range becomes smaller as the beam becomes closer to the center of a visual field of the user, and becomes greater as the beam becomes distant from the center of the visual field of the user.

3. The beam scanning-type display device according to claim 2,
wherein the upper limit of the allowable range is a greater one of a value according to a visual resolution corresponding to the position in the visual field of the user and a value according to a target display resolution in the center of the visual field.

4. A beam scanning-type display device comprising:
a light source which emits a beam;
a scanning unit configured to perform scanning using the beam emitted from the light source;
a deflecting unit configured to deflect the beam used for the scanning performed by the scanning unit towards an eye of a user;
a wavefront shape changing unit configured to change a wavefront shape of the beam emitted from the light source so that a spot size of the beam falls within a predetermined allowable range, and output the beam to the scanning unit;
a light detecting unit configured to detect a part of the beam used for the scanning performed by the scanning unit;
a spot size determining unit configured to determine a spot size on the retina of the beam entering the eye of the user, based on the result of the detection performed by the light detecting unit, the beam forming a spot having the spot size on the retina; and
a beam curvature control unit configured to gradually adjust a curvature radius of the beam by a predetermined value such that the curvature radius is gradually made closer to a target value within a range which allows the spot size determined by the spot size determining unit to fall within a predetermined threshold value.

5. The beam scanning-type display device according to claim 4,
wherein the target value of the curvature radius of the beam is determined as a maximum value within a range which allows the spot size determined by the spot size determining unit to fall within the predetermined threshold value.

6. The beam scanning-type display device according to claim 5,
wherein the beam curvature control unit is configured to lower the target value in the case where a result of the detection performed by the spot size detecting unit exceeds the threshold value.

7. The beam scanning-type display device according to claim 4,
wherein the beam curvature control unit is configured to change the curvature radius of the beam only when a variation range of the spot size within a predetermined time period is not greater than a predetermined value.

8. The beam scanning-type display device according to claim 4, comprising
a motion detecting unit configured to detect a body motion change of the user,
wherein the beam curvature control unit is configured to retain the curvature radius when the body motion change outputted through the detection is not less than a predetermined value.

9. The beam scanning-type display device according to claim 4,
wherein the beam curvature control unit is configured to cause an increase in the curvature radius of the beam in an increase period and cause a decrease in the curvature radius of the beam in a decrease period, the increase period and the decrease period are repeated alternately.

10. A beam scanning-type display device, comprising:
a light source which emits a beam;
a scanning unit configured to perform scanning using the beam emitted from the light source;
a deflecting unit configured to deflect the beam used for the scanning performed by the scanning unit towards an eye of a user;
a wavefront shape changing unit configured to change a wavefront shape of the beam emitted from the light source so that a spot size of the beam falls within a predetermined allowable range, and output the beam to the scanning unit: and
a light detecting unit configured to detect a part of the beam used for the scanning performed by the scanning unit,
wherein the wavefront shape changing unit is configured to change the wavefront shape of the beam based on a result of the detection performed by the light detecting unit,
the deflecting unit includes a substrate and a hologram mirror formed on at least a part of the substrate,
the hologram mirror includes a deflection area for guiding a scanning light from the scanning unit toward the eye of the user, and a reflection body for reflecting a part of the beam outputted by the scanning unit toward the light detecting unit,
the light source includes:
a red laser light source;
a blue laser light source; and
a green laser light source obtained by combining an infrared laser light source which emits infrared light having a central wavelength ranging from 750 nm to 1500 nm inclusive and a second-harmonic generation (SHG) element which converts a part of the infrared light to green light, and
the reflection body is configured to reflect the infrared light.

11. The beam scanning-type display device according to claim 10,
wherein the deflecting unit includes a shielding film which shields infrared light on a surface opposite to a surface, of the substrate, to which the hologram mirror is attached.

12. A beam scanning-type display device comprising:
a light source which emits a beam
a scanning unit configured to perform scanning using the beam emitted from the light source;
a deflecting unit configured to deflect the beam used for the scanning performed by the scanning unit towards an eye of a user;
a wavefront shape changing unit configured to change a wavefront shape of the beam emitted from the light source so that a spot size of the beam falls within a predetermined allowable range, and output the beam to the scanning unit; and
a light detecting unit configured to detect a part of the beam used for the scanning performed by the scanning unit,
wherein the wavefront shape changing unit is configured to change the wavefront shape of the beam based on a result of the detection performed by the light detecting unit, and
the light detecting unit is configured to separately detect curvature radiuses of beams, in two directions, vertical to an optical axis and orthogonal to each other, the curvature radiuses being included in wavefront shape data of the reflected light.

13. A beam scanning-type display device, comprising:
a light source which emits a beam;
a scanning unit configured to perform scanning using the beam emitted from the light source;
a deflecting unit configured to deflect the beam used for the scanning performed by the scanning unit towards an eye of a user; and
wavefront shape changing unit configured to change a wavefront shape of the beam emitted from the light source so that a spot size of the beam falls within a predetermined allowable range, and output the beam to the scanning unit,
wherein the wavefront shape changing unit includes a horizontal component changing unit which changes a wavefront shape of horizontal components of the beam, and a vertical component changing unit which changes a wavefront shape of vertical components of the beam, and
the horizontal component changing unit is configured to change the wavefront shape of the beam more greatly than the vertical component changing unit.

14. A beam scanning-type display device comprising;
a light source which emits a beam;
a scanning unit configured to perform scanning using the beam emitted from the light source;
a deflecting unit configured to deflect the beam used for the scanning performed by the scanning unit towards an eye of a user; and
a wavefront shape changing unit configured to change a wavefront shape of the beam emitted from the light source so that a spot size of the beam falls within a predetermined allowable range, and output the beam to the scanning unit,
wherein the wavefront shape changing unit includes a horizontal component changing unit which changes a wavefront shape of horizontal components of the beam, and a vertical component changing unit which changes a wavefront shape of vertical components of the beam, and
the wavefront shape changing unit is configured to change the wavefront shape of the beam more greatly in horizontal scanning performed by the scanning unit than in vertical scanning performed by the scanning unit.

15. A beam scanning-type display device, comprising:
a light source which emits a beam;
a scanning unit configured to perform scanning using the beam emitted from the light source;
a deflecting unit configured to deflect the beam used for the scanning performed by the scanning unit towards an eye of a user; and
a wavefront shape changing unit configured to change a wavefront shape of the beam emitted from the light source so that a spot size of the beam falls within a predetermined allowable range, and output the beam to the scanning unit,
wherein the beam scanning-type display device is an eyeglass-type image display device comprising:
a pair of lenses each including the deflecting unit;
a pair of temples each extending backwards from an outer periphery of a corresponding one of the lenses, and provided with at least a corresponding one of scanning units; and
folding mirrors each (i) disposed at a position which allows an incidence angle of the beam to the corresponding one of the scanning units to be smaller than an incidence angle of the beam which has been emitted from the light source and directly enters the corresponding one of the scanning units, and (ii) guiding the beam from the light source toward the corresponding one of the scanning units, and each of the folding mirrors includes:

a first mirror which is disposed at a position apart from the scanning unit in the temple in a vertical direction, and reflects the beam from the light source; and a second mirror which is disposed at a position closer to the corresponding one of the lens than the first mirror, and guides reflected light from the first mirror to the scanning unit.

16. The beam scanning-type display device according to claim 15, wherein the deflecting unit is a hologram mirror and includes:

an image reflection area for deflecting the scanning light from the scanning unit in the direction toward the eye of the user; and a folding reflection area which functions as the second mirror.

17. The beam scanning-type display device according to claim 16, wherein the folding reflection area has an aberration for correcting at least some of aberrations which occur in the deflection area.

18. A beam scanning display method, comprising:

emitting a beam;

performing scanning using the beam emitted in the emitting;

deflecting the beam used for the scanning performed in the performing of the scanning;

detecting a part of the beam used for the scanning performed, the part of the beam being a reflected light of the beam when the beam enters the eye of the user and is reflected from a cornea of the eye;

detecting a line-of-sight direction of the user based on intensity of the reflected light detected in the detecting of a part of the beam;

determining a position of the beam in a visual field of the user, based on the detected line-of-sight direction; and changing, based on a predetermined allowable range which varies depending on the determined position of the emitted beam, a wavefront shape of the beam so that a spot size of the beam falls within the predetermined allowable range, and outputting the beam for the performing of the scanning.

19. A program stored on a non-transitory computer readable medium causing a computer to execute steps comprising:

emitting a beam;

performing scanning using the beam emitted;

deflecting the beam used for the scanning performed in the performing of the scanning;

detecting a part of the beam used for the scanning performed, the part of the beam being a reflected light of the beam when the beam enters the eye of the user and is reflected from a cornea of the eye;

detecting a line-of-sight direction of the user based on intensity of the reflected light detected in the detecting of a part of the beam;

determining a position of the beam in a visual field of the user, based on the detected line-of-sight direction; and changing, based on a predetermined allowable range which varies depending on the determined position of the emitted beam, a wavefront shape of the beam so that a spot size of the beam falls within the predetermined allowable range, and outputting the beam for the performing of the scanning.

20. An integrated circuit, comprising:

a light source which emits a beam;

a scanning unit configured to perform scanning using the beam emitted from the light source;

a deflecting unit configured to deflect the beam used for the scanning performed by the scanning unit towards an eye of a user;

a wavefront shape changing unit configured to change a wavefront shape of the beam emitted from the light source so that a spot size of the beam falls within a predetermined allowable range, and output the beam to the scanning unit;

a light detecting unit configured to detect a part of the beam used for the scanning performed by the scanning unit, the part of the beam being a reflected light of the beam when the beam enters the eye of the user and is reflected from a cornea of the eye;

a line-of-sight detecting unit configured to detect a line-of-sight direction of the user based on intensity of the reflected light detected by the light detecting unit and a visual field position determining unit configured to determine a position of the beam in a visual field of the user, based on the line-of-sight direction detected by the line-of-sight detecting unit, wherein the wavefront shape changing unit is configured to change the wavefront shape of the beam, based on the predetermined allowable range which varies depending on the position of the beam determined by the visual field position determining unit.

* * * * *